United States Patent [19]
Cloonan et al.

[11] Patent Number: 5,258,978
[45] Date of Patent: Nov. 2, 1993

[54] SPACE-DIVISION SWITCHING NETWORK HAVING REDUCED FUNCTIONALITY NODES

[75] Inventors: Thomas J. Cloonan, Downers Grove; Anthony L. Lentine, St. Charles; Frederick B. McCormick, Jr., Lisle; Gaylord W. Richards, Naperville, all of Ill.

[73] Assignee: AT&T Bell Laboratories, Murray Hill, N.J.

[21] Appl. No.: 803,501

[22] Filed: Jan. 22, 1992

Related U.S. Application Data

[62] Division of Ser. No. 349,280, May 8, 1989, Pat. No. 5,122,892.

[51] Int. Cl.⁵ .............................................. H04L 12/56
[52] U.S. Cl. ...................................................... 370/60
[58] Field of Search .................... 370/60, 60.1, 94.1, 370/94.2, 58.1, 58.2, 58.3

[56] References Cited

U.S. PATENT DOCUMENTS

| | | | |
|---|---|---|---|
| 4,550,397 | 10/1985 | Turner et al. | 370/60 |
| 4,566,007 | 1/1986 | Richards | 340/825.8 |
| 4,656,622 | 3/1987 | Lea | 370/60 |
| 4,787,692 | 11/1988 | Spanke | 350/96.16 |
| 4,811,210 | 3/1989 | McAulay | 364/200 |
| 4,910,730 | 3/1990 | Day, Jr. et al. | 370/60 |
| 4,917,456 | 4/1990 | Jahns et al. | 350/169 |
| 4,931,959 | 6/1990 | Brenner et al. | 364/525 |
| 4,932,020 | 6/1990 | Pashan et al. | 370/60 |

FOREIGN PATENT DOCUMENTS

| | | |
|---|---|---|
| 0282227 | 9/1988 | European Pat. Off. |
| 61-136342 | 6/1986 | Japan |

OTHER PUBLICATIONS

C. Clos, "A Study of Non-Blocking Switching Networks", *The Bell System Technical Journal*, Mar. 1953, pp. 406–424.

G. B. Adams, III, et al., "The Extra Stage Cube: A Fault-Tolerant Interconnection Network for Supersystems", IEEE Transactions on Computers, vol. c-31, No. 5, May 1982, pp. 397–408.

C. P. Kruskal, et al., "The Performance of Multistage Interconnection Networks for Multiprocessors", *IEEE Transactions on Computers*, vol. c-32, No. 12, Dec. 1983, pp. 1091–1098.

T. Kumagai, et al., "The Two-Dimensional Inverse Omega Network", 0190-3918/85/0000/0325$01.00 c 1985, IEEE, pp. 325–327.

A. W. Lohmann, "What Classical Optics Can Do for the Digital Optical Computer", Applied Optics, vol. 25, No. 10, May 15, 1986, pp. 1543–1549.

S. H. Lin, et al., "Two-Dimensional Clos Optical Interconnection Network", Topical Meeting on Optical Computing, Technical Digest Series 1987, vol. II, (Optical Society of America, Washington, D.C., 1987), pp. 98–101.

S. H. Lin, et al., "2-D Optical Multistage Interconnection Networks", *Digital Optical Computing* (1987), SPIE vol. 752, pp. 209–216.

C. W. Stirk, et al., "Folded Perfect Shuffle Optical Processor", *Applied Optics*, vol. 27, No. 2, Jan. 15, 1988, pp. 202–203.

(List continued on next page.)

*Primary Examiner*—Wellington Chin
*Attorney, Agent, or Firm*—Ross T. Watland

[57] ABSTRACT

A multi-stage network which achieves the same overall connectivity as known networks but where individual switching nodes have no input selectivity and no output selectivity. Each node is enabled or disabled to control communication therethrough in response to a single control signal. The functionality of a switching network is achieved by controlling which nodes are enabled rather than specifying connections of particular node inputs and outputs to be effected by the nodes. In a photonic network embodiment, each network node is implemented using a single symmetric self electro-optic effect device (S-SEED).

4 Claims, 75 Drawing Sheets

OTHER PUBLICATIONS

G. A. DeBiase, "Optical Multistage Interconnection Networks for Large-Scale Multiprocessor Systems", *Applied Optics*, vol. 27, No. 10, May 15, 1988, pp. 2017–2021.

List of articles related to pefect shuffle networks.

K. Shirata et al., "The Fast Walsh-Hadamard Transform and Processors by Using New Permutation Networks", *Systems, Computers, Controls*, vol. 11, No. 2, 1980, pp. 64–71.

H. S. Hinton, "Architectural Considerations for Photonic Switching Networks", *IEEE Journal on Selected Areas in Communications*, vol. 6, No. 7, Aug. 1988, pp. 1209–1226.

P. J. Severin, "Self-Routing Fibre-Optic Networks and Switches Using Multi-Tailed Receiver/Transmitter Units", *Philips Journal of Research*, vol. 41, No. 6, 1986, pp. 507–530.

FULL CAPACITY NODE

CAPACITY ONE NODE WITH SELECTIVITY

CAPACITY ONE NODE WITHOUT SELECTIVITY

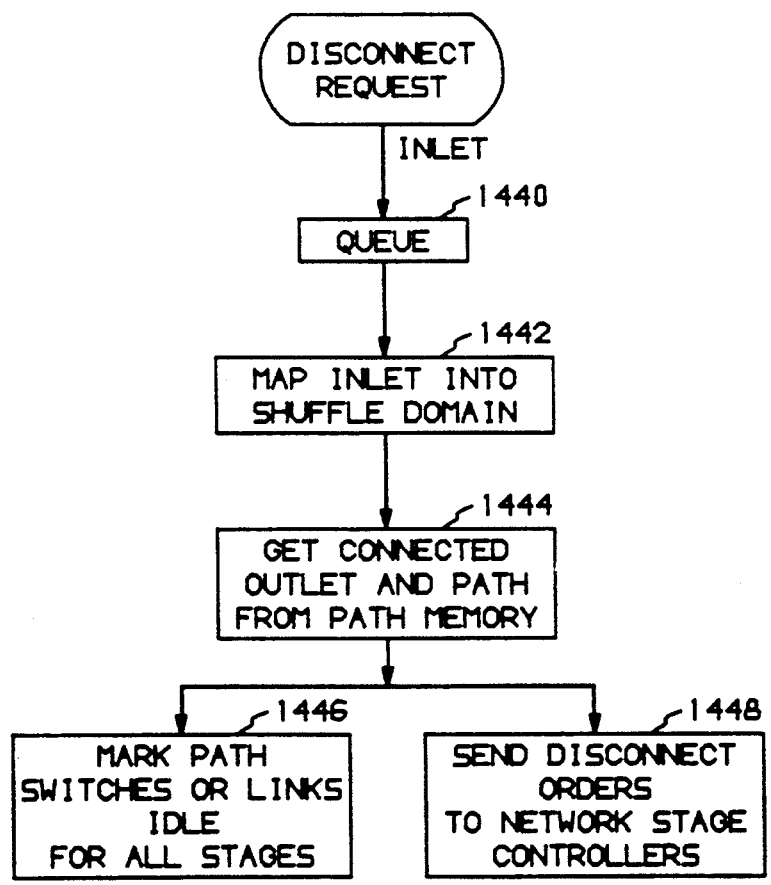

512 X 512 CROSSOVER NETWORK CONTROLLER

| FIG. 42 | FIG. 43 | FIG. 44 |

| $R_1$ | $L_1$ | $W_1$ | |
|---|---|---|---|
| | $R_2$ | $L_2$ | $W_2$ |

COPY 1 ── | $R_1$ | $L_1$ | $W_1$ | | ─ $W_3$ ─ $W_4$ ─
          |       | $R_2$ | $L_2$ | $W_2$ |

COPY 2 ── | $R_3$ | $L_3$ | $W_1$ | | ─ $W_2$ ─ $W_3$ ─ $W_4$ ─
          |       | $R_4$ | $L_4$ |

CROSSOVER IMPLEMENTATION

SHUFFLE IMPLEMENTATION

16 X 16 3-DIMENSIONAL CROSSOVER NETWORK

| FIG. 55 | FIG. 56 | FIG. 57 |

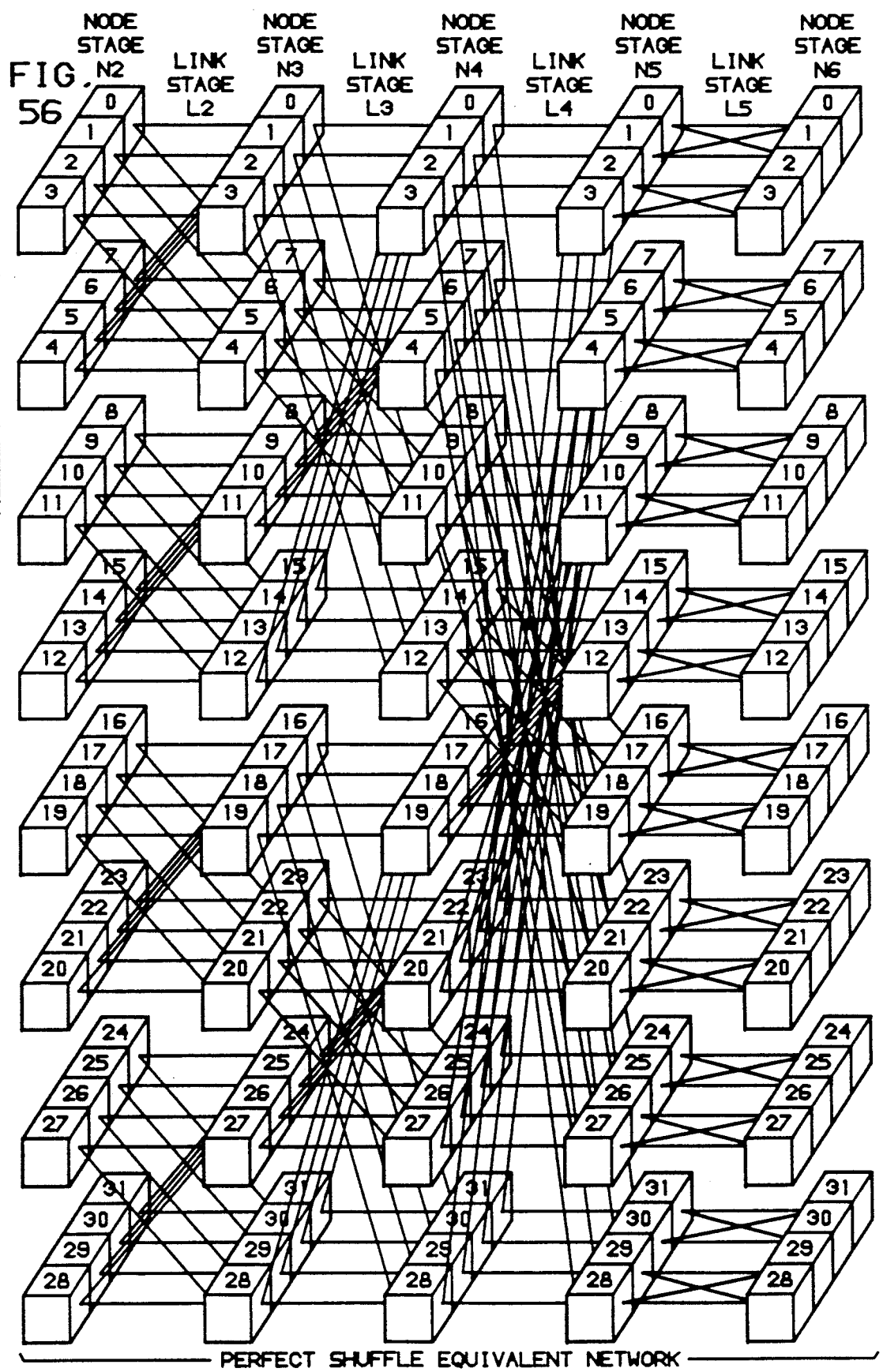
FIG. 56  PERFECT SHUFFLE EQUIVALENT NETWORK

S-SEED ARRAY

CROSSOVER IMPLEMENTATION

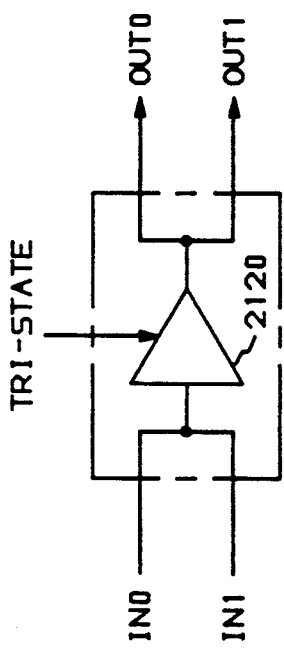
FIG. 60 TRI-STATE BUFFER
FIG. 61 TRUTH TABLE
| TRI-STATE | IN0 | IN1 | OUT0 | OUT1 |
|---|---|---|---|---|
| 0 | HIGH IMPEDANCE | 0 | 0 | 0 |
| 0 | HIGH IMPEDANCE | 1 | – | – |
| 0 | 0 | HIGH IMPEDANCE | 0 | – |
| 0 | 1 | HIGH IMPEDANCE | 1 | – |
| 1 | DON'T CARE | DON'T CARE | HIGH IMPEDANCE | HIGH IMPEDANCE |

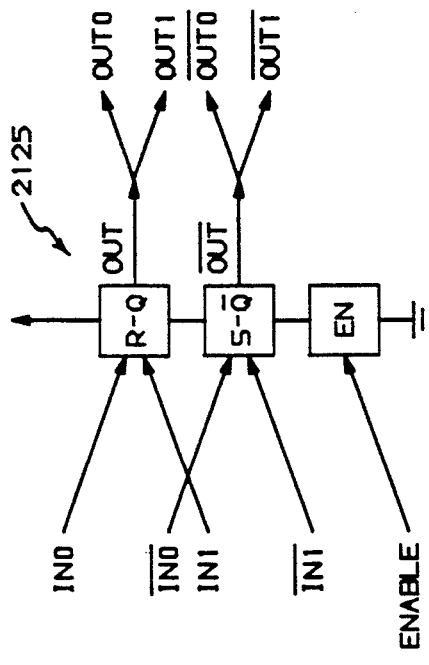
M-SEED IMPLEMENTATION
FIG. 63
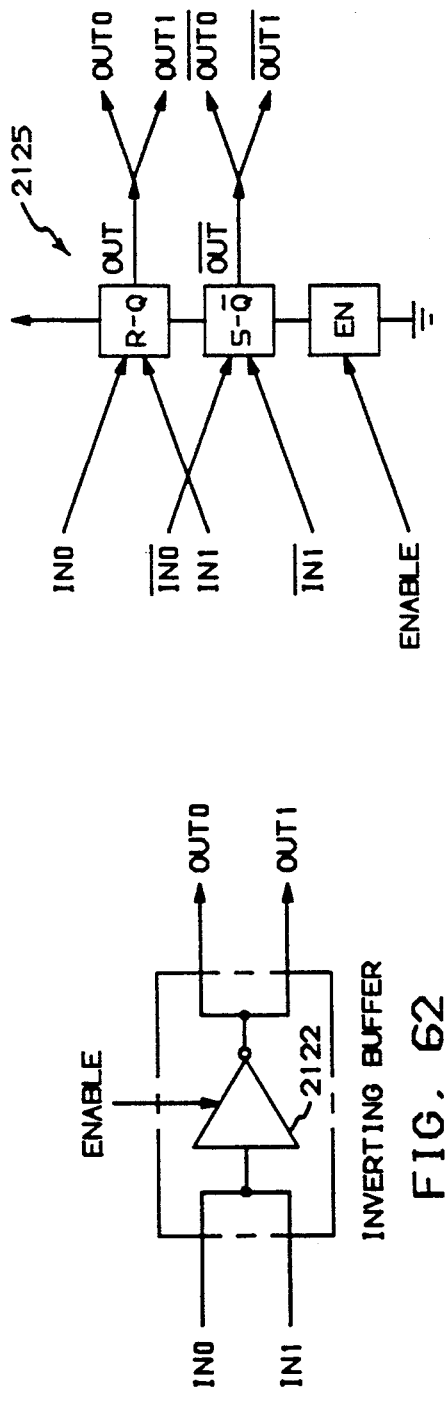
INVERTING BUFFER
FIG. 62
| ENABLE | IN0 | IN1 | OUT0 | OUT1 |
|---|---|---|---|---|
| 0 | DON'T CARE | DON'T CARE | NO OPTICAL POWER | NO OPTICAL POWER |
| 1 | NO OPTICAL POWER | 0 | 1 | 1 |
| 1 | NO OPTICAL POWER | 1 | 0 | 0 |
| 1 | 0 | NO OPTICAL POWER | 1 | 1 |
| 1 | 1 | NO OPTICAL POWER | 0 | 0 |
TRUTH TABLE
FIG. 64

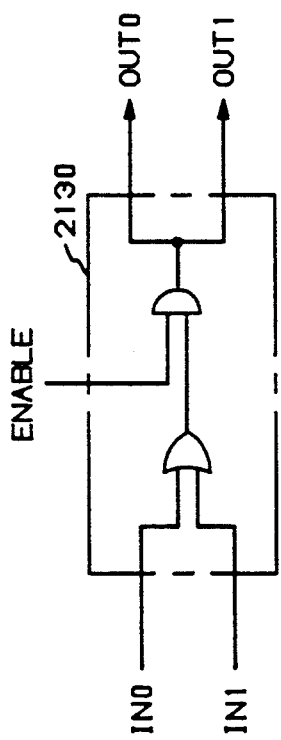

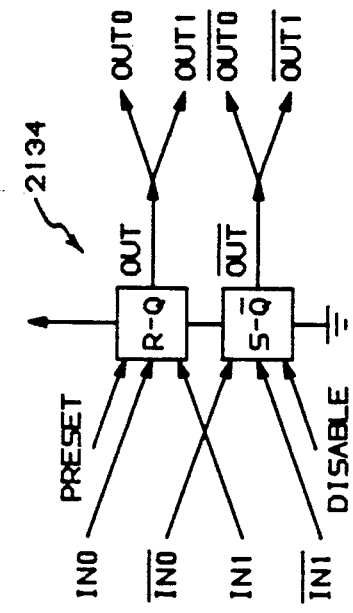
FIG. 68
S-SEED IMPLEMENTATION
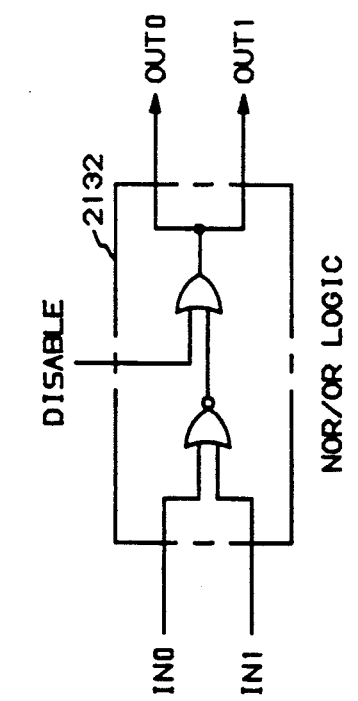
FIG. 67
NOR/OR LOGIC
| DISABLE | IN0 | IN1 | $\overline{IN0}$ | $\overline{IN1}$ | P(S) | P(R) | OUT(t+1) | $\overline{OUT}(t+1)$ |
|---|---|---|---|---|---|---|---|---|
| 0 | 0 | 0 | 1 | 1 | 6.071 | 2.00 | 1 | 0 |
| 0 | 0 | 1 | 1 | 0 | 4.071 | 4.00 | 0 | 1 |
| 0 | 1 | 0 | 0 | 1 | 4.071 | 4.00 | 0 | 1 |
| 0 | 1 | 1 | 0 | 0 | 2.071 | 6.00 | 0 | 1 |
| 1 | 0 | 0 | 1 | 1 | 13.10 | 2.00 | 1 | 0 |
| 1 | 0 | 1 | 1 | 0 | 11.10 | 4.00 | 1 | 0 |
| 1 | 1 | 0 | 0 | 1 | 11.10 | 4.00 | 1 | 0 |
| 1 | 1 | 1 | 0 | 0 | 9.10 | 6.00 | 1 | 0 |
$P(S) = P(\overline{IN0}) + P(\overline{IN1}) + P(DISABLE)$
$P(R) = P(IN0) + P(IN1)$
TRUTH TABLE
FIG. 69

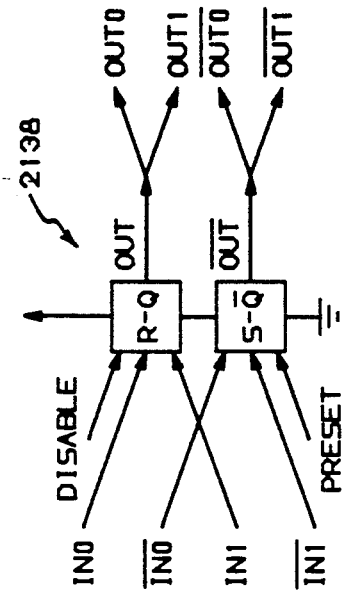
FIG. 70 NAND/AND LOGIC
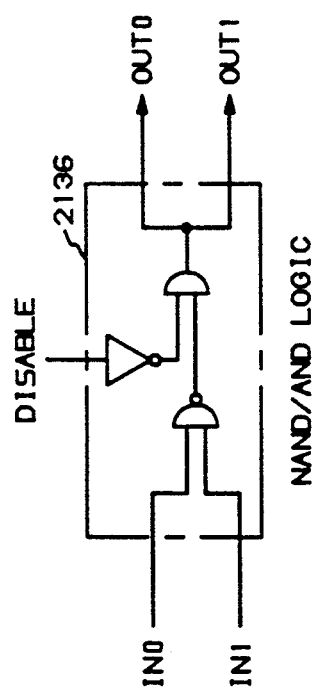
FIG. 71 S-SEED IMPLEMENTATION
| DISABLE | IN0 | IN1 | $\overline{IN0}$ | $\overline{IN1}$ | P(R) | P(S) | OUT(t+1) | $\overline{OUT}(t+1)$ |
|---|---|---|---|---|---|---|---|---|
| 0 | 0 | 0 | 1 | 1 | 2.071 | 6.00 | 1 | 0 |
| 0 | 0 | 1 | 1 | 0 | 4.071 | 4.00 | 1 | 0 |
| 0 | 1 | 0 | 0 | 1 | 4.071 | 4.00 | 1 | 0 |
| 0 | 1 | 1 | 0 | 0 | 6.071 | 2.00 | 0 | 1 |
| 1 | 0 | 0 | 1 | 1 | 8.10 | 6.00 | 0 | 1 |
| 1 | 0 | 1 | 1 | 0 | 11.10 | 4.00 | 0 | 1 |
| 1 | 1 | 0 | 0 | 1 | 11.10 | 4.00 | 0 | 1 |
| 1 | 1 | 1 | 0 | 0 | 13.10 | 2.00 | 0 | 1 |
$P(R) = P(IN0) + P(IN1) + P(DISABLE)$
$P(S) = P(\overline{IN0}) + P(\overline{IN1})$
FIG. 72 TRUTH TABLE

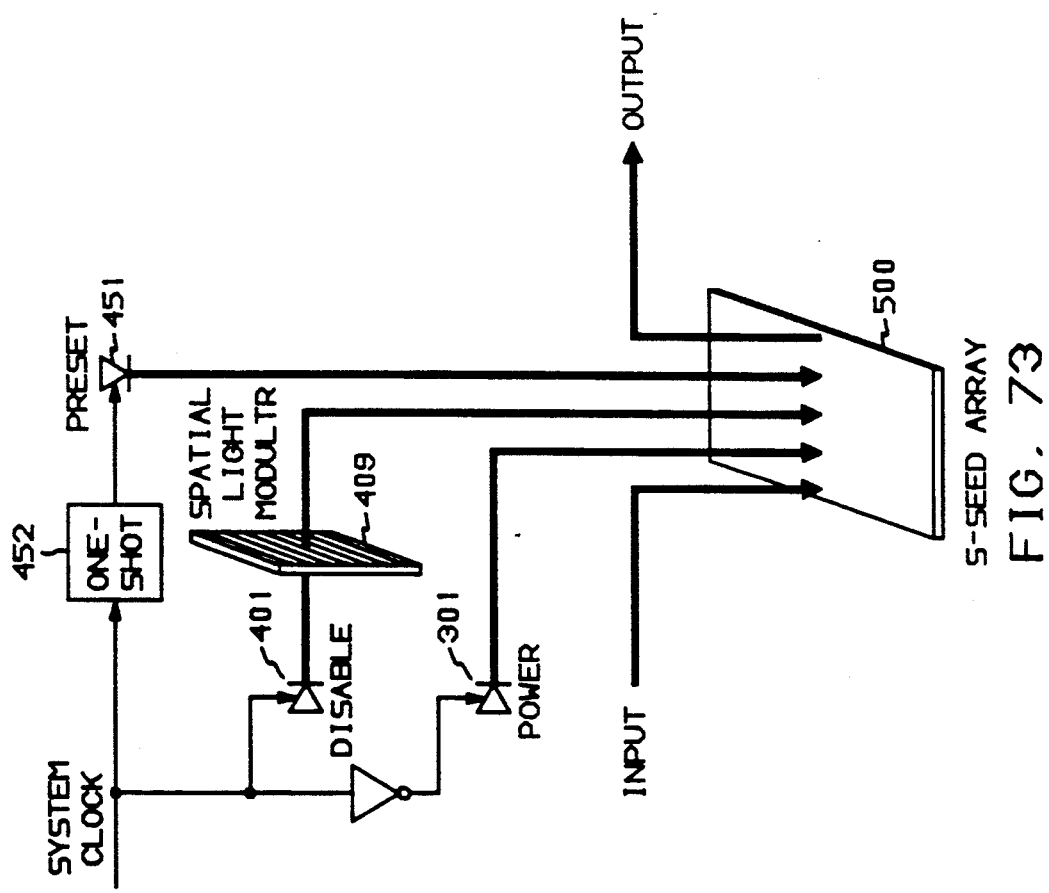

VERTICAL CONNECTIONS

HORIZONTAL CONNECTIONS

CASCADED
OPTICAL HARDWARE MODULES
FOR 2 NODE STAGES (LINK STAGE L0)  (NODE STAGE N1)

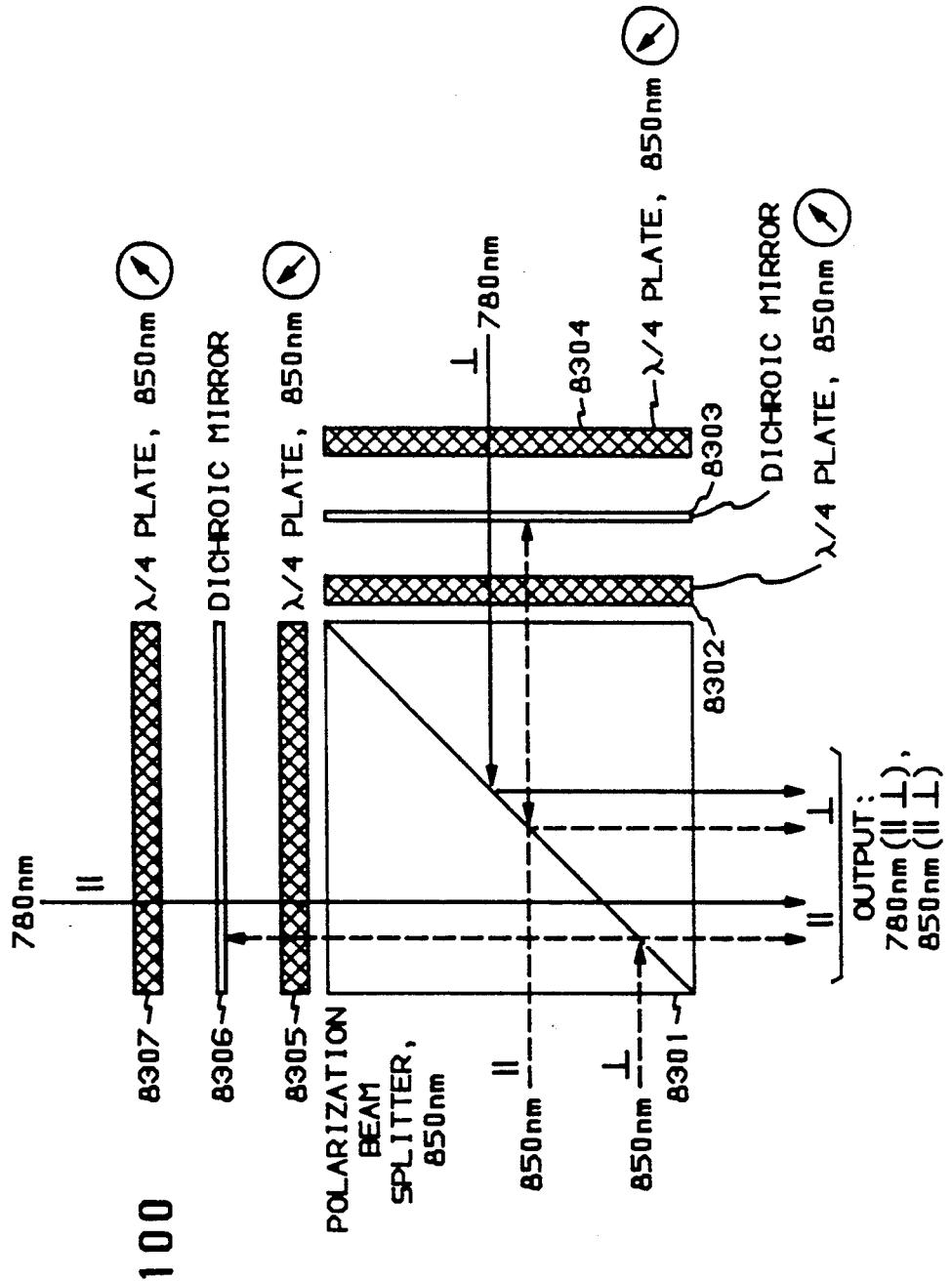

SPACE-DIVISION SWITCHING NETWORK HAVING REDUCED FUNCTIONALITY NODES

This is a division of application Ser. No. 07/349,280 filed May 8, 1989, now U.S. Pat. No. 5,122,892.

CROSS-REFERENCE TO RELATED APPLICATIONS

This application is related to the following applications, which are assigned to the same assignee and concurrently filed herewith:

T. J. Cloonan et al., U.S. Ser. No. 349,281, now U.S. Pat. No. 5,077,483 "Network Topology for Reduced Blocking and Photonic System Implementation Thereof"

T. J. Cloonan et al., U.S. application Ser. No. 349,275, now U.S. Pat. No. 5,036,512 "Optical Apparatus for Combining Light Beam Arrays Having Different Wavelengths", T. J. Cloonan et al., U.S. application Ser. No. 349,008, now U.S. Pat. No. 5,023,864 Case 5-3-5-3, "Crossover Network Utilizing Two-Dimensional Arrays of Nodes", G. W. Richards, Case 9, U.S. Application Ser. No. 349,011, now U.S. Pat. No. 4,991,168 "Concurrent Multi-Stage Network Control Arrangement", G. W. Richards, Case 10, U.S. Application Ser. No. 349,027, now U.S. Pat. No. 4,993,016 "Network Control Arrangement for Processing a Plurality of Connection Requests", and G. W. Richards, U.S. Application Ser. No. 349,007, now U.S. Pat. No. 5,040,173 "Network Control Arrangement Based on Topological Equivalence".

TECHNICAL FIELD

This invention relates to communication switching networks.

BACKGROUND AND PROBLEM

Communication networks are generally designed as point-to-point networks to interconnect, upon request, selected pairs of terminals from a large plurality of terminals connected to the network. The simplest network capable of connecting N network inlets to N network outlets is an N×N crossbar array of switching elements or crosspoints. Although such an array is non-blocking in that any idle inlet is always connectable to any idle outlet regardless of other array interconnections, the crossbar array is not a practical network in many applications due to the prohibitive cost of the large number of array crosspoints.

To reduce cost while still maintaining an acceptably low blocking characteristic, space-division switching networks are frequently designed to include a plurality of stages of switching nodes. The node stages are successively interconnected using a specified interconnection pattern. To achieve the overall switching function of connecting any network inlet to any network outlet, the individual switching nodes are typically selective in that they can connect any one of a plurality of node inputs to any one of a plurality of node outputs in response to control signals defining the desired connections. One simple switching node of this type is a n×m rectangular array of crosspoints. As attempts to further reduce network costs continue and, particularly for networks designed for implementation in the photonics domain, the input/output selectivity required of the switching nodes in such multi-stage networks makes the total cost of the switching nodes high.

SOLUTION

The aforementioned problem is solved and a technical advance is achieved in accordance with the principles of the invention in an exemplary multi-stage network which achieves the same overall connectivity as known networks but where individual switching nodes have no input selectivity and no output selectivity but rather each node is simply enabled or disabled to control communication therethrough in response to a single control signal. The reduced node functionality results in reduced node complexity and, accordingly, a reduced total switching node cost for the network. The functionality of a switching network is achieved by controlling which nodes are enabled rather than specifying connections of particular node inputs and outputs to be effected by the nodes.

A network in accordance with the invention comprises a plurality of successively interconnected stages of nodes. Each node of a given stage is responsive to a control signal for broadcasting an output signal to at least two of the nodes of the succeeding stage. The output signal is a logical combination of signals receivable from at least two of the nodes of the preceding stage.

In an illustrative photonic network embodiment (FIG. 1 and FIGS. 55–57), each intermediate stage node is coupled to two preceding stage nodes and two succeeding stage nodes. The nodes of successive stages are interconnected such that the network is a perfect shuffle equivalent network. Each node, referred to herein as a 2-module, comprises a symmetric self electro-optic effect device (S-SEED) disclosed in U.S. Pat. No. 4,754,132 issued to H. S. Hinton et al., on Jun. 28, 1988, and used a beam splitter for splitting the output signal into two signals each for transmission to one of the two succeeding stage nodes. For some network stages, an S-SEED operates as an optical logic circuit comprising a NOR-gate and an OR-gate. For other network stages, an S-SEED operates as an optical logic circuit comprising a NAND-gate and an AND-gate.

Since an S-SEED is a dual rail device, a first one of the receivable signals comprises a first data input signal and a first complementary data input signal, a second one of the receivable signals comprises a second data input signal and a second complementary data input signal, and the output signal comprises a data output signal and a complementary data output signal. A first photodetector of the S-SEED is optically coupled to both of the two preceding stage nodes for receiving the first and second data input signals, and is optically coupled to both of the two succeeding stage nodes for transmitting the data output signal. A second photodetector of the S-SEED is optically coupled to both of the two preceding stage nodes for receiving the first and second complementary data input signals, and is optically coupled to both of the two succeeding stage nodes for transmitting the complementary data output signal. A NOR/OR implementation (FIG. 68) is effected by transmitting the control signal, used to disable the node, to the second photodetector, and transmitting a preset signal, used to preset the state of the S-SEED, to the first photodetector. A NAND/AND implementation (FIG. 71) is effected by transmitting a control signal to the first photodetector and a preset signal to the second photodetector.

The network is controlled such that at most one of the signals receivable from the preceding stage nodes is active at any time. Each node is associated with one other node of the same stage-node that is coupled to receive signals from the same nodes of the preceding stage. Busy/idle information is stored for each of the nodes of each of the stages. A given node of one of the stages is selected for use as part of a connection through the network only when both the given node and the node associated with the given node are marked idle. After the selection, the given node is marked busy.

Another optical 2-module implementation uses a three-diode M-SEED (FIG. 63). Four electrical 2-module implementations use a tri-state buffer (FIG. 60), an OR/AND logic circuit (FIGS. 8 and 65), a NOR-/OR logic circuit (FIG. 67), and a NAND/AND logic circuit (FIG. 70).

One specific illustrative embodiment of the invention is used in the exemplary photonic system 10 (FIG. 1) which implements a 16×16 circuit-switched, space division switching network. Sixteen optical input signals are received on the fibers of a 2×8 fiber cable array 21. Each optical input signal may be circuit-switched by photonic system 10 for transmission on one fiber of a 2×8 fiber cable array 22 as an optical output signal. Photonic system 10 includes a lens 80, a data input unit 40, eight optical hardware modules 50 through 57, and a lens 70. It is important to note that photonic system 10 processes arrays of beams in parallel and that the optical transmissions represented by single beams in FIG. 1 are beam arrays of rectangular cross-section. The optical connections effected by data input unit 40 and optical hardware modules 56 and 57 are fixed. A network controller 60, which may be implemented using a single software-controlled processor or using a hardware logic circuit arrangement, establishes and disconnects paths through photonic system 10 via stage controllers 30 through 35 corresponding to optical hardware modules 50 through 55.

The network topology implemented by photonic system 10 comprises expansion, a perfect shuffle equivalent network, and concentration. The topology is based on a three-dimensional crossover network 2110 (FIGS. 55–57) having nine node stages N0 through N8 and eight link stages L0 through L7. Each node stage, for example, stage N2, comprises 32 nodes numbered 0 through 31. In photonic system 10, a 4×8 array 500 (FIGS. 1 and 58) of symmetric self electro-optic effect devices (S-SEEDs) corresponds to one node stage of network 2110. The S-SEEDs, which selectively reflect light depending on their optical state, are the switching nodes of photonic system 10 and, in accordance with the present invention, operate as 2-modules as described herein. Each of the optical hardware modules 50 through 57 includes optical apparatus to effect interconnections corresponding to one of the link stages L0 through L7 of network 2110 (FIGS. 55–57) and to effect combination of information (signal), control (preset and disable), and power beam arrays to be focused onto one of the S-SEED arrays 500. For example, optical hardware module 51, shown in more detail in FIG. 93, includes an optical crossover interconnect 100 corresponding to link stage L1 of network 2110, and a beam combination unit 200 which, in addition to combining beam arrays for transmission to S-SEED array 500, redirects an output beam array, reflected from S-SEED array 500, for transmission to the next optical hardware module 52. Communication paths are established through photonic system 10 using spatial light modulators, e.g., 409, which control the generation of arrays of disable beams corresponding to individual S-SEEDs to be disabled.

Note that link stages L0, L1, L5, and L6 of network 2110 (FIGS. 55–57) effect horizontal connections and that link stages L2, L3, L4, and L7 effect vertical connections. Also note that the number of partitions or crosses varies from stage to stage. These variations are implemented in photonic system 10 by variations among the optical hardware modules 50 through 57 as described herein.

DRAWING DESCRIPTION

Figure 1:
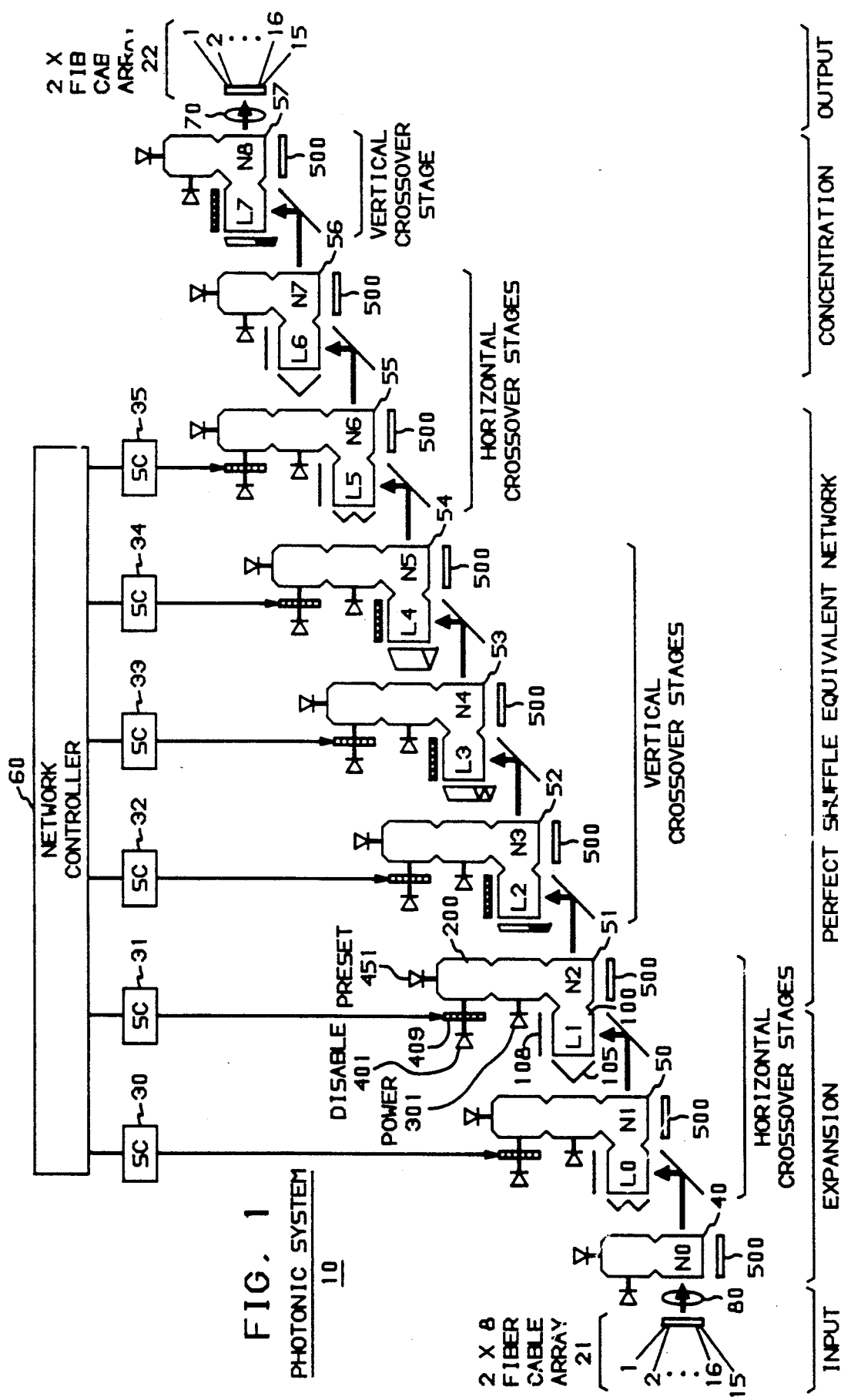
FIG. 1 is a diagram of an exemplary photonic system comprising expansion, a perfect shuffle equivalent network, and concentration.
Figure 2:
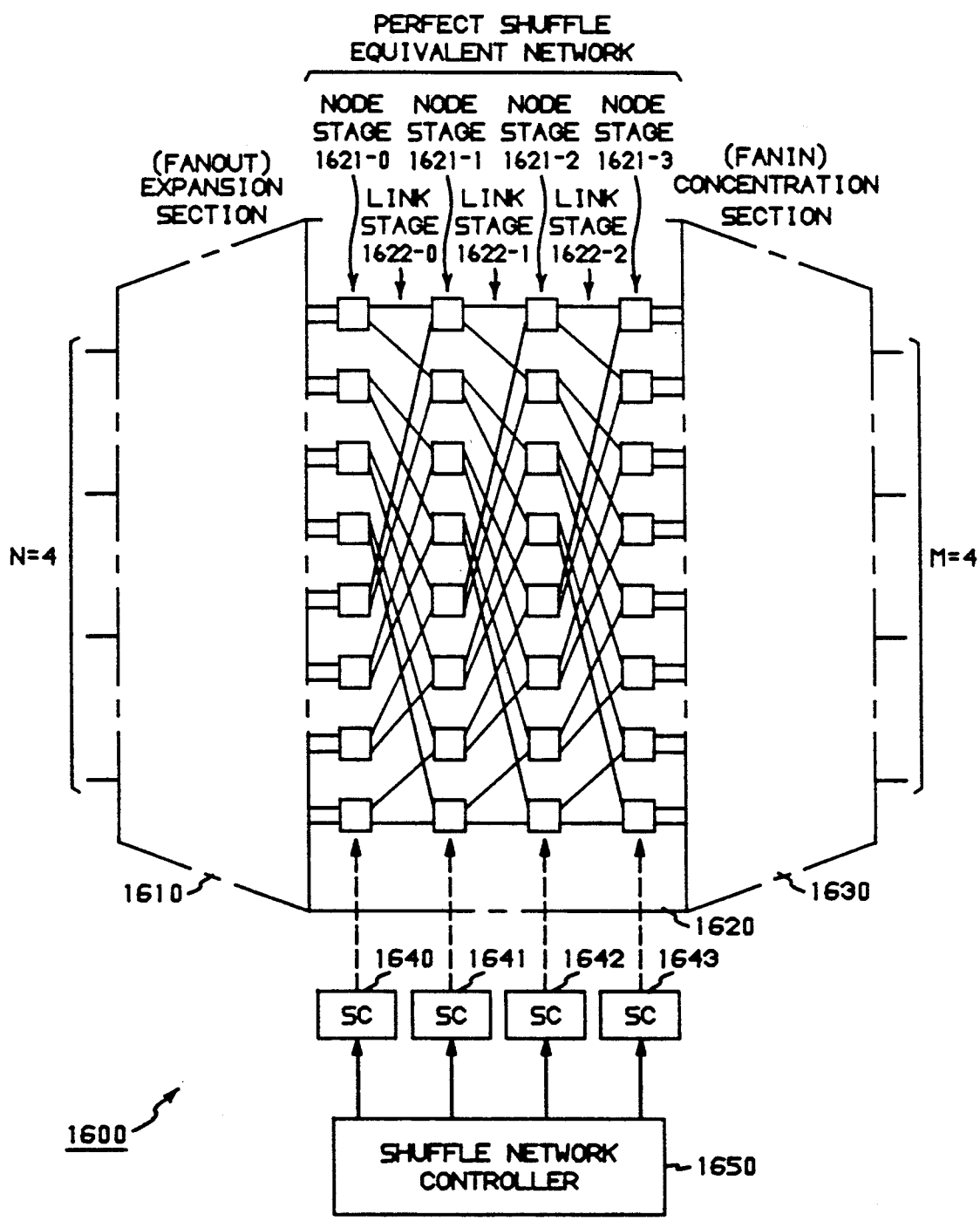
FIG. 2 is a diagram of an illustrative network topology for a system comprising expansion, a perfect shuffle equivalent network, and concentration.
Figure 3:
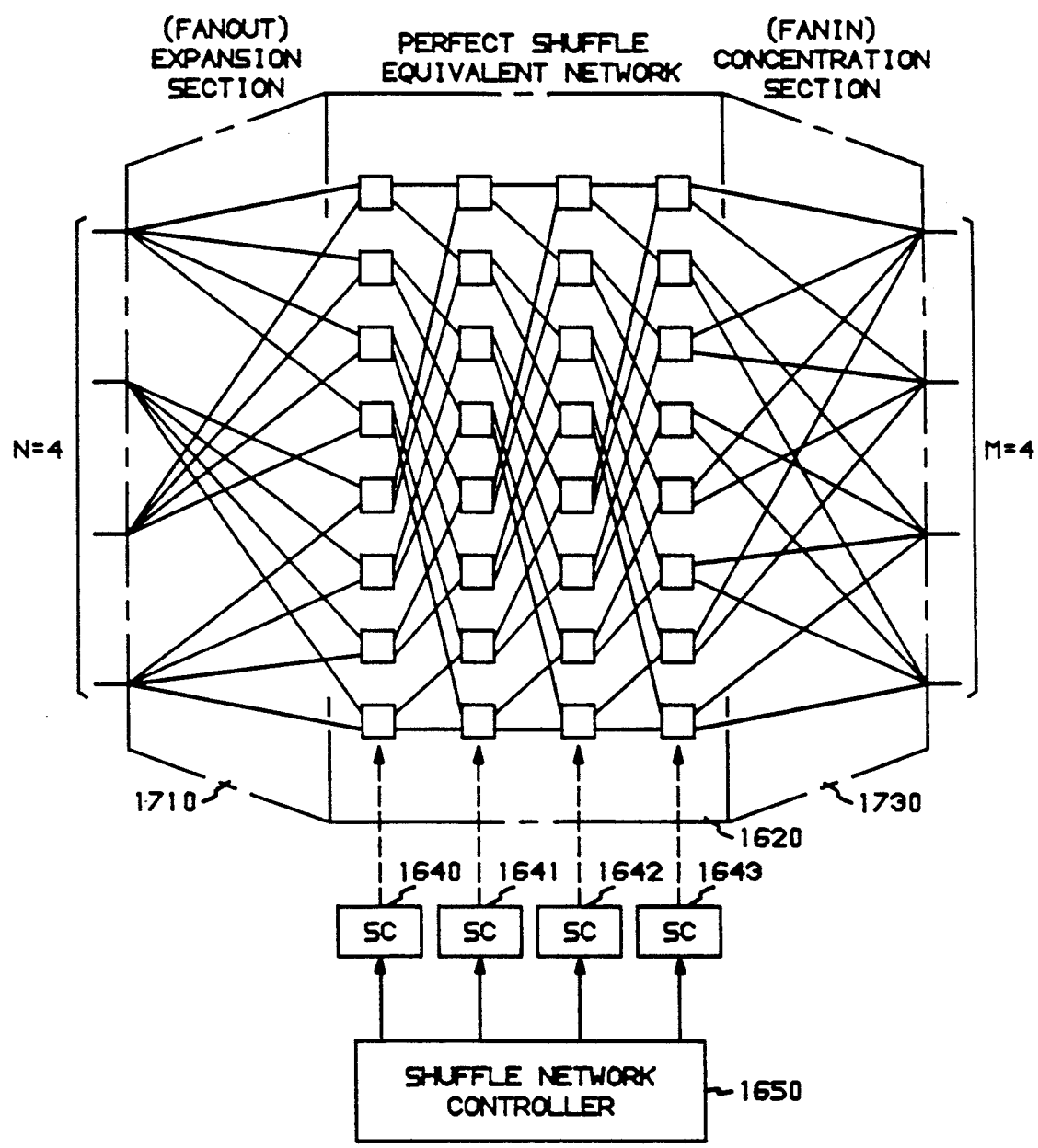
Figure 4:
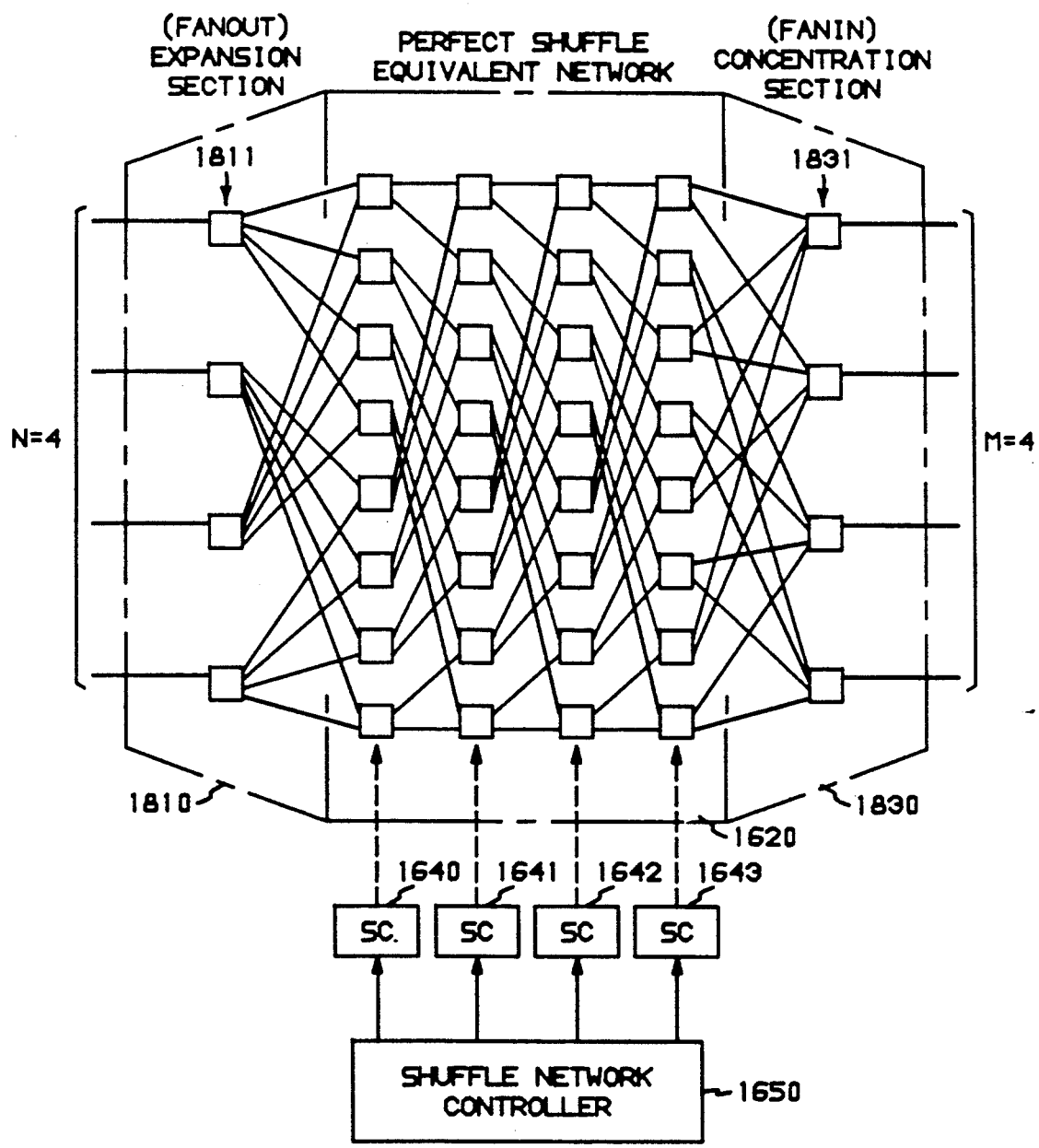
Figure 5:
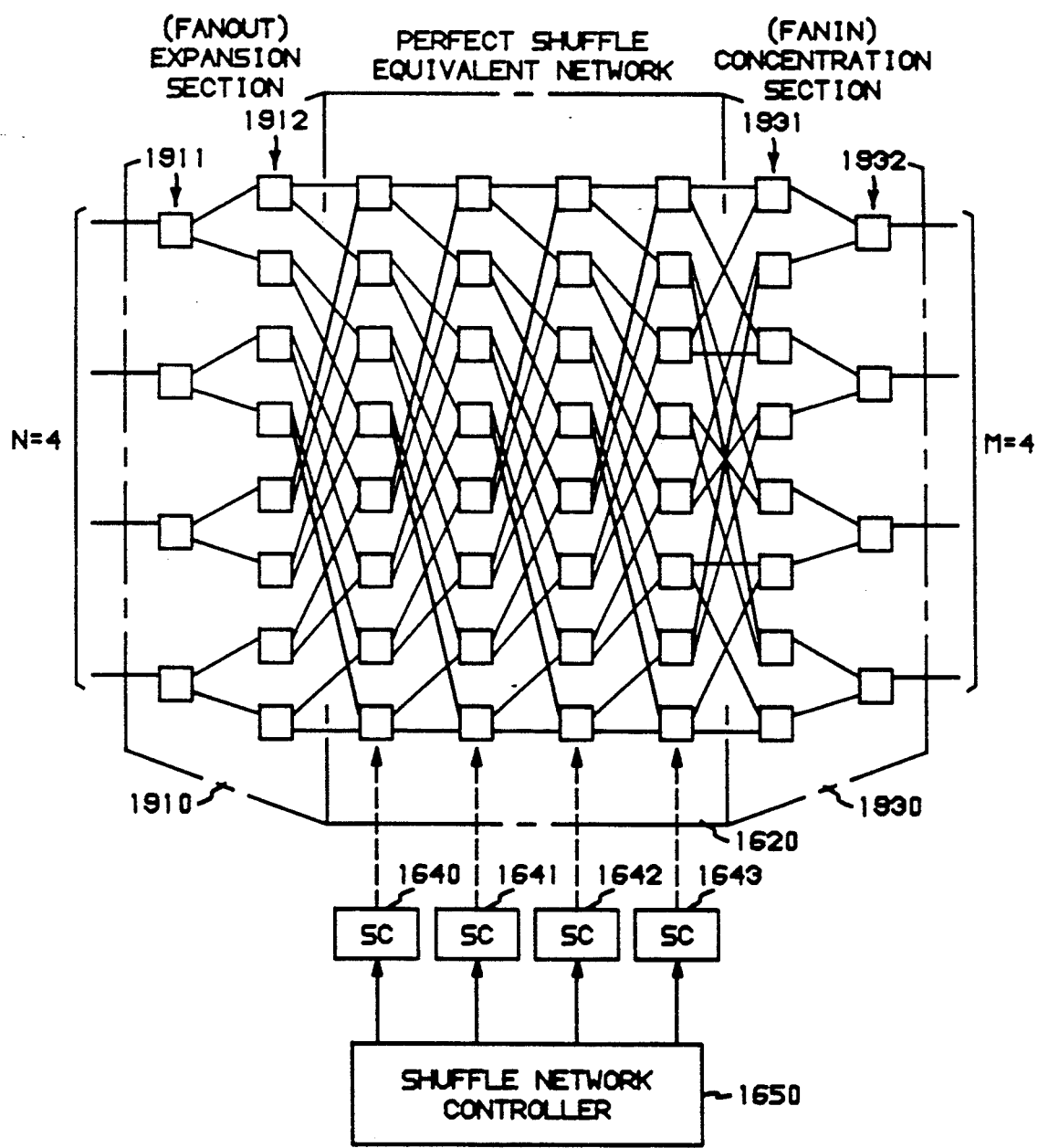
Figure 6:
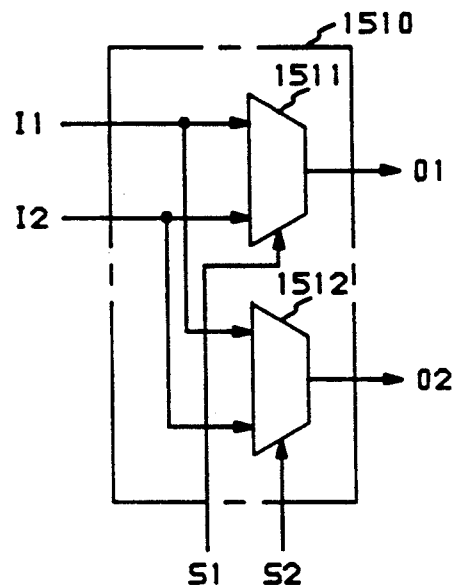
Figure 7:
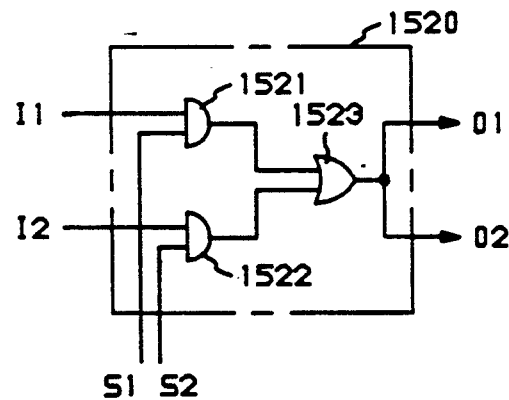
Figure 8:
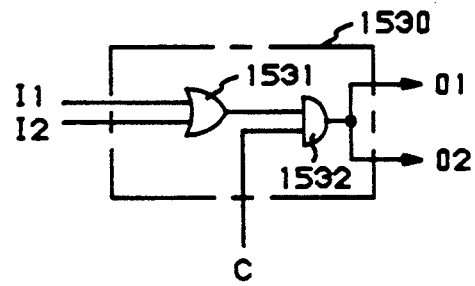
Figure 9:
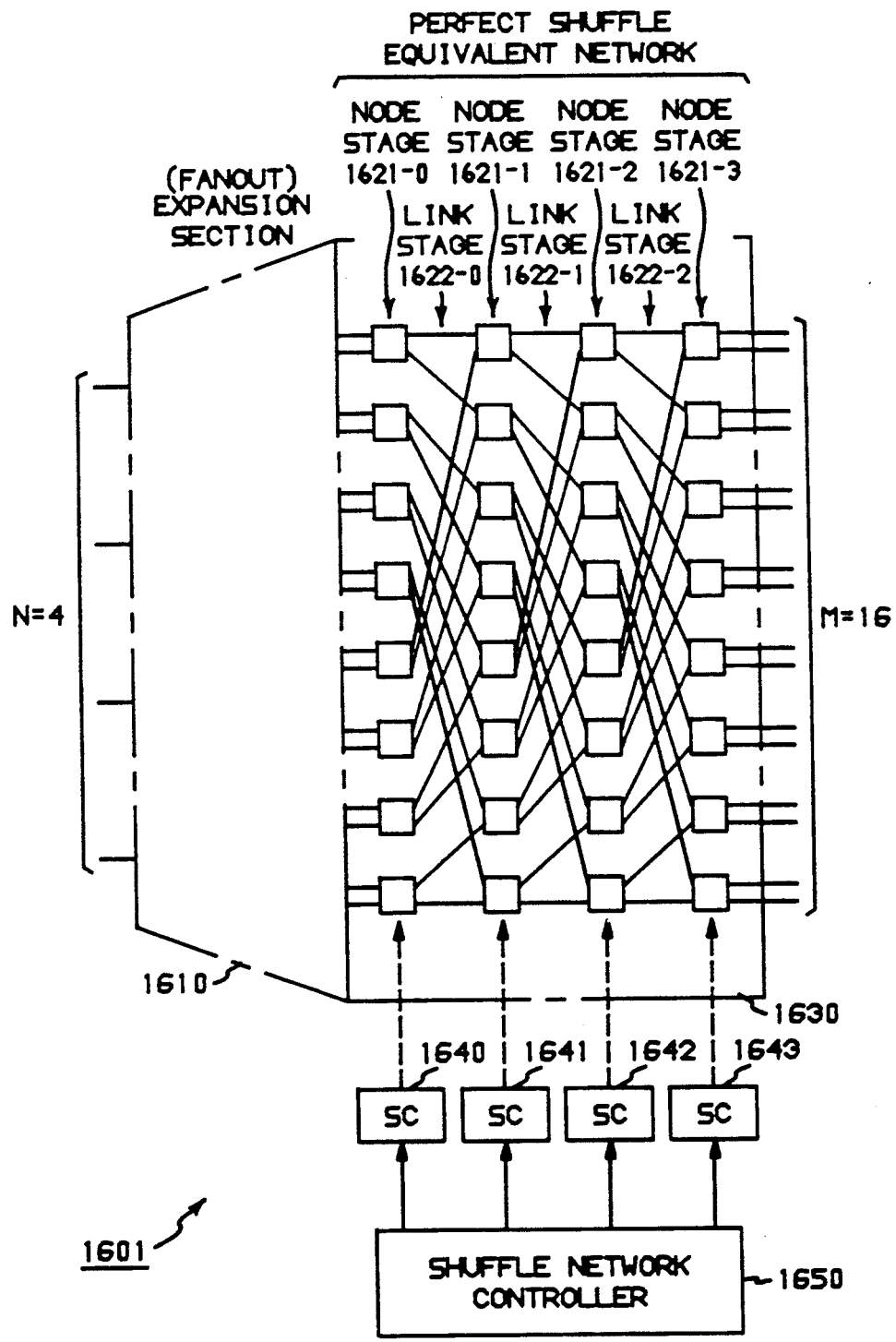
Figure 10:
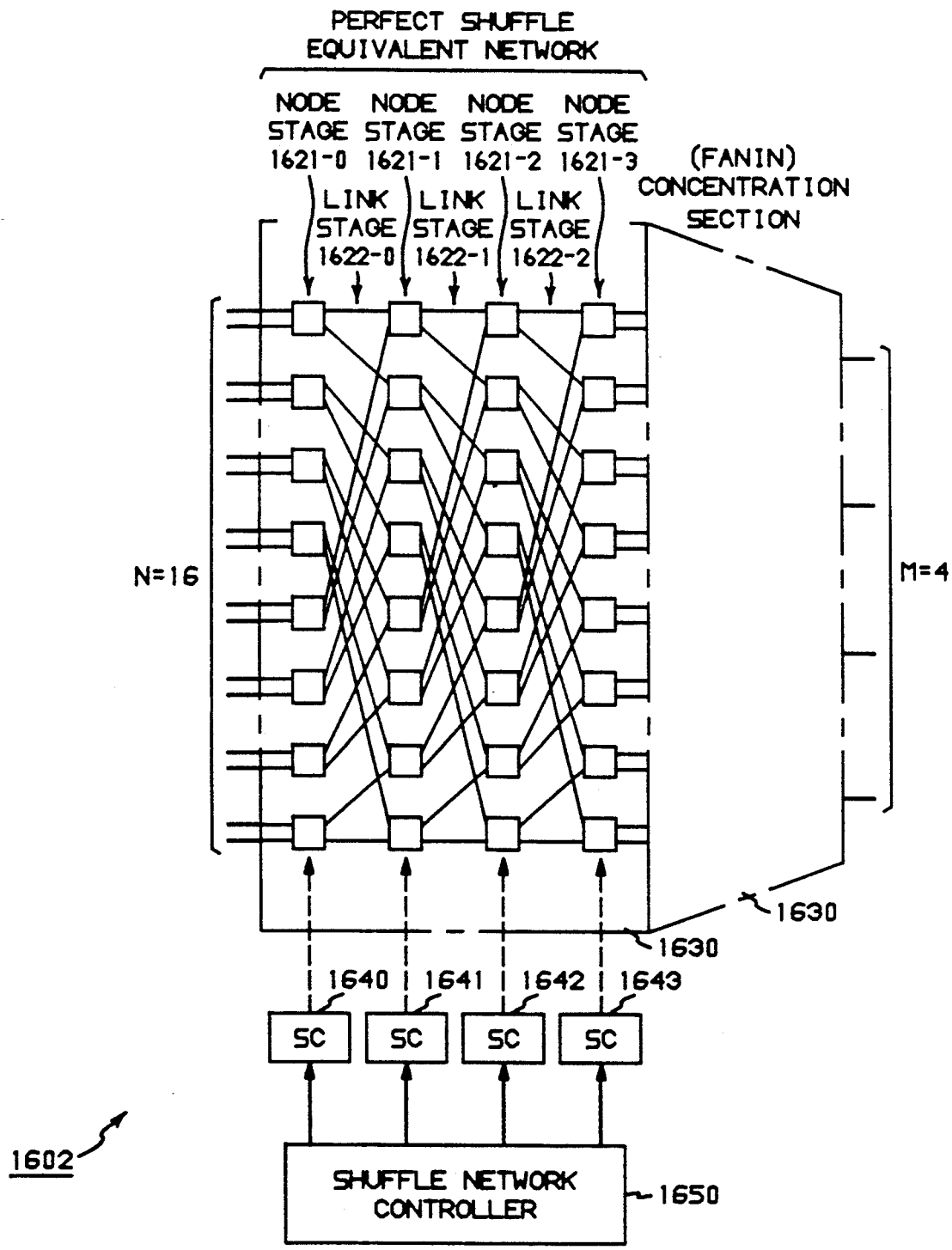
Figure 11:
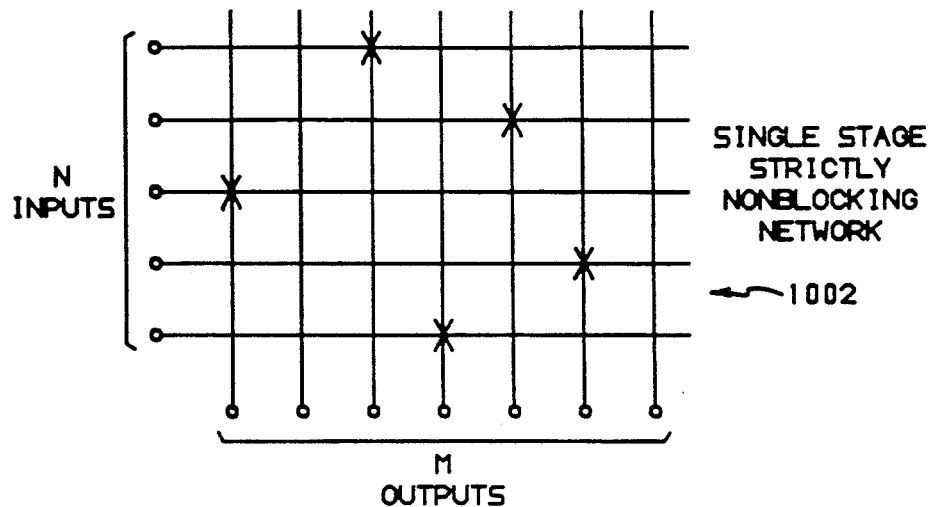
Figure 12:
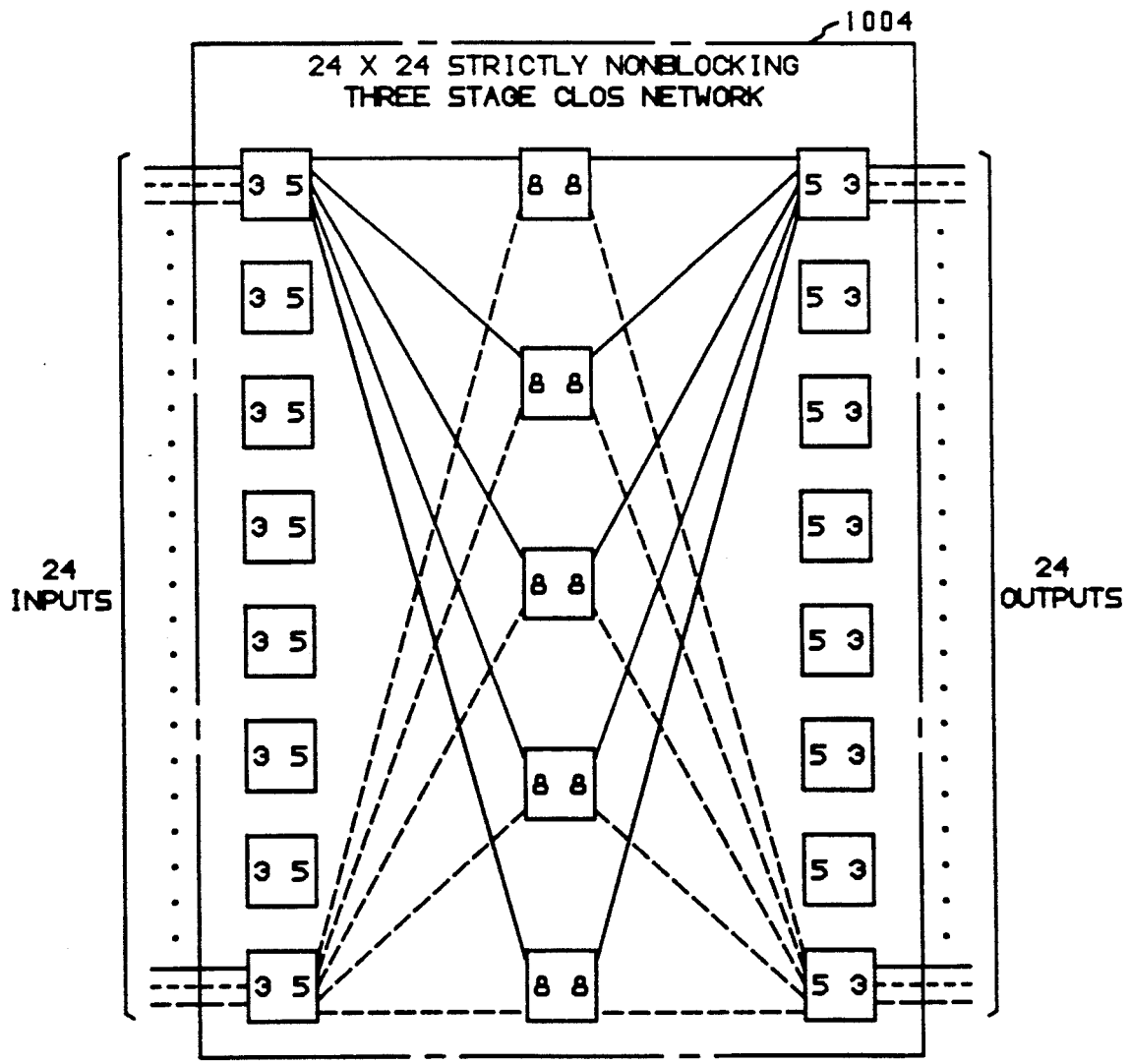
Figure 13:
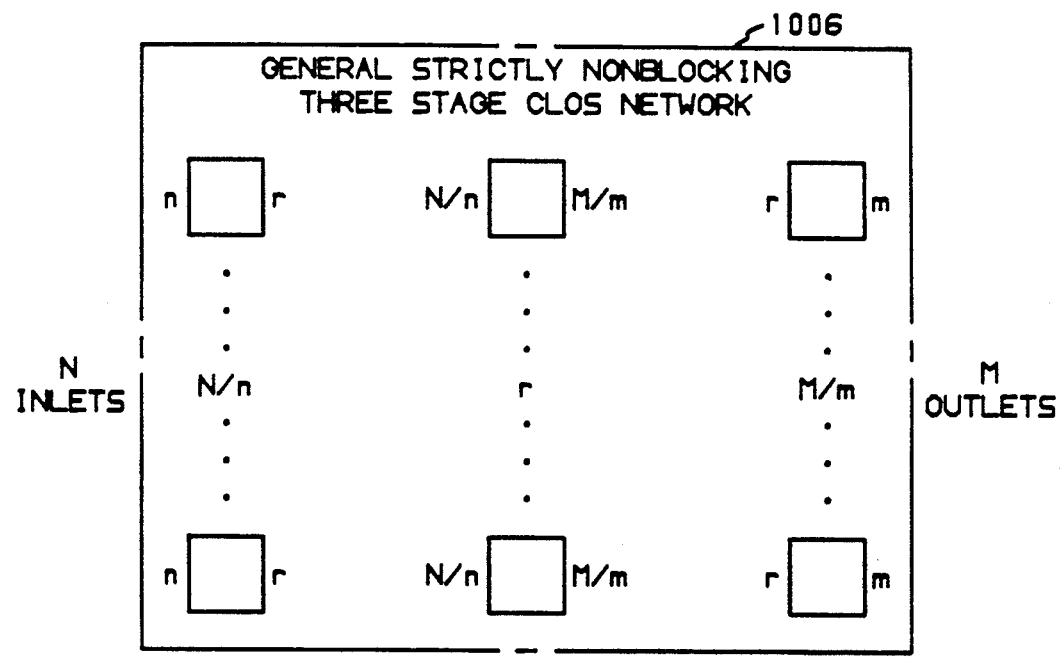
Figure 14:
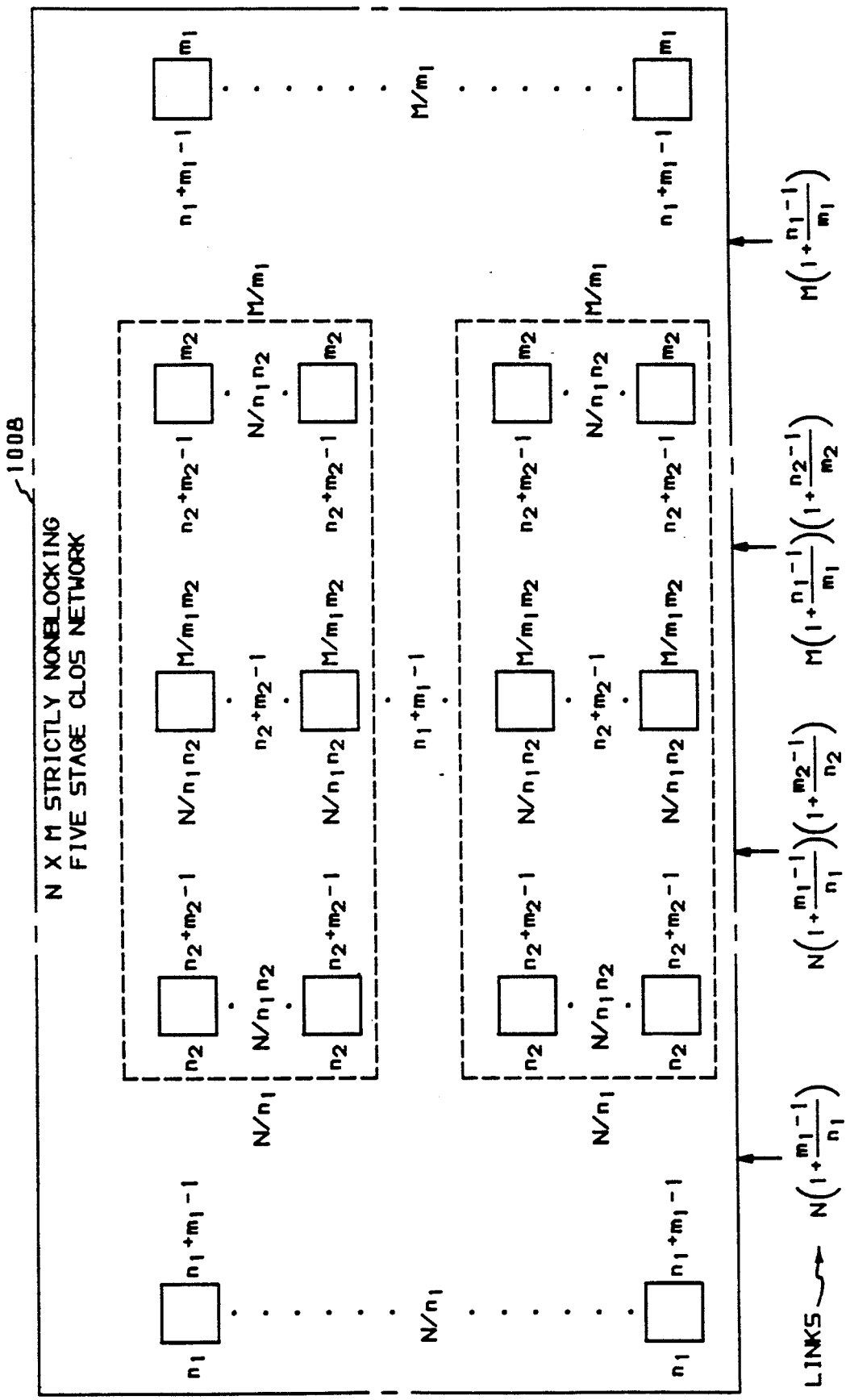
Figure 15:
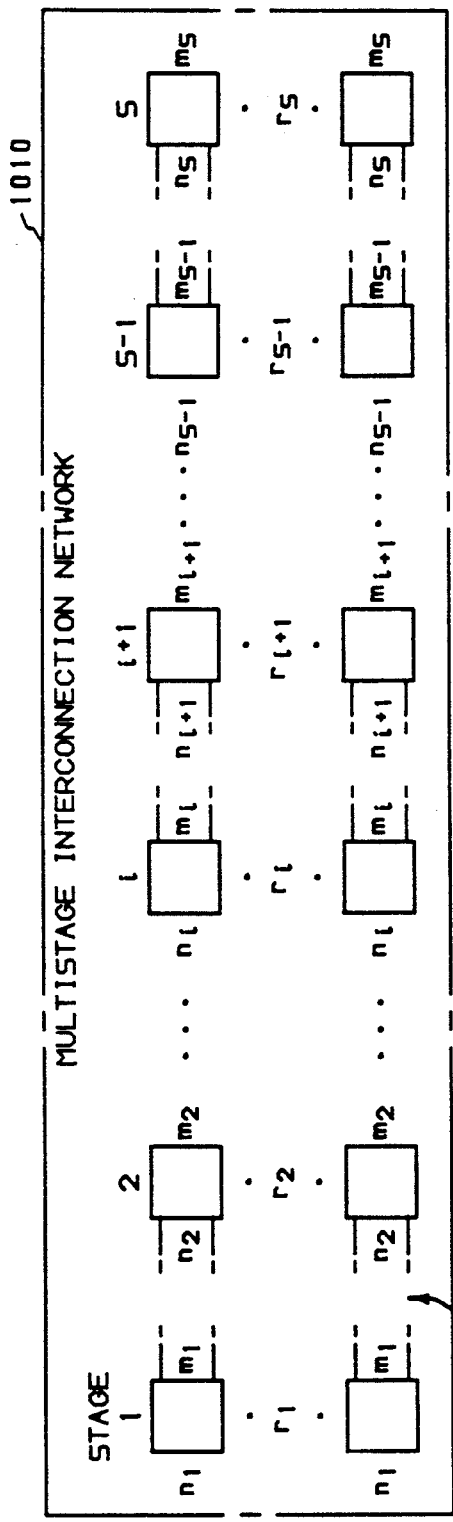
Figure 16:
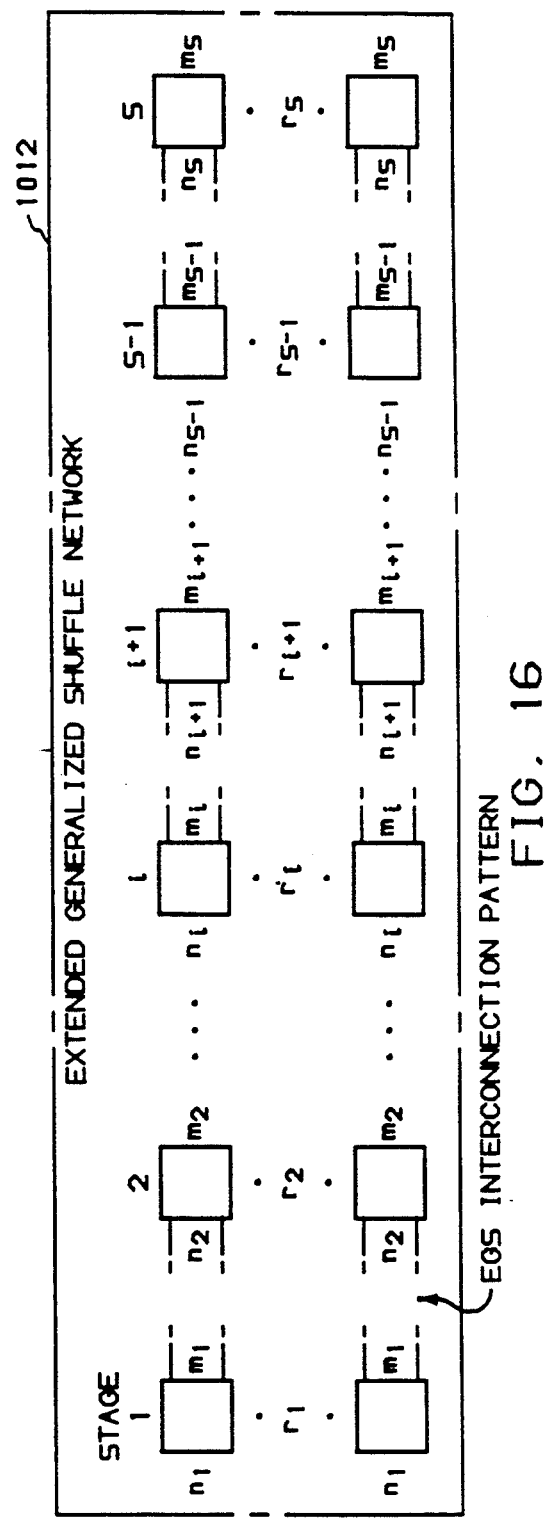
Figure 17:
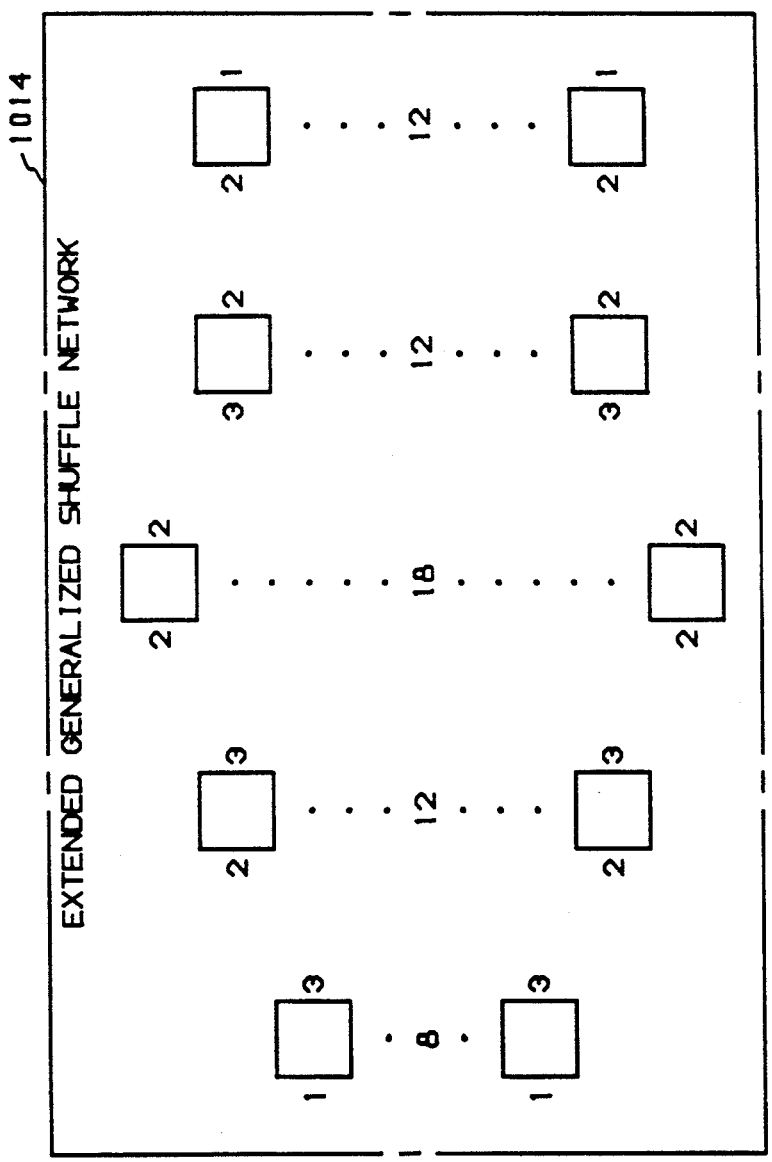
Figure 18:
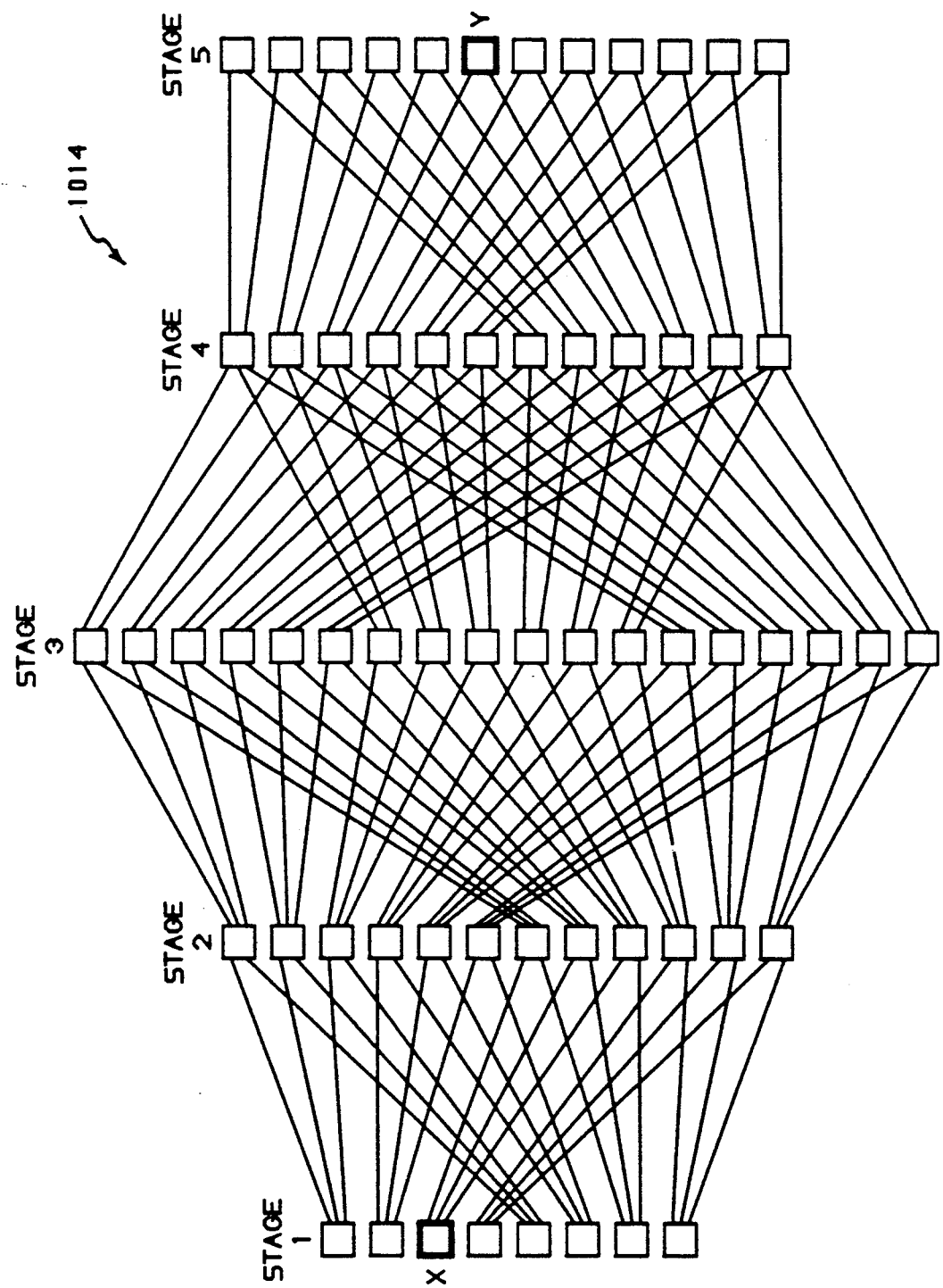
Figure 19:
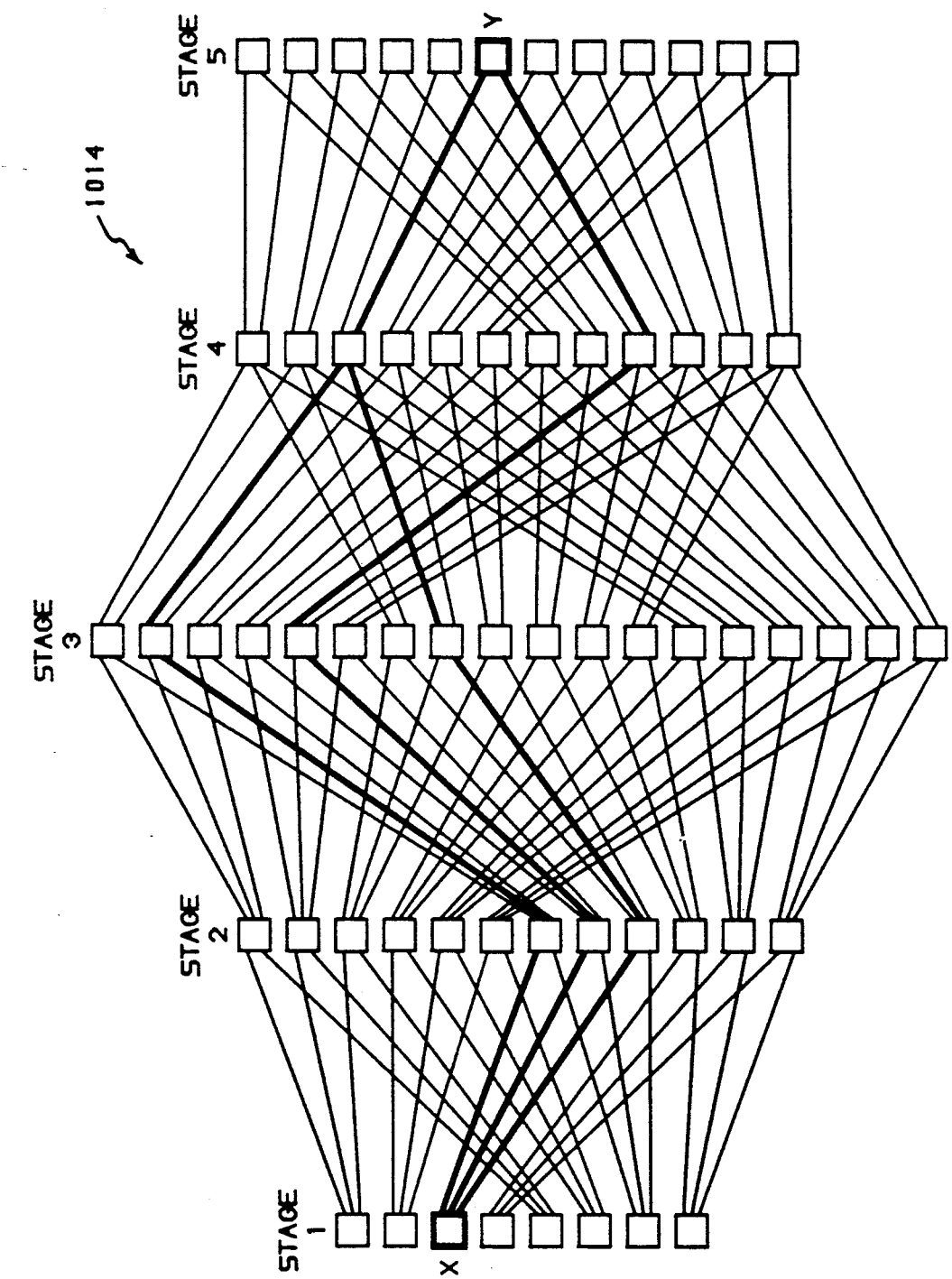
Figure 20:
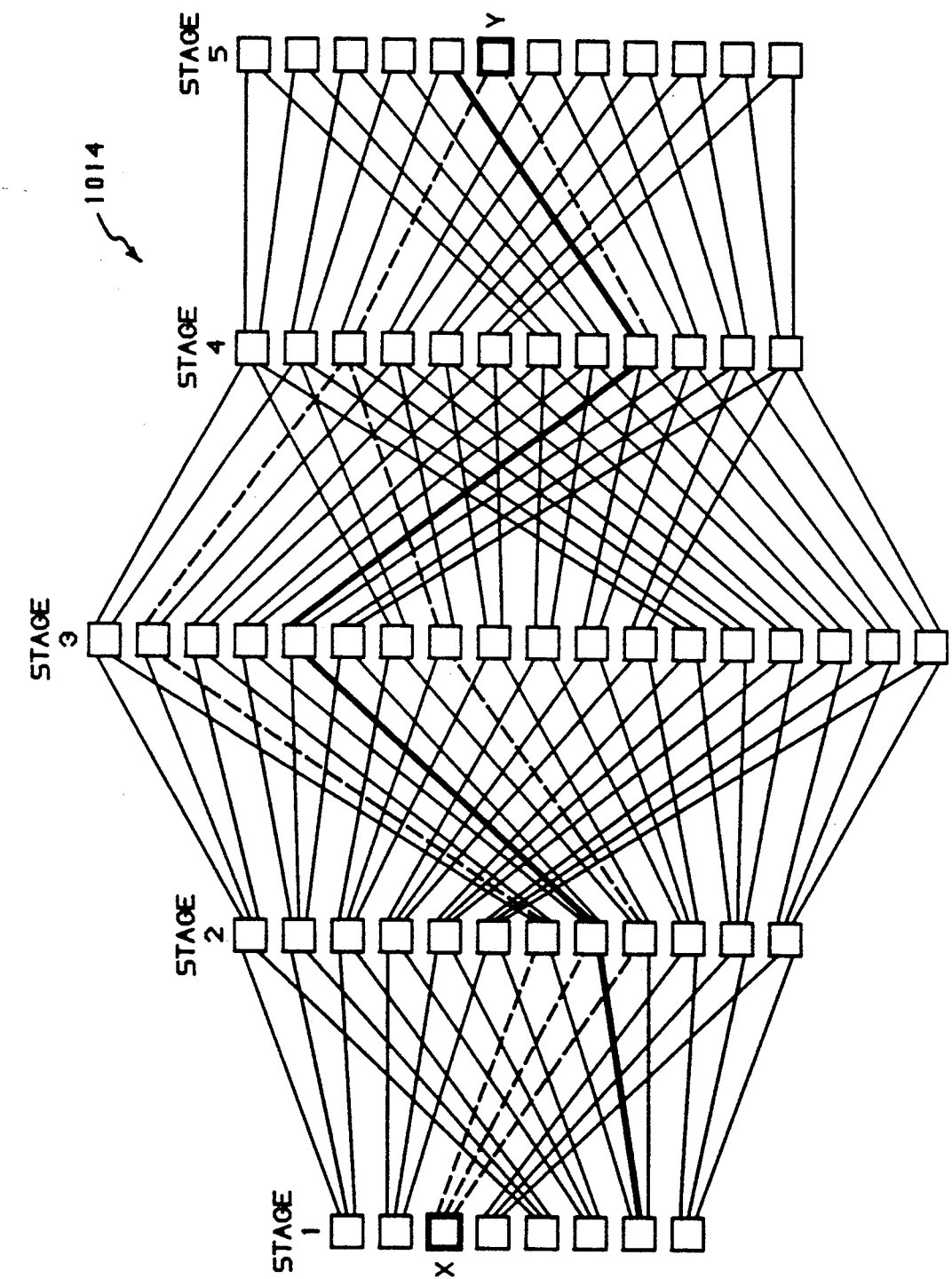
Figure 21:
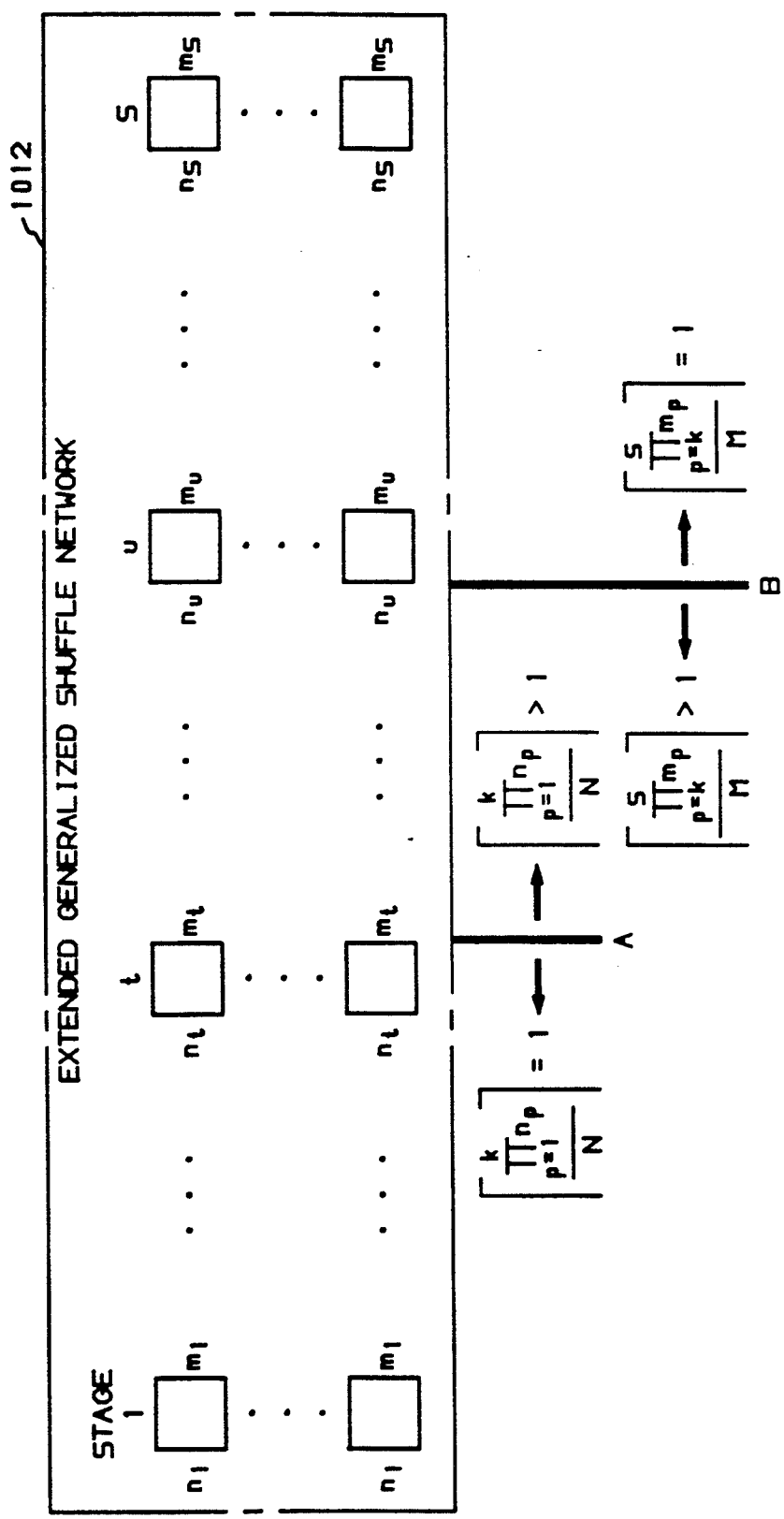
Figure 22:
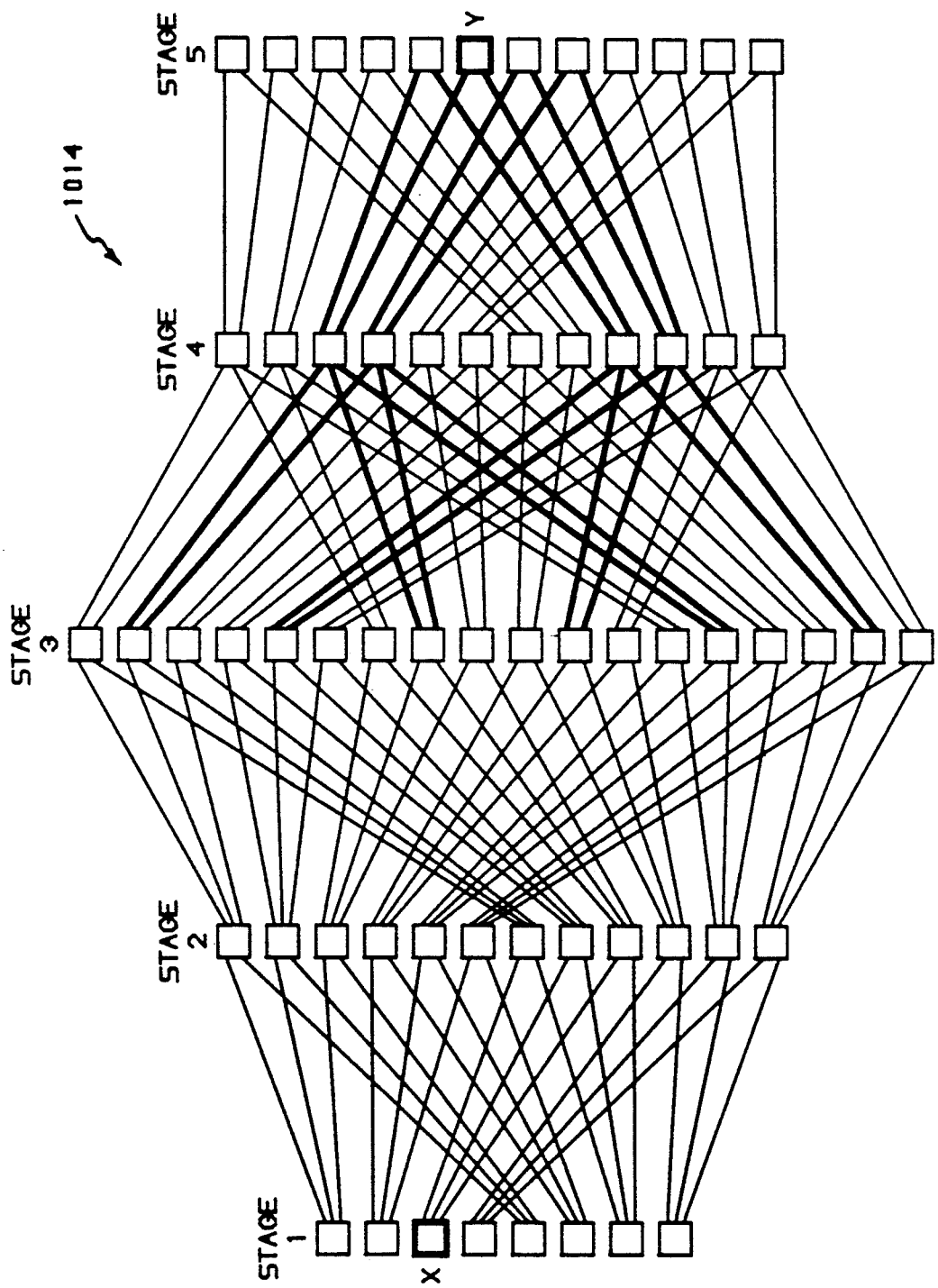
Figure 23:
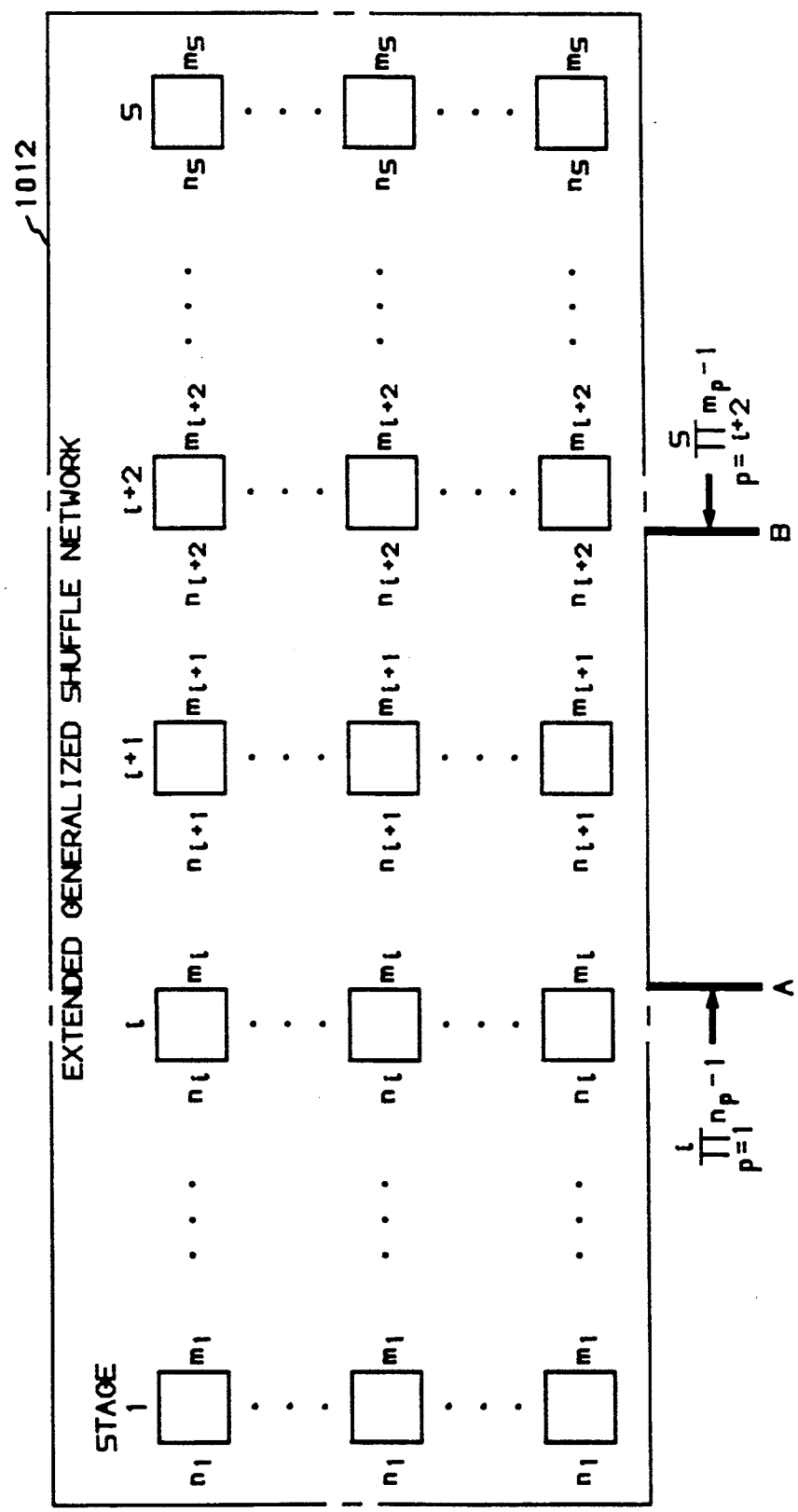
Figure 24:
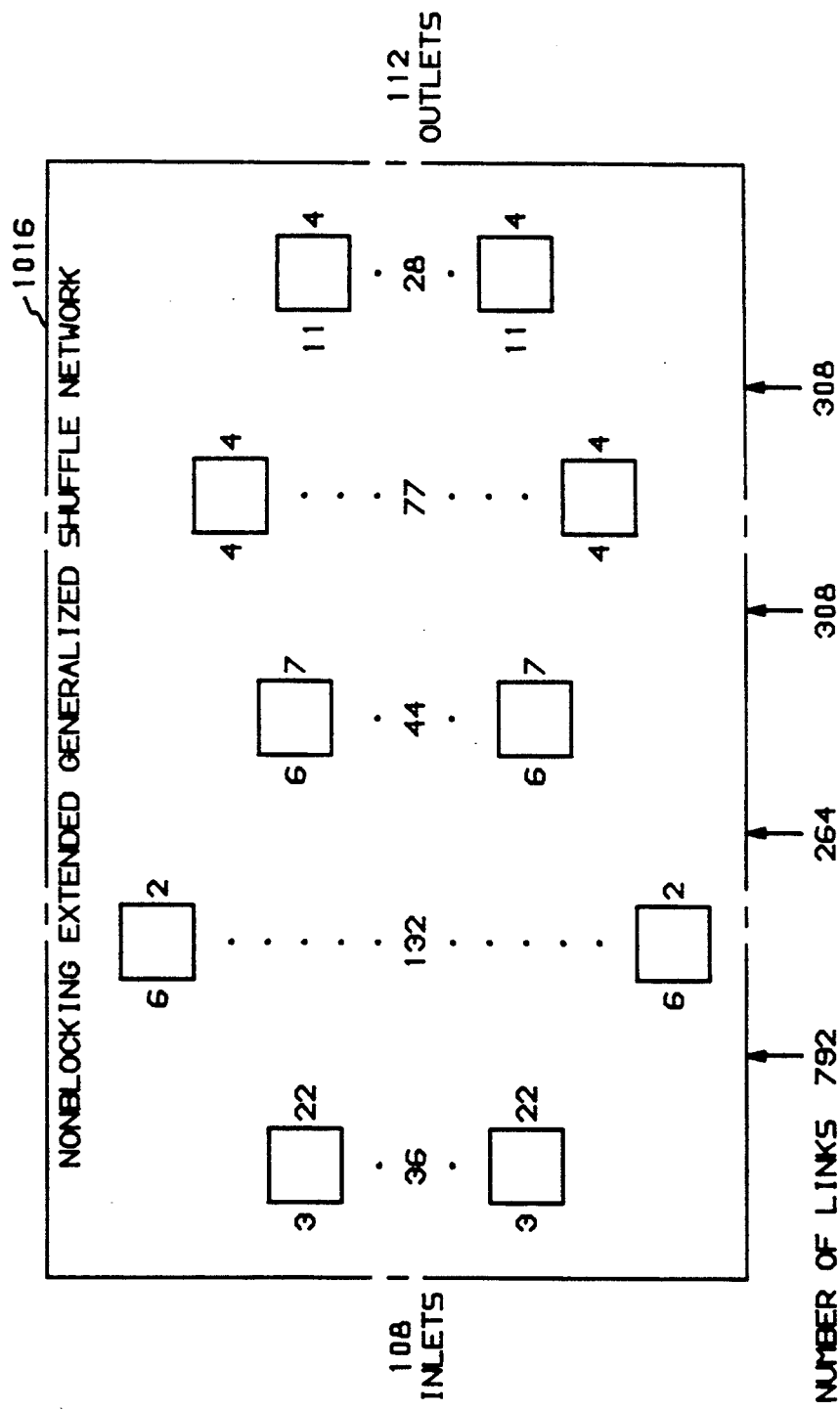
Figure 25:
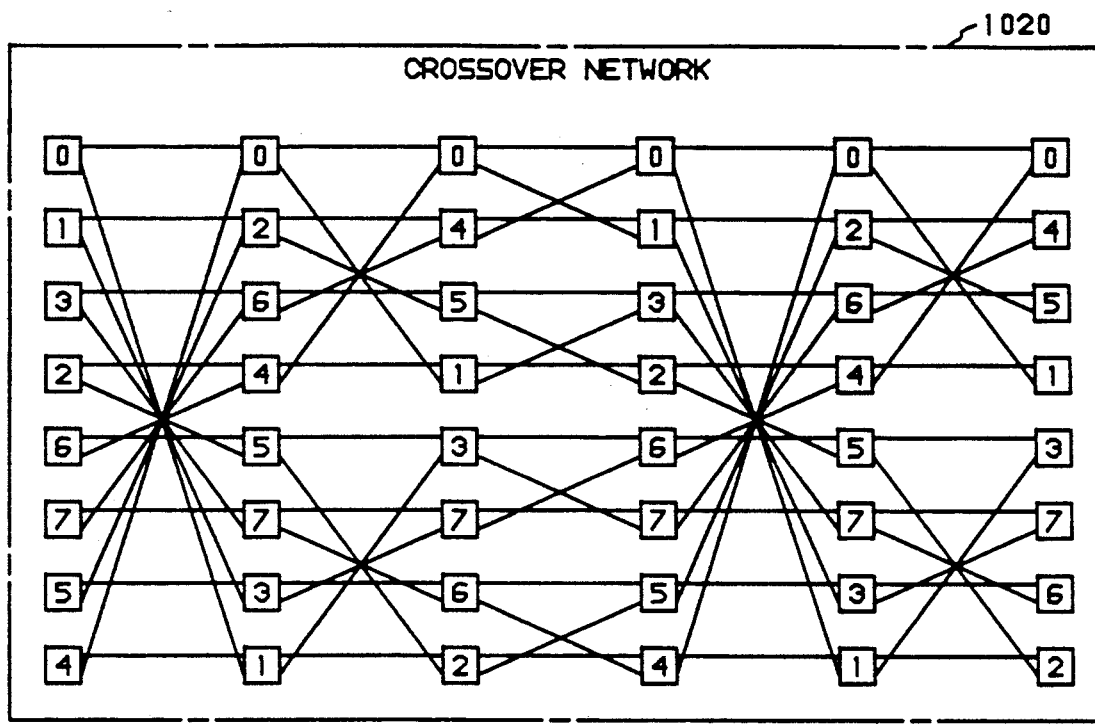
Figure 26:
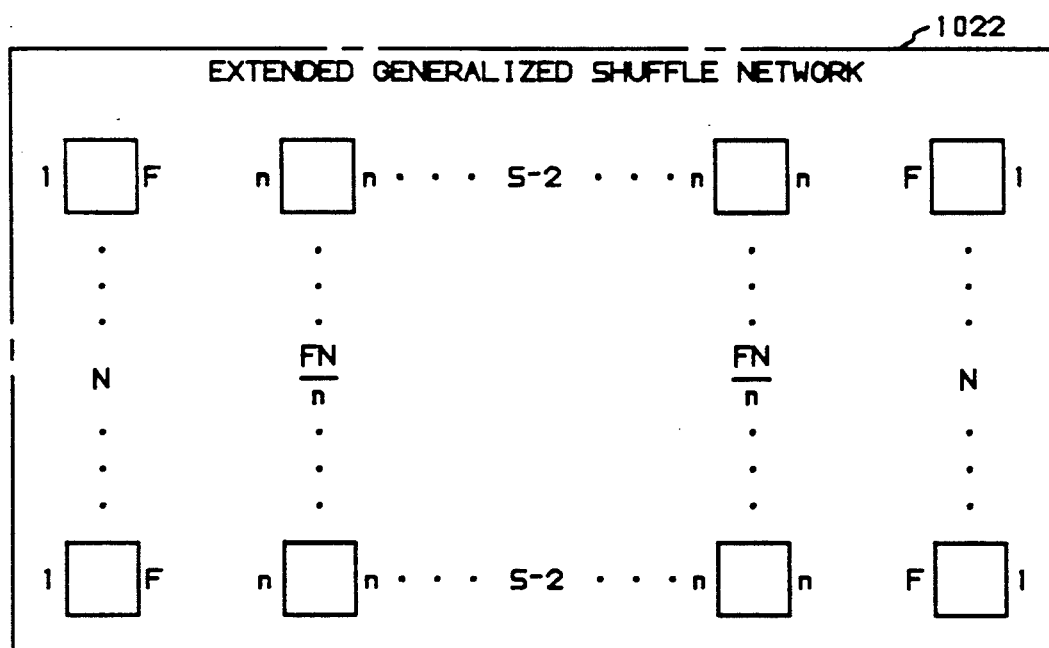
Figure 27:
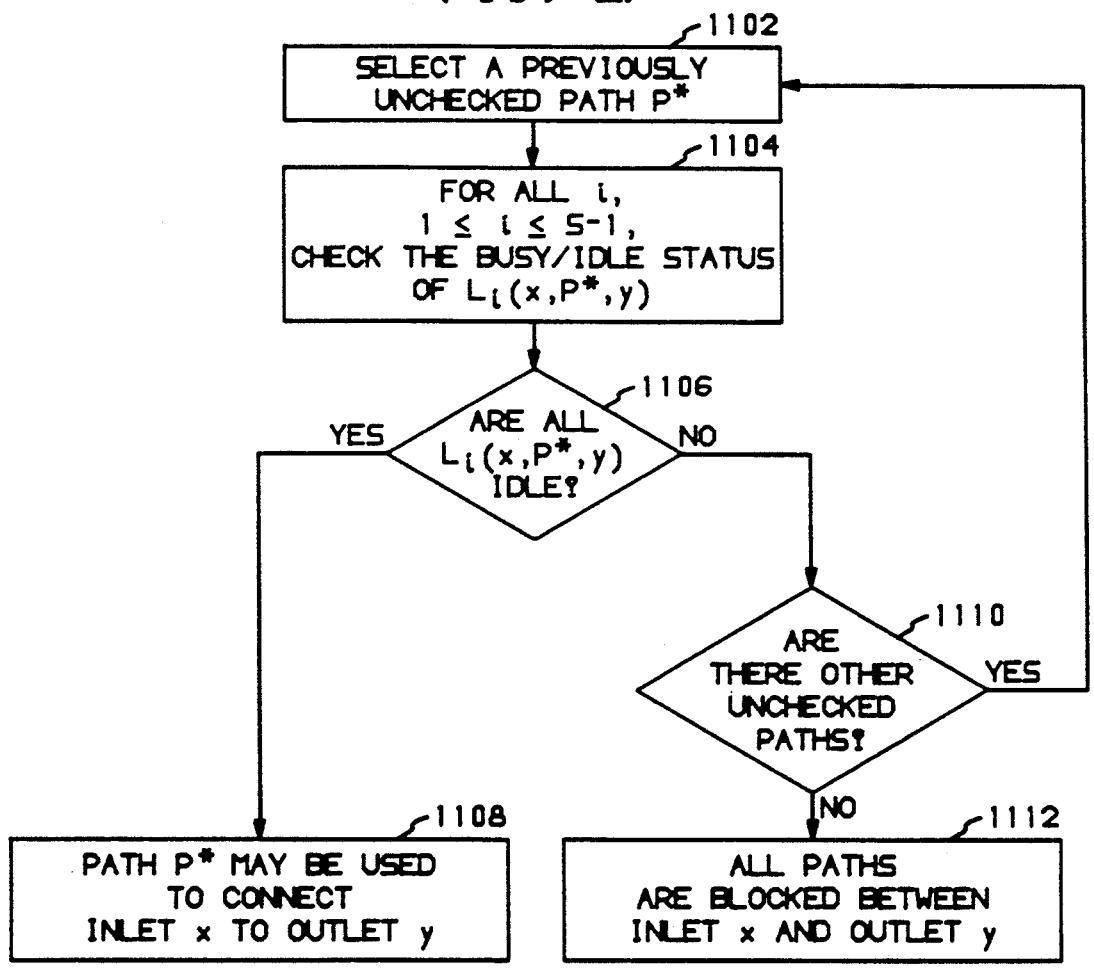
Figure 28:
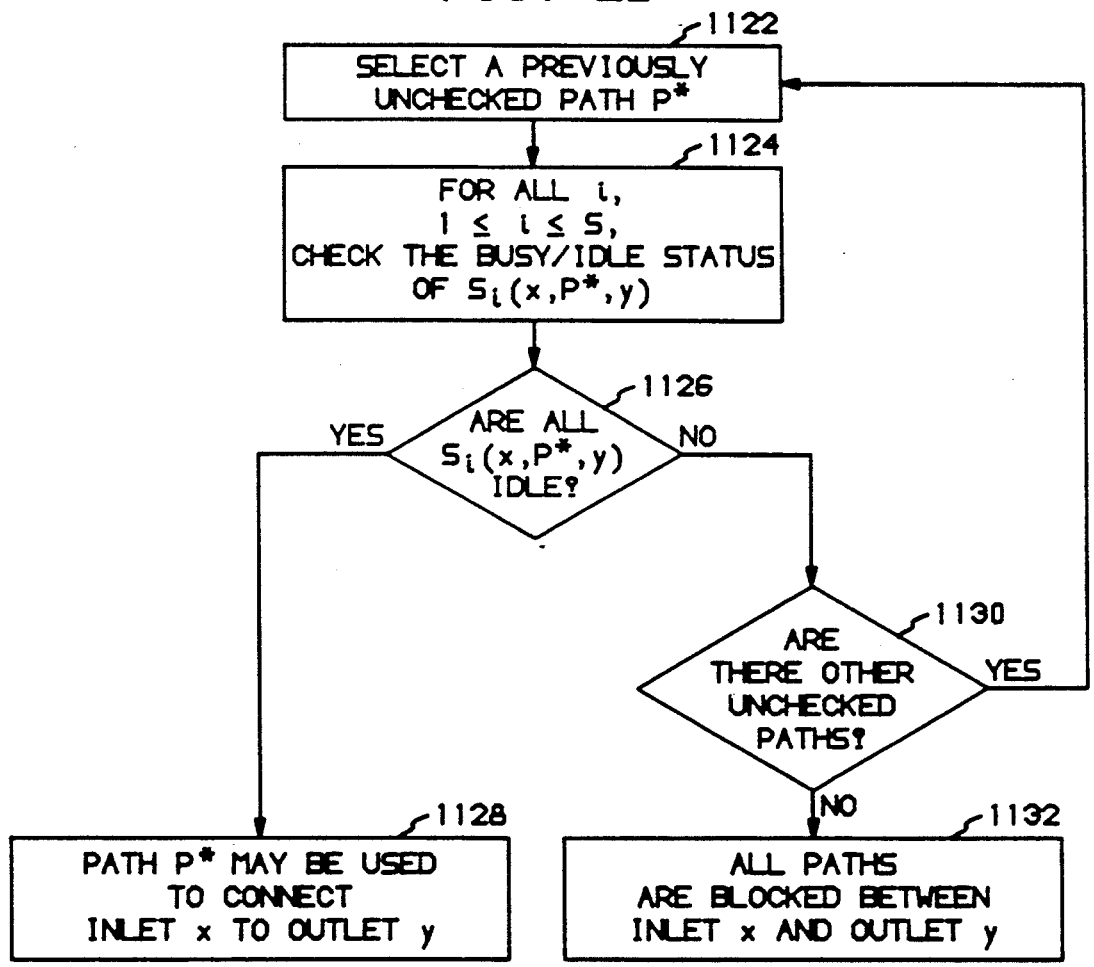
Figure 29:
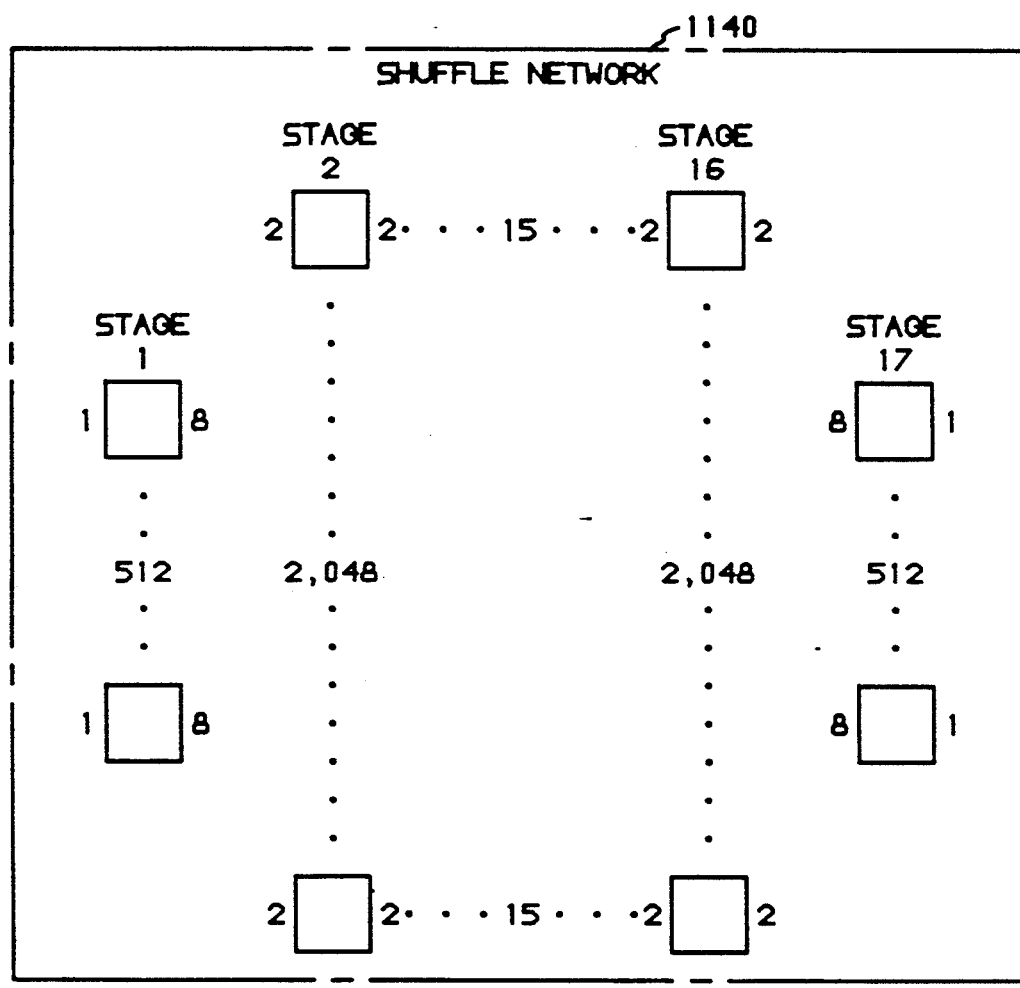
Figure 30:
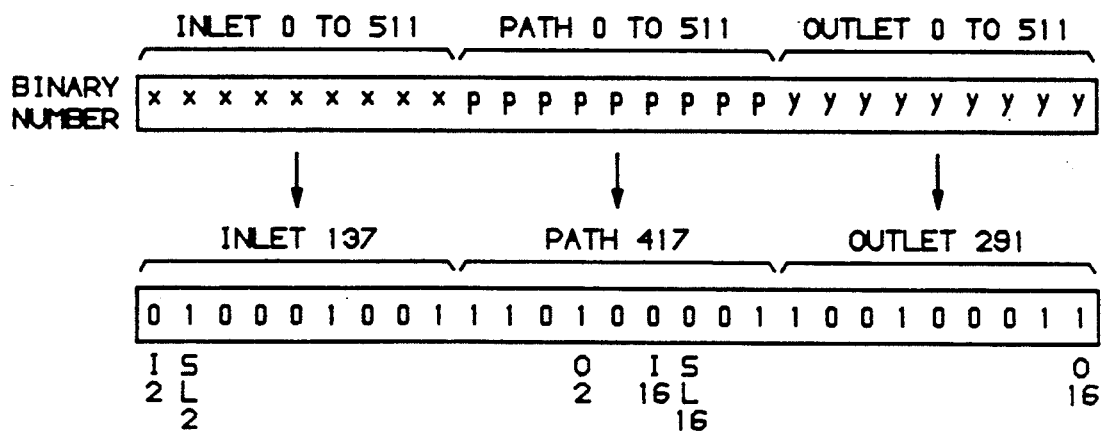
Figure 31:
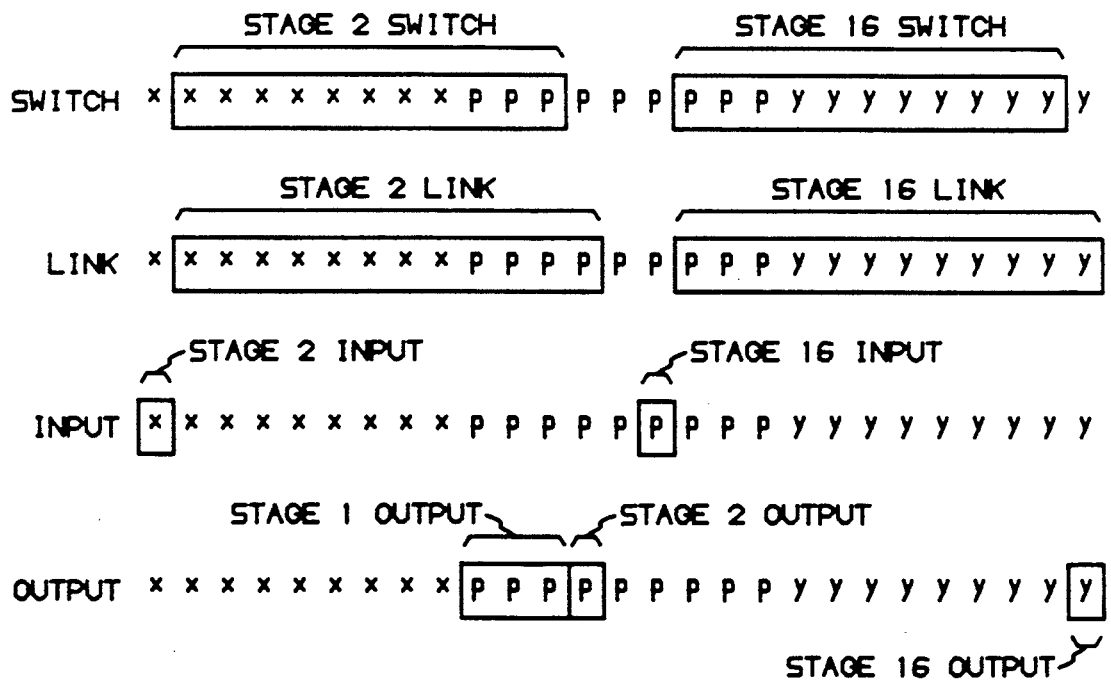
Figure 32:
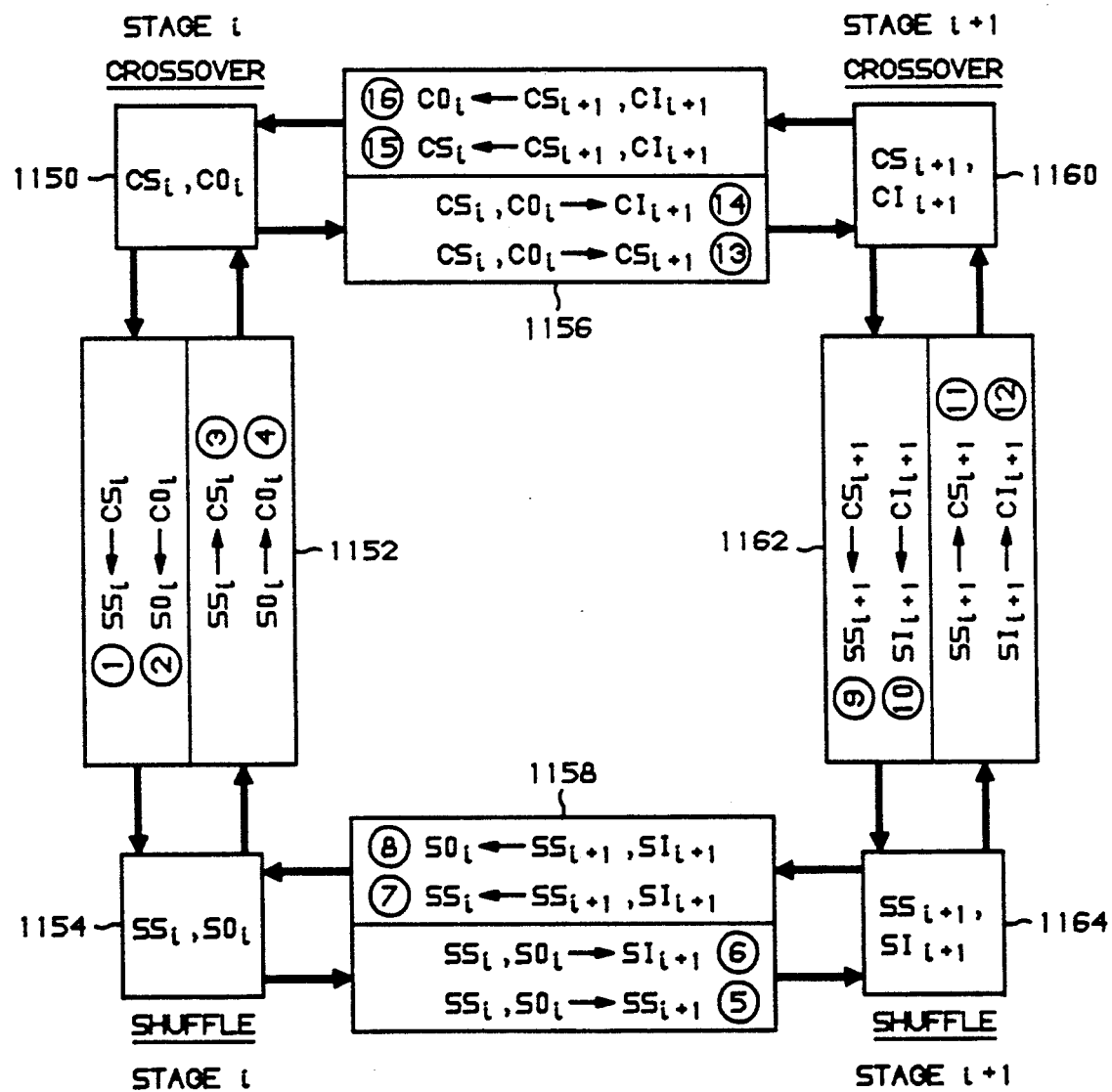
Figures 33, 34:
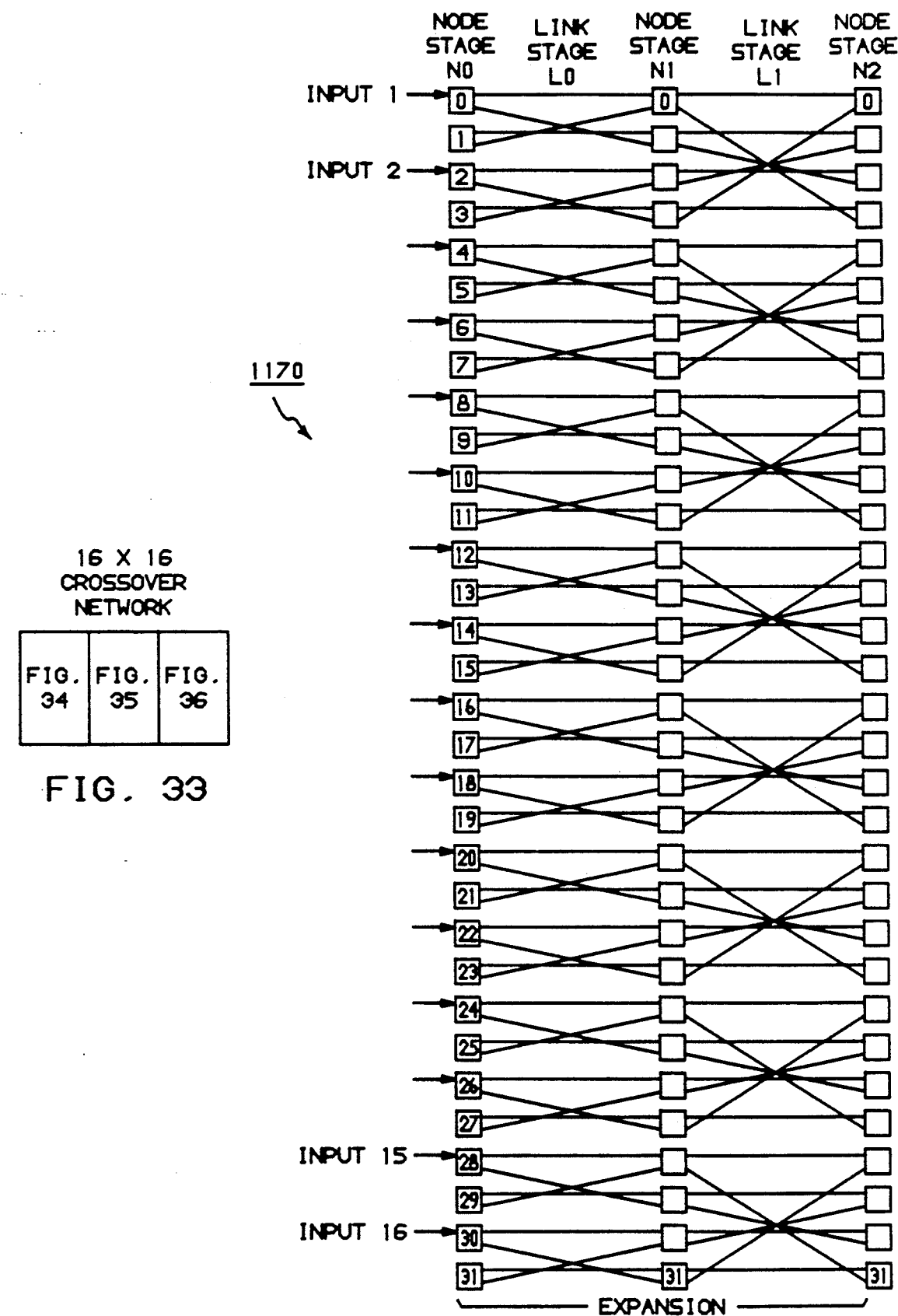
Figure 35:
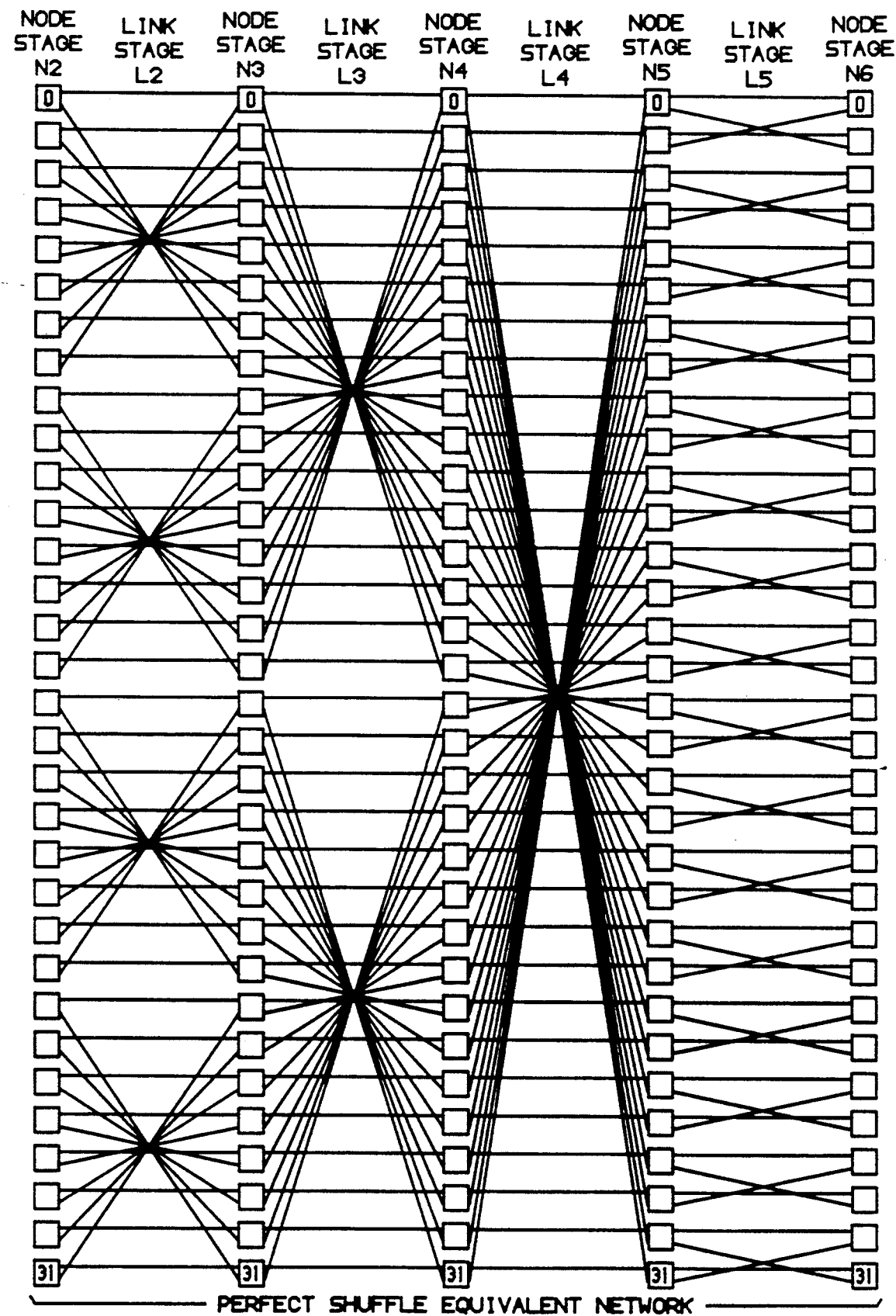
Figure 36:
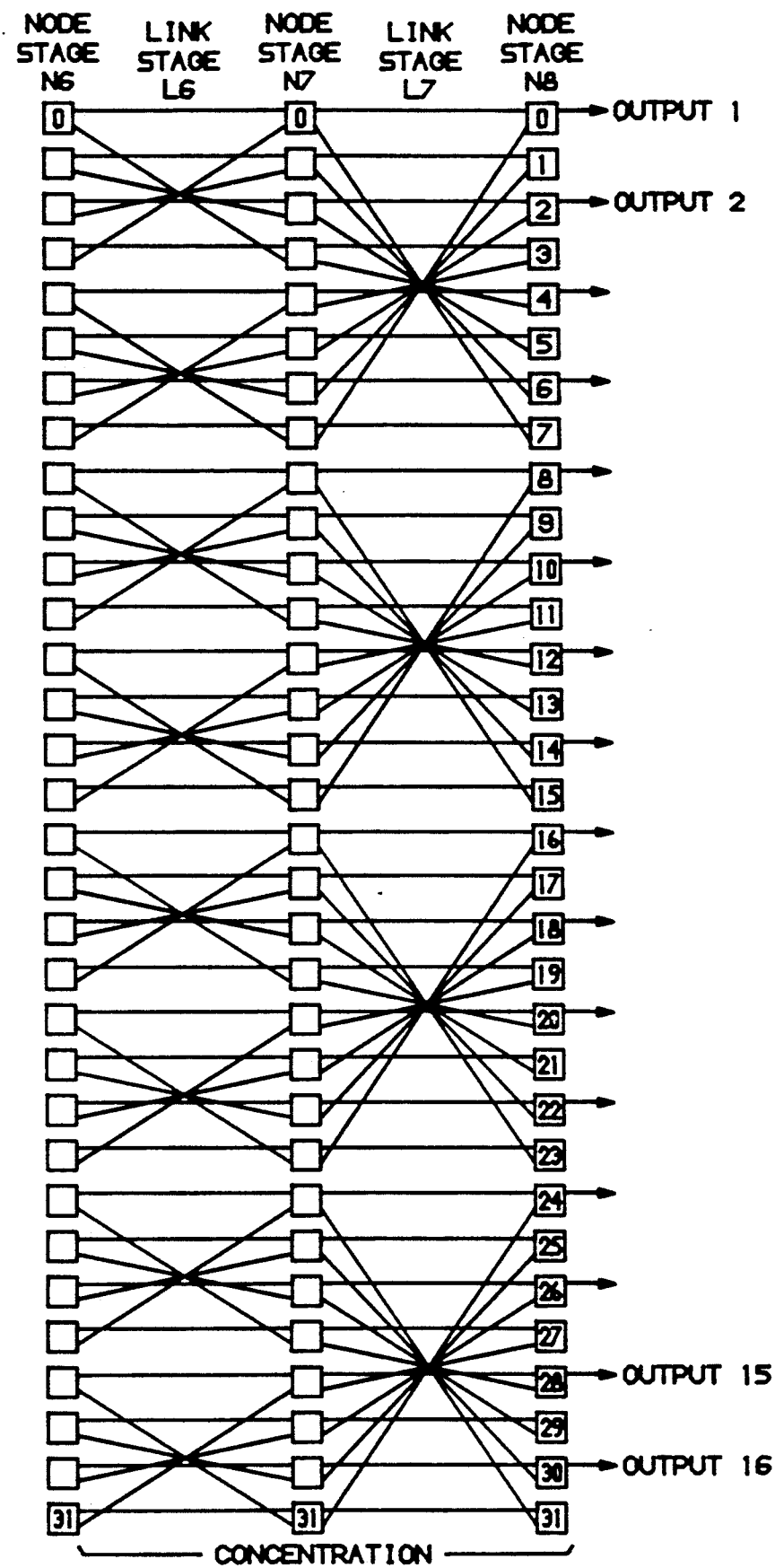
Figure 37:
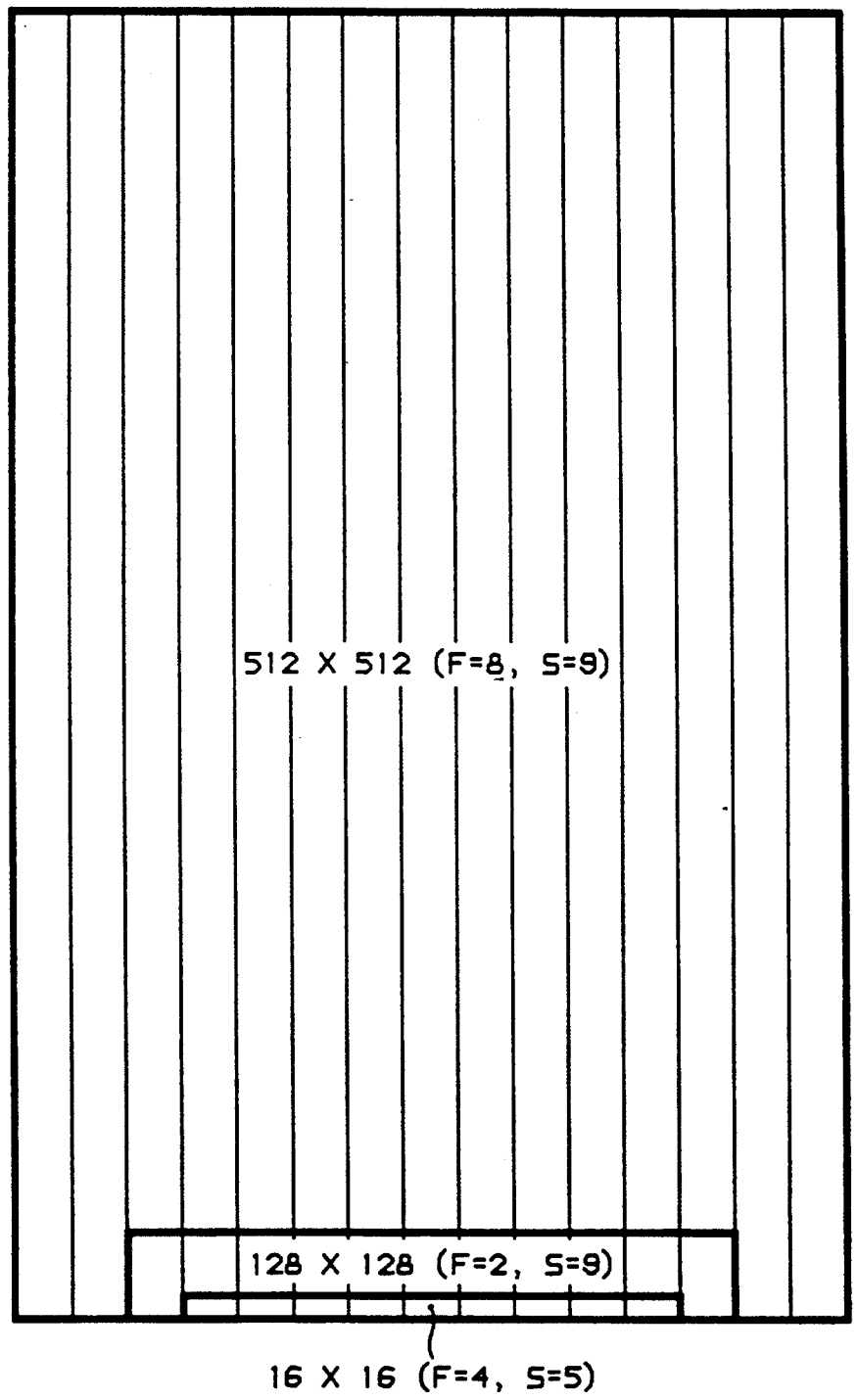
Figure 38:
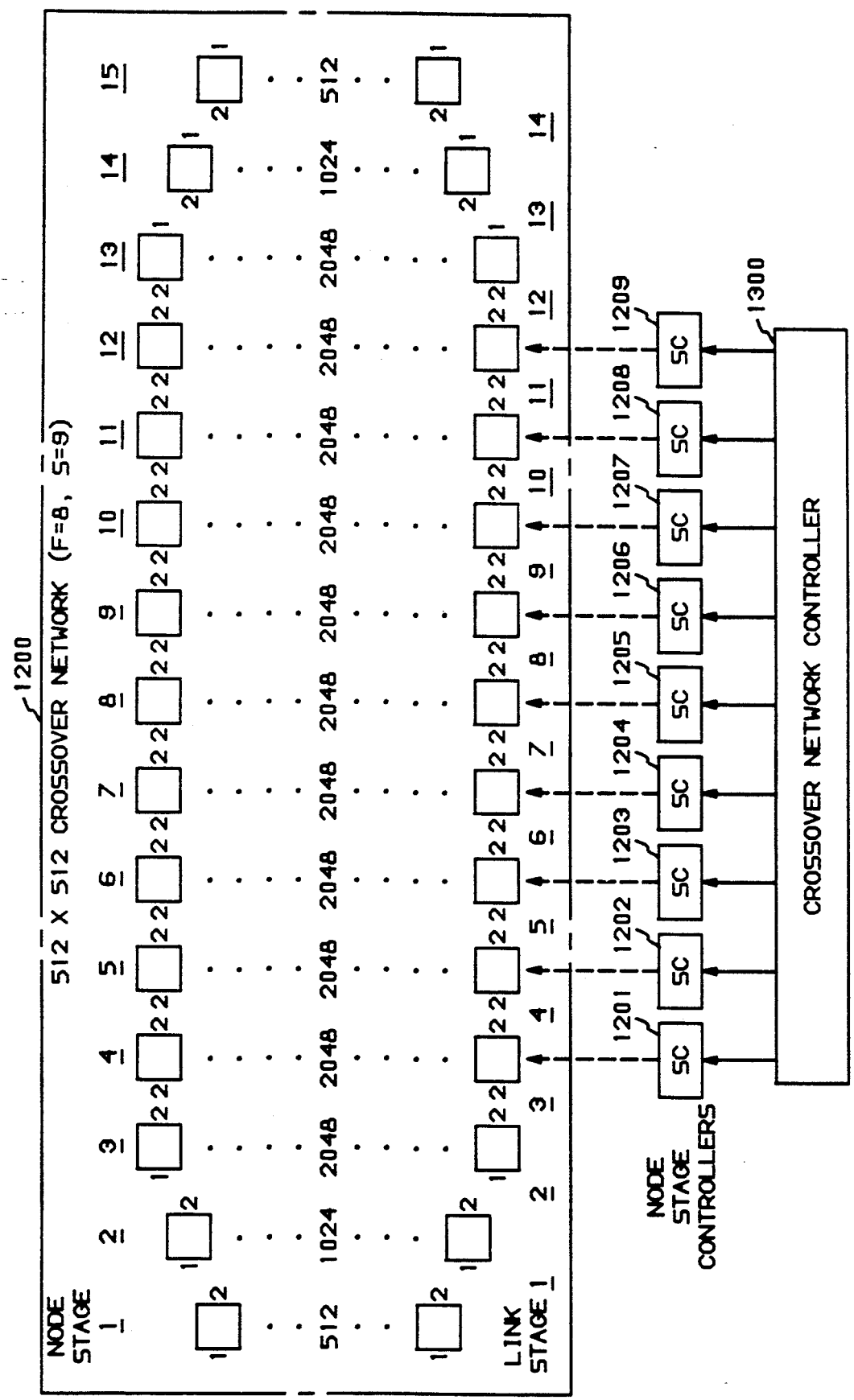
Figure 39:
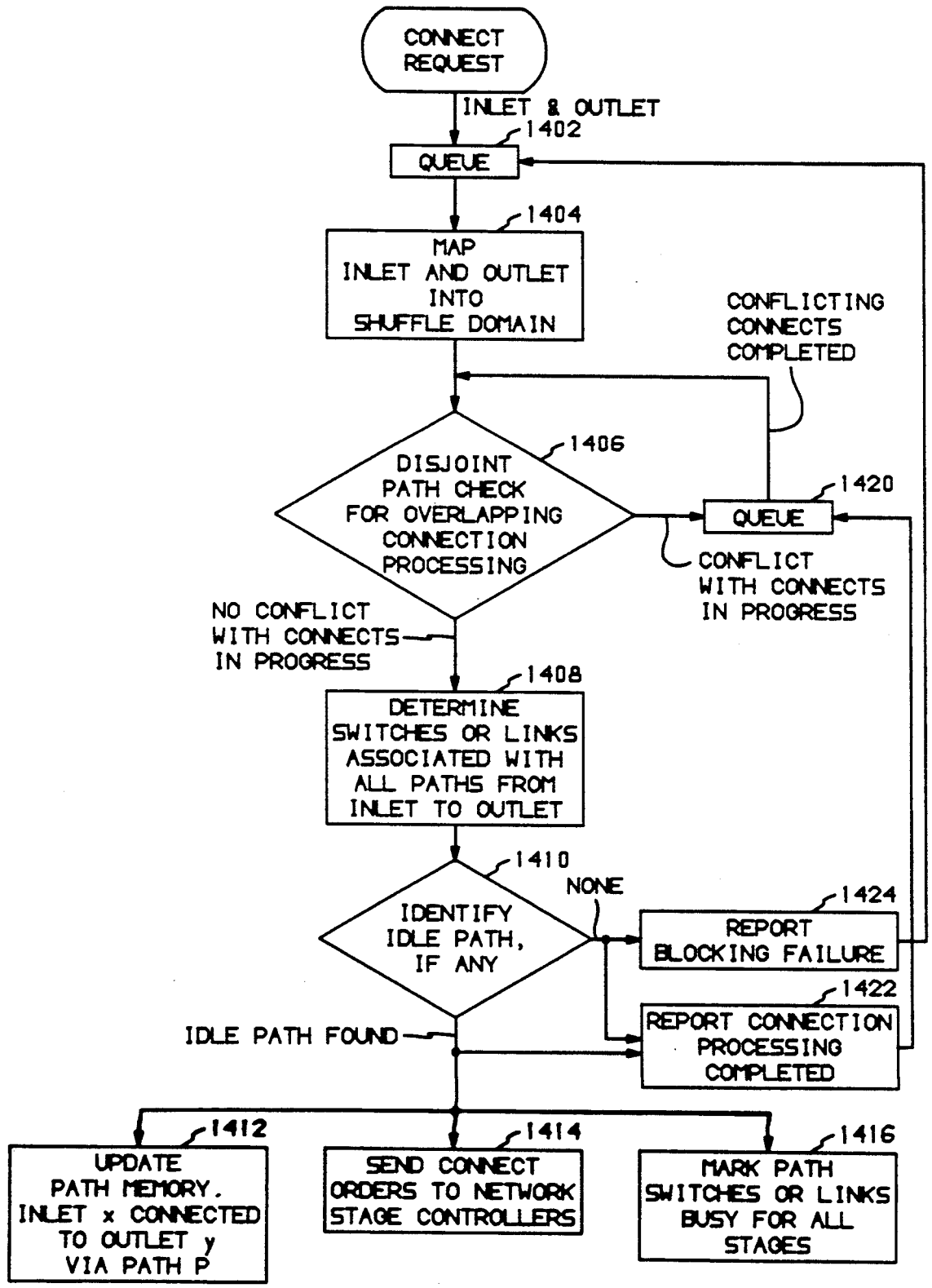
Figures 41, 42:
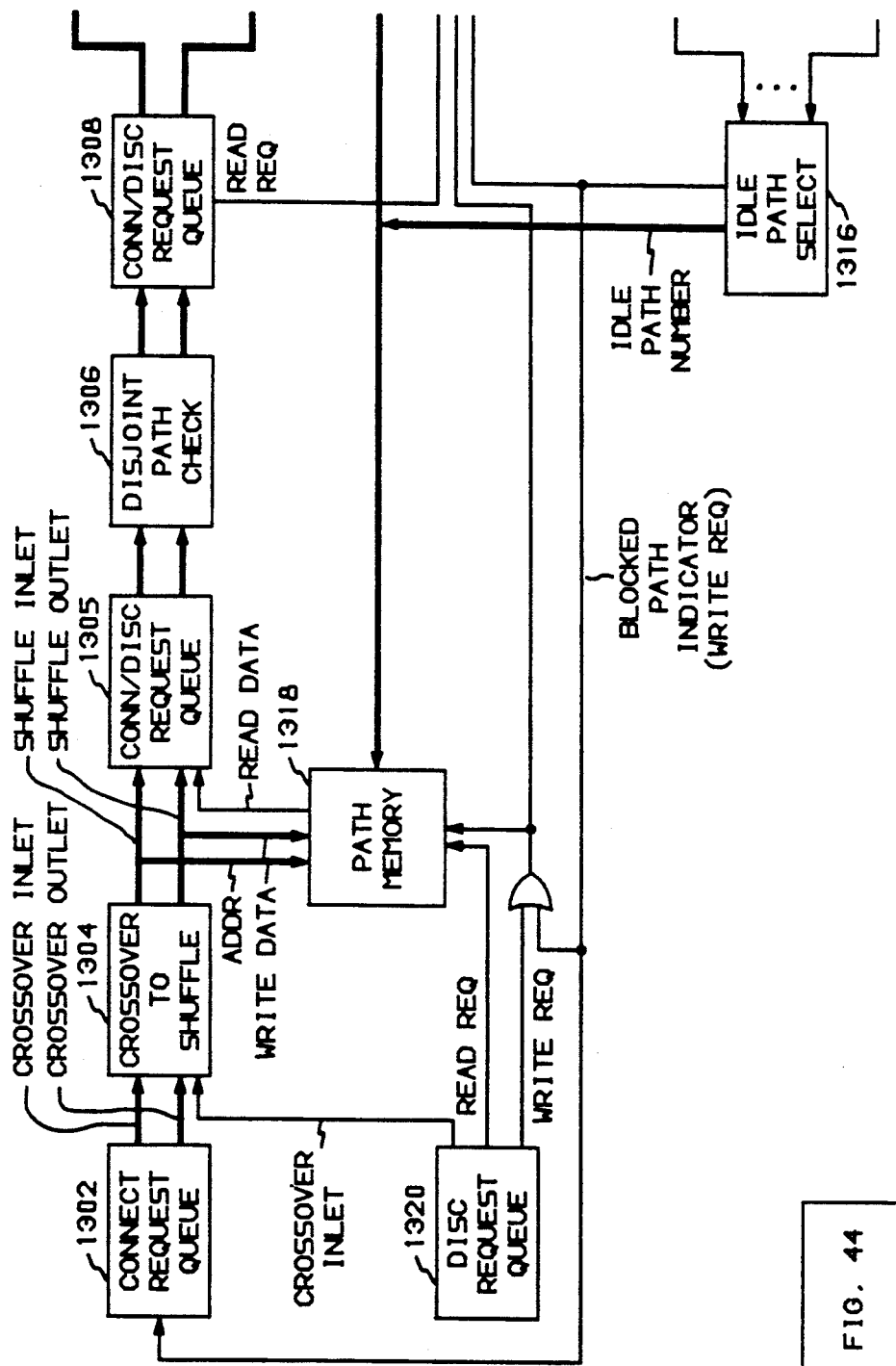
Figure 43:
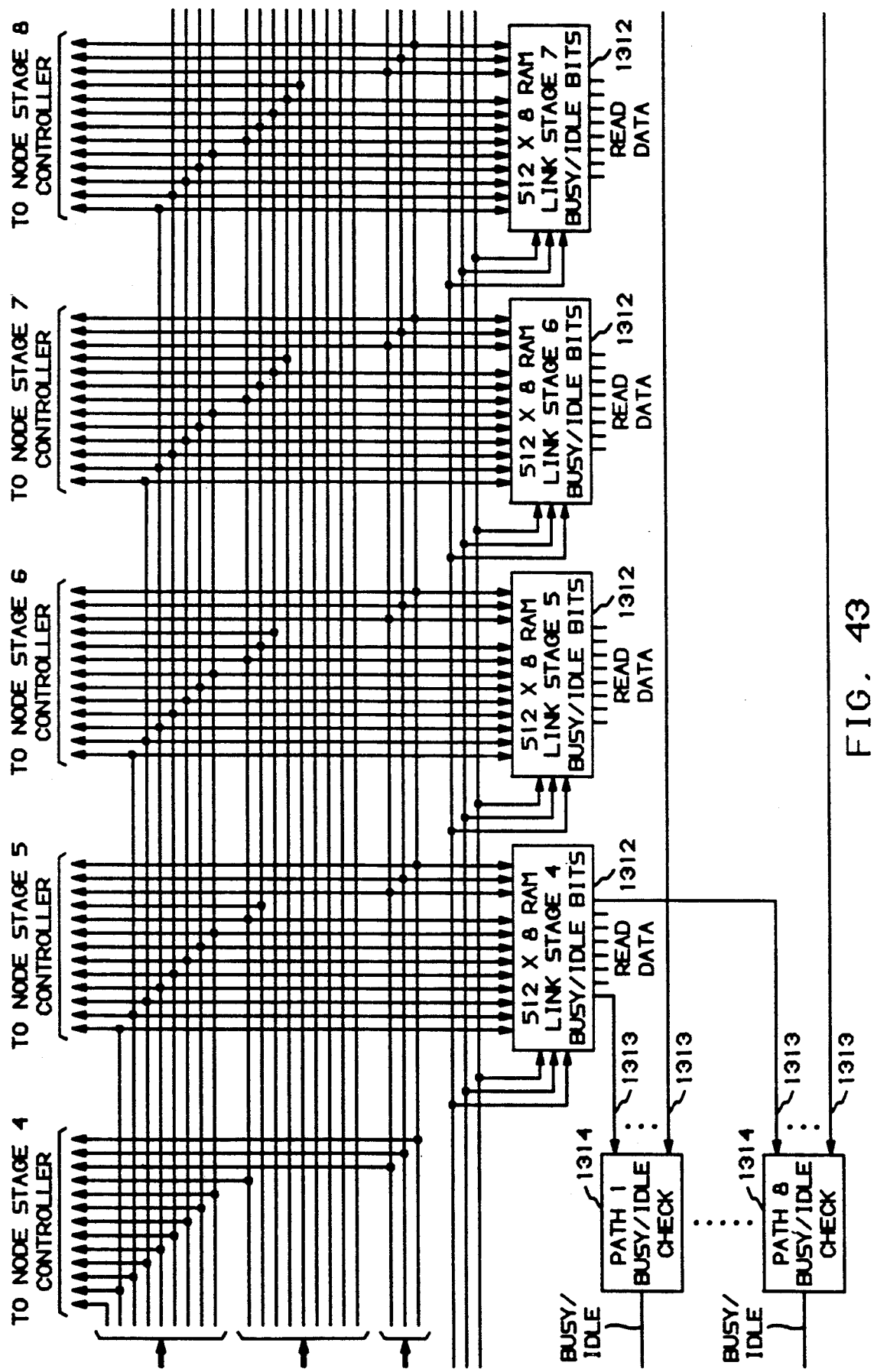
Figure 44:
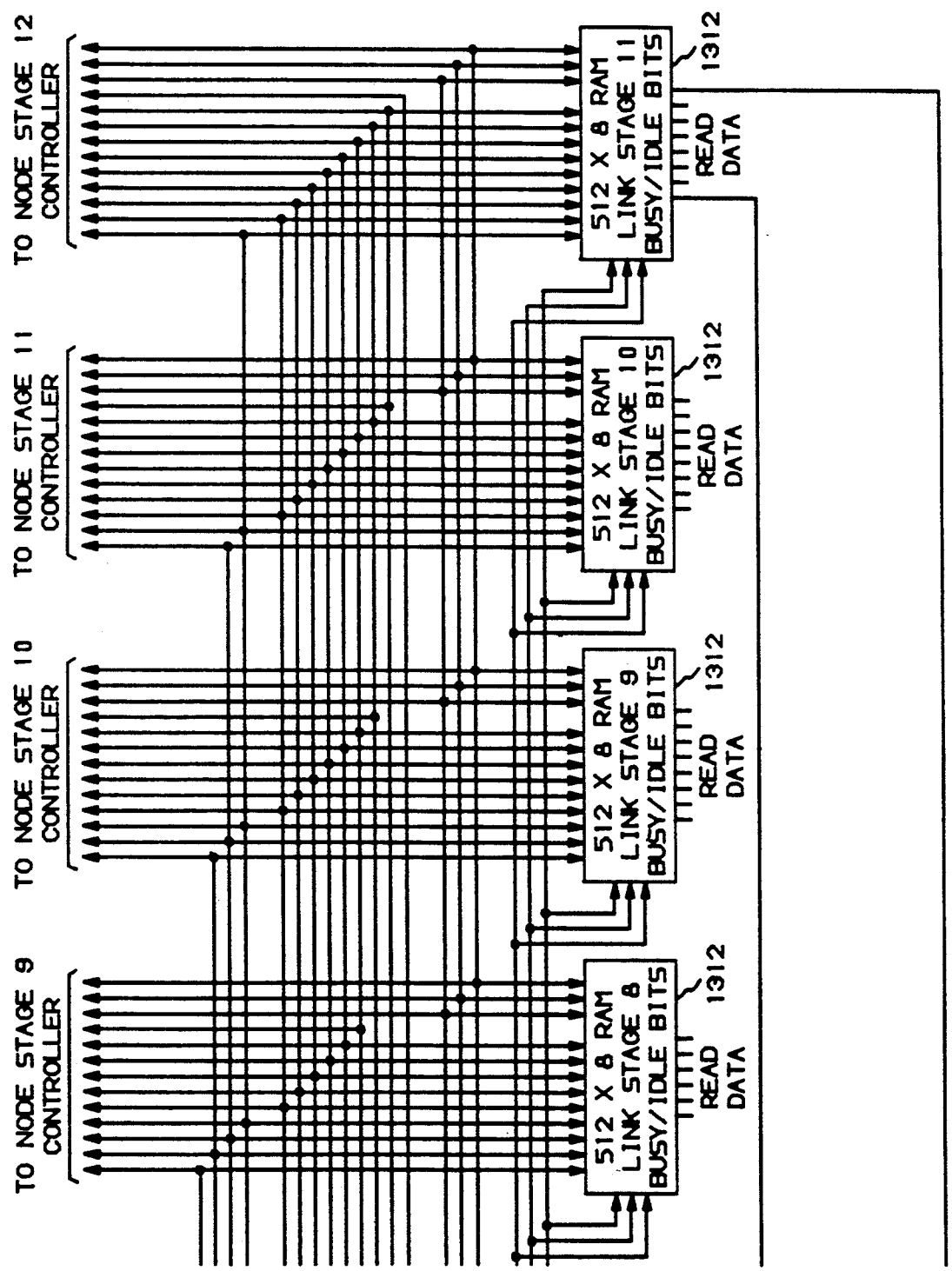
Figure 45:
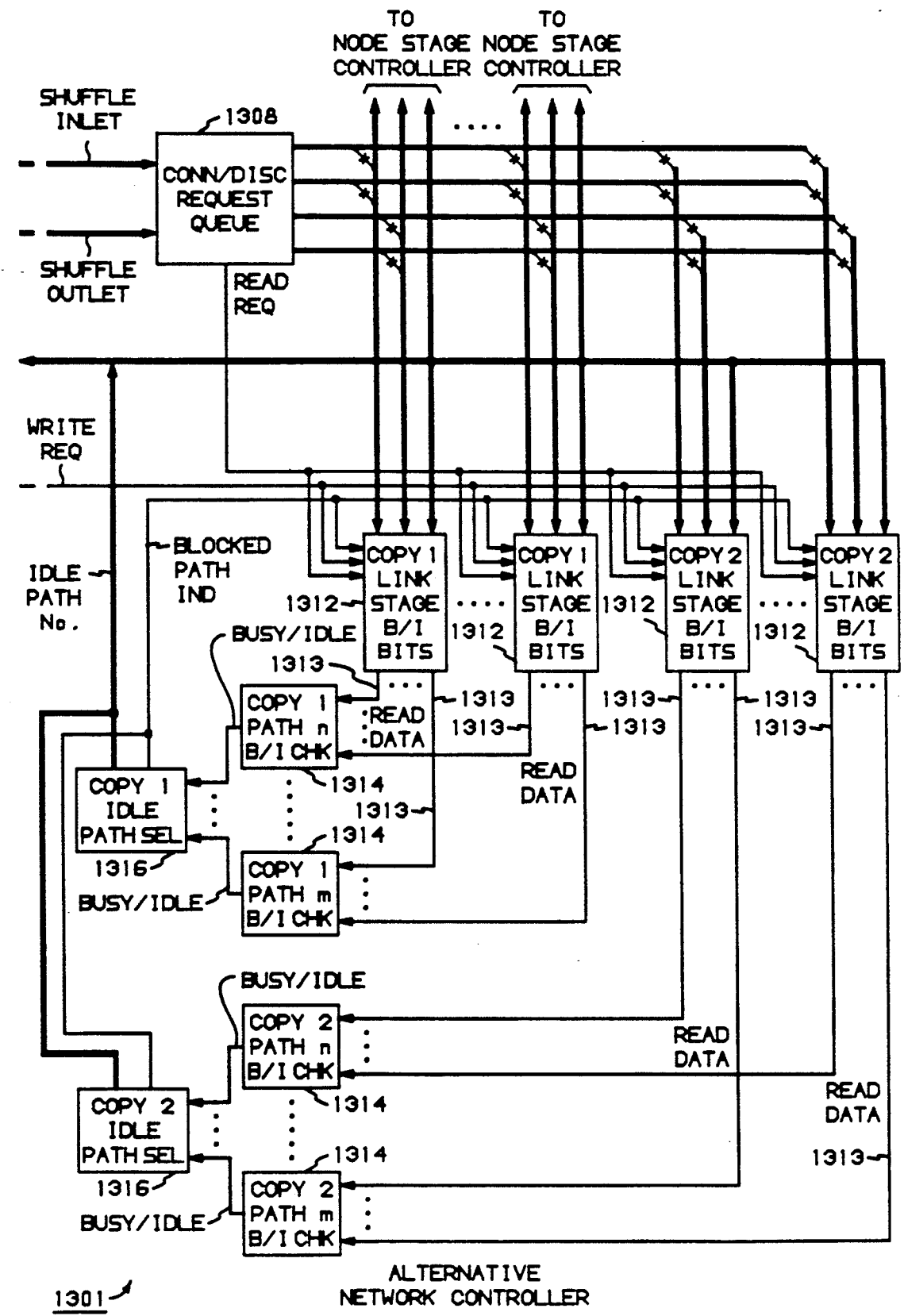
Figure 46:
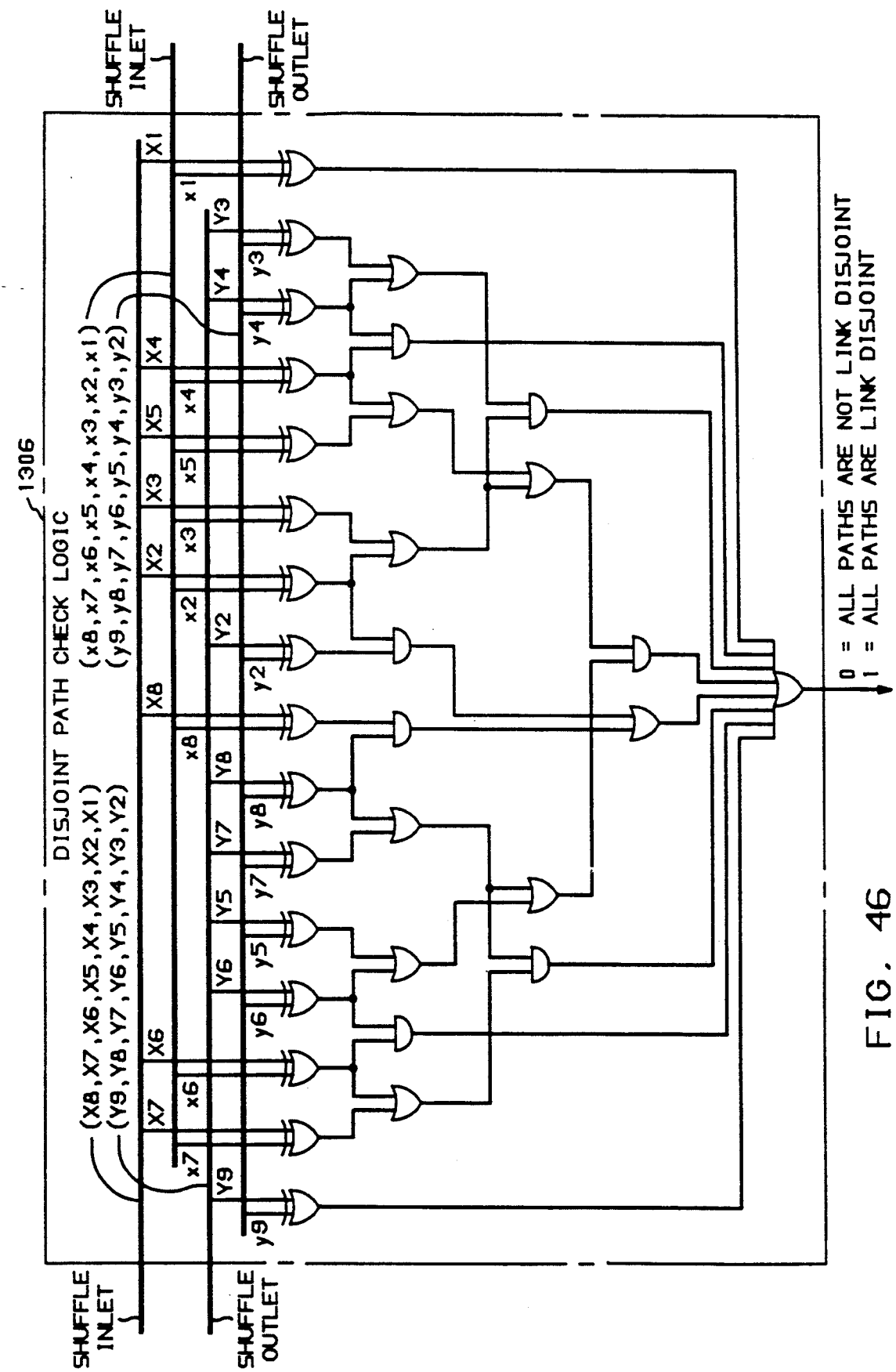
Figures 47, 48, 49:
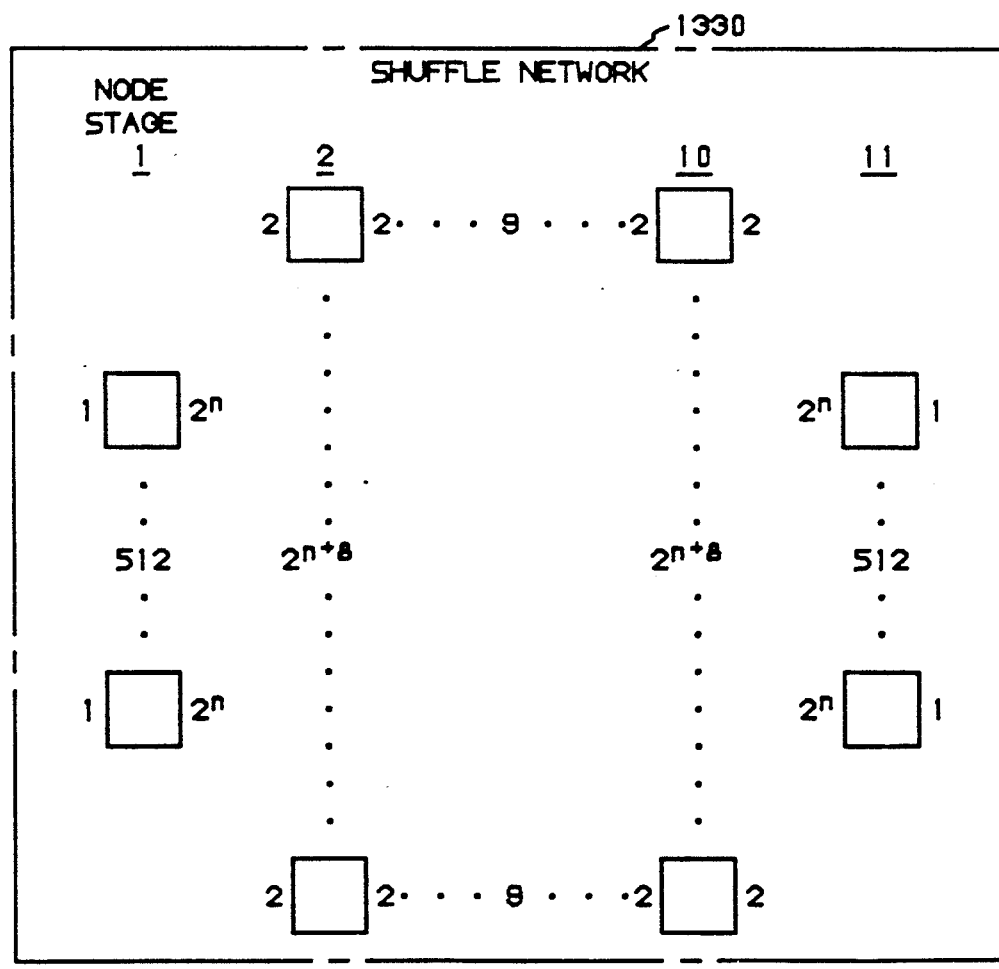
Figure 50:
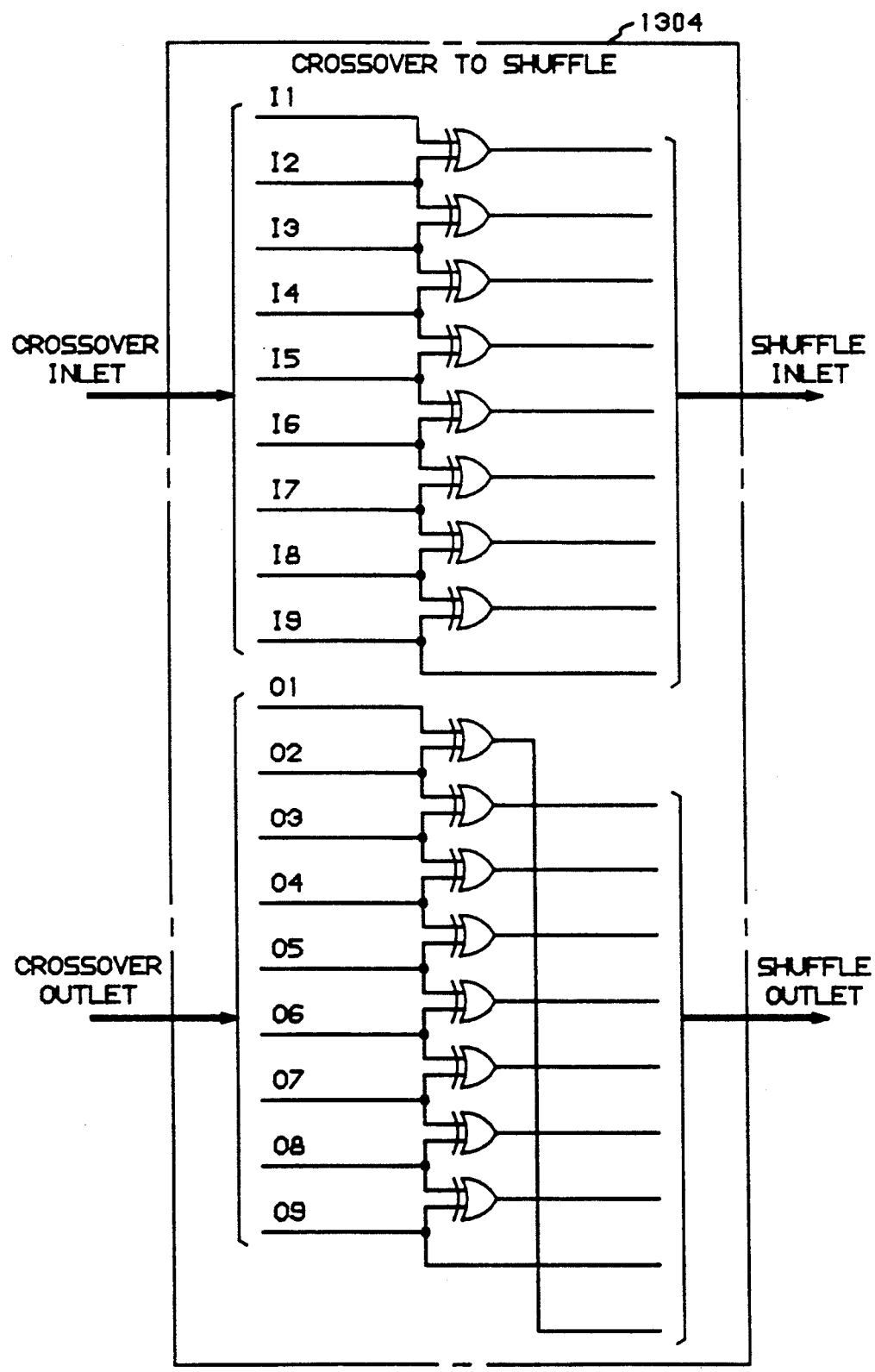
Figure 51:
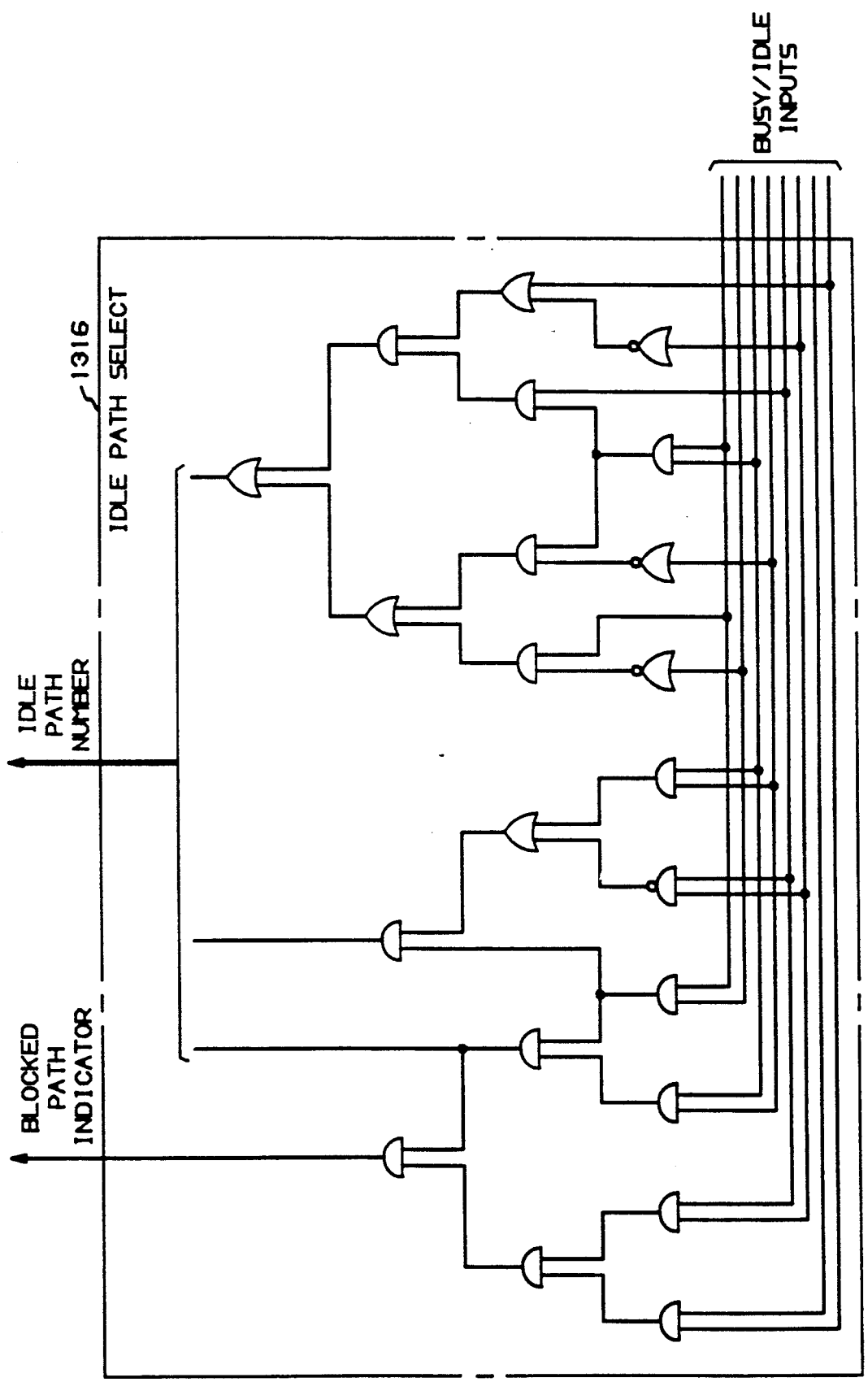
Figure 52:
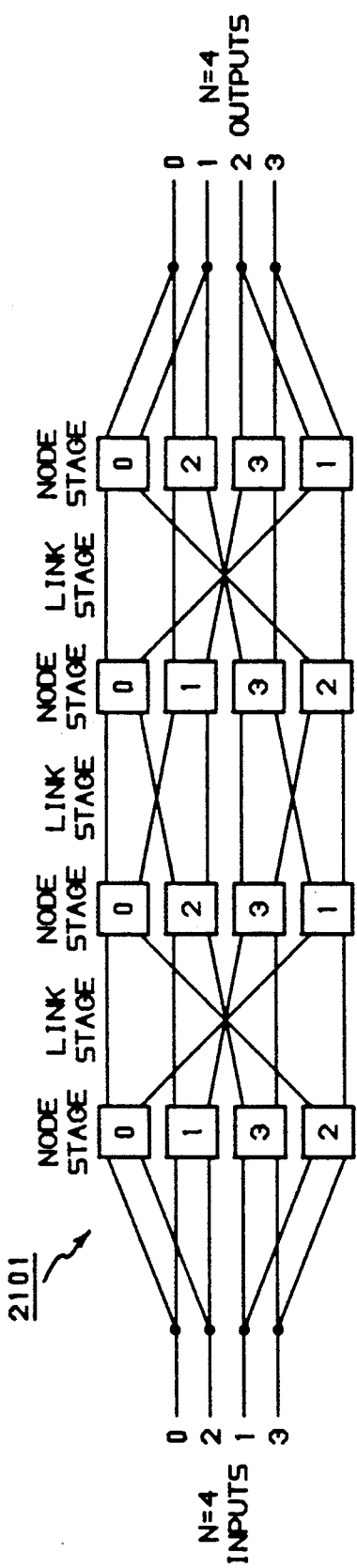
Figure 53:
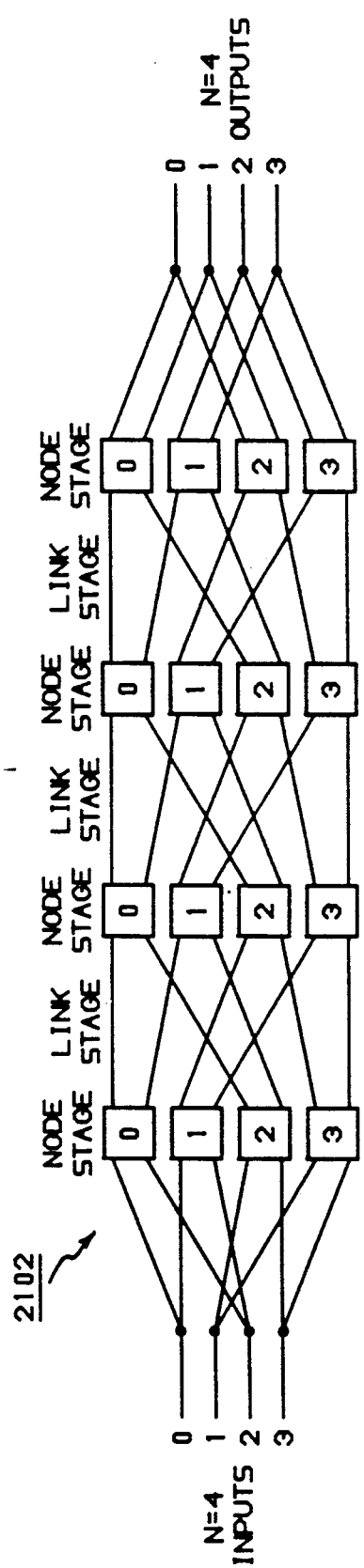
Figures 54, 55:
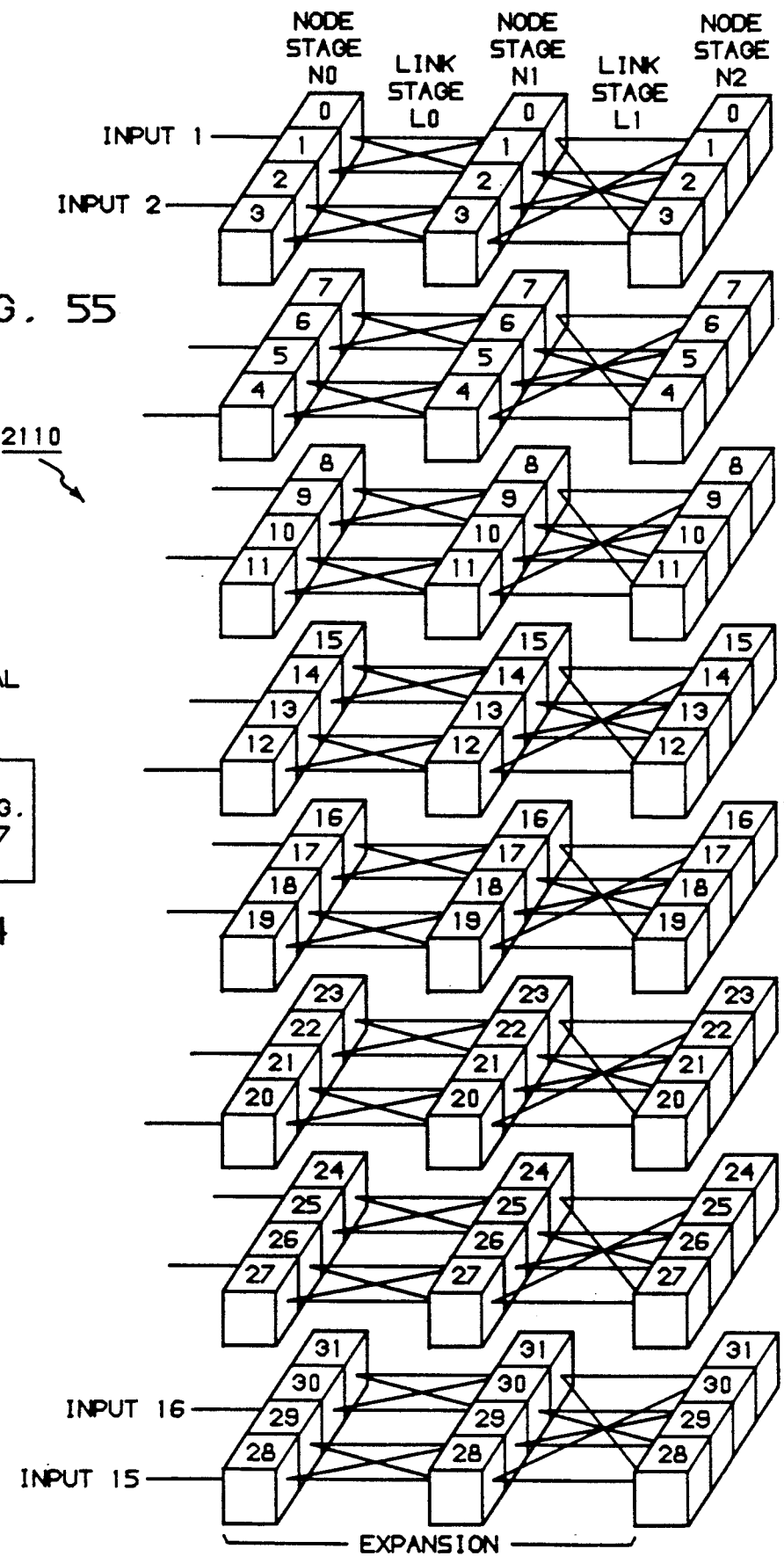
Figure 57:
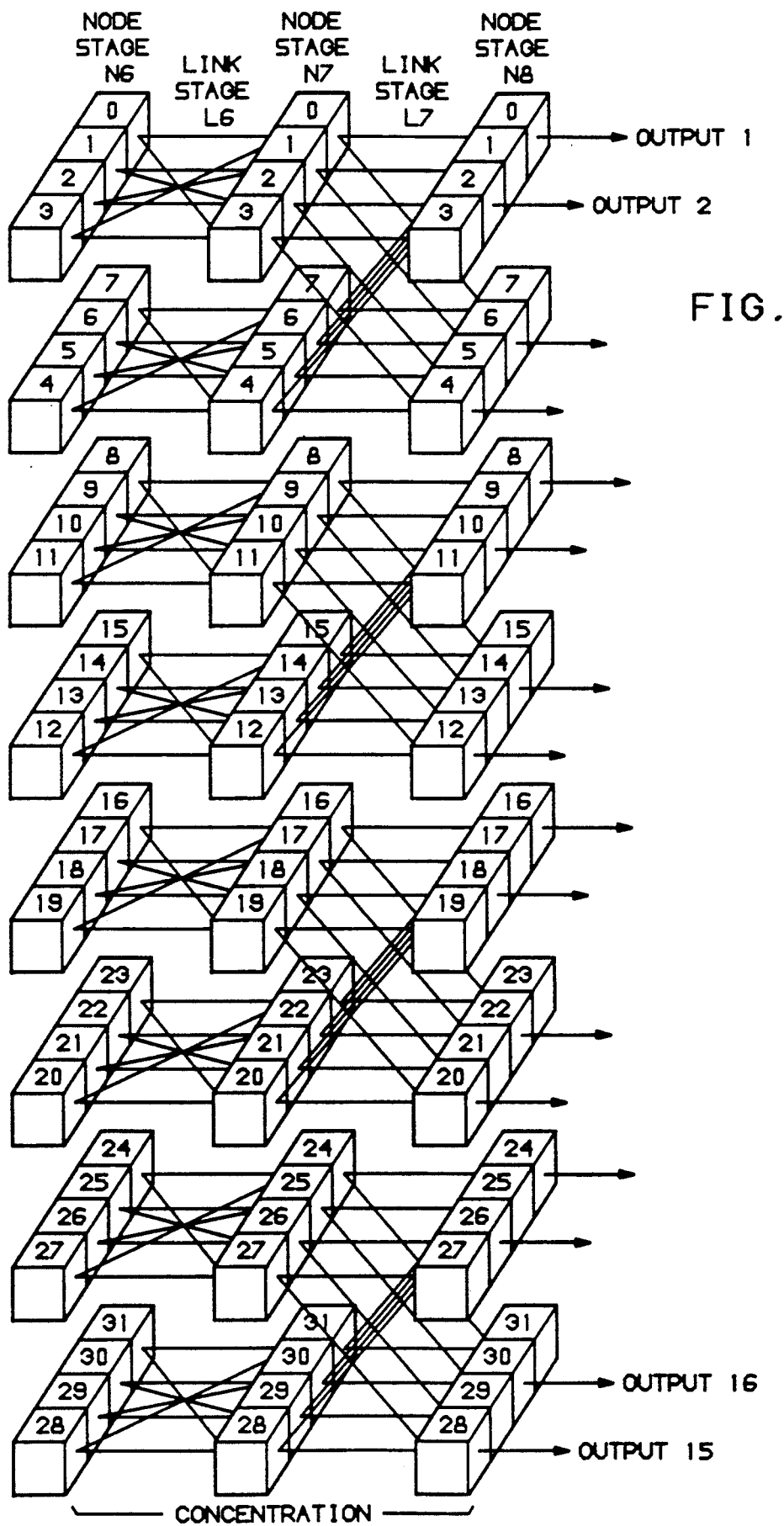
Figure 58:
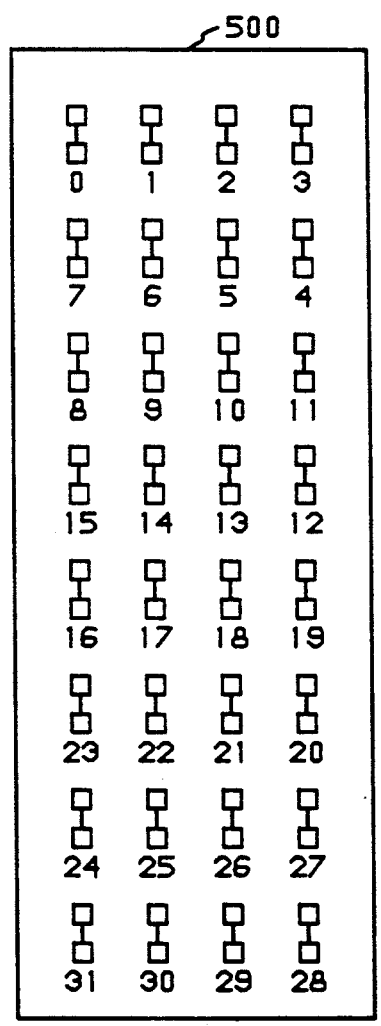
Figure 59:
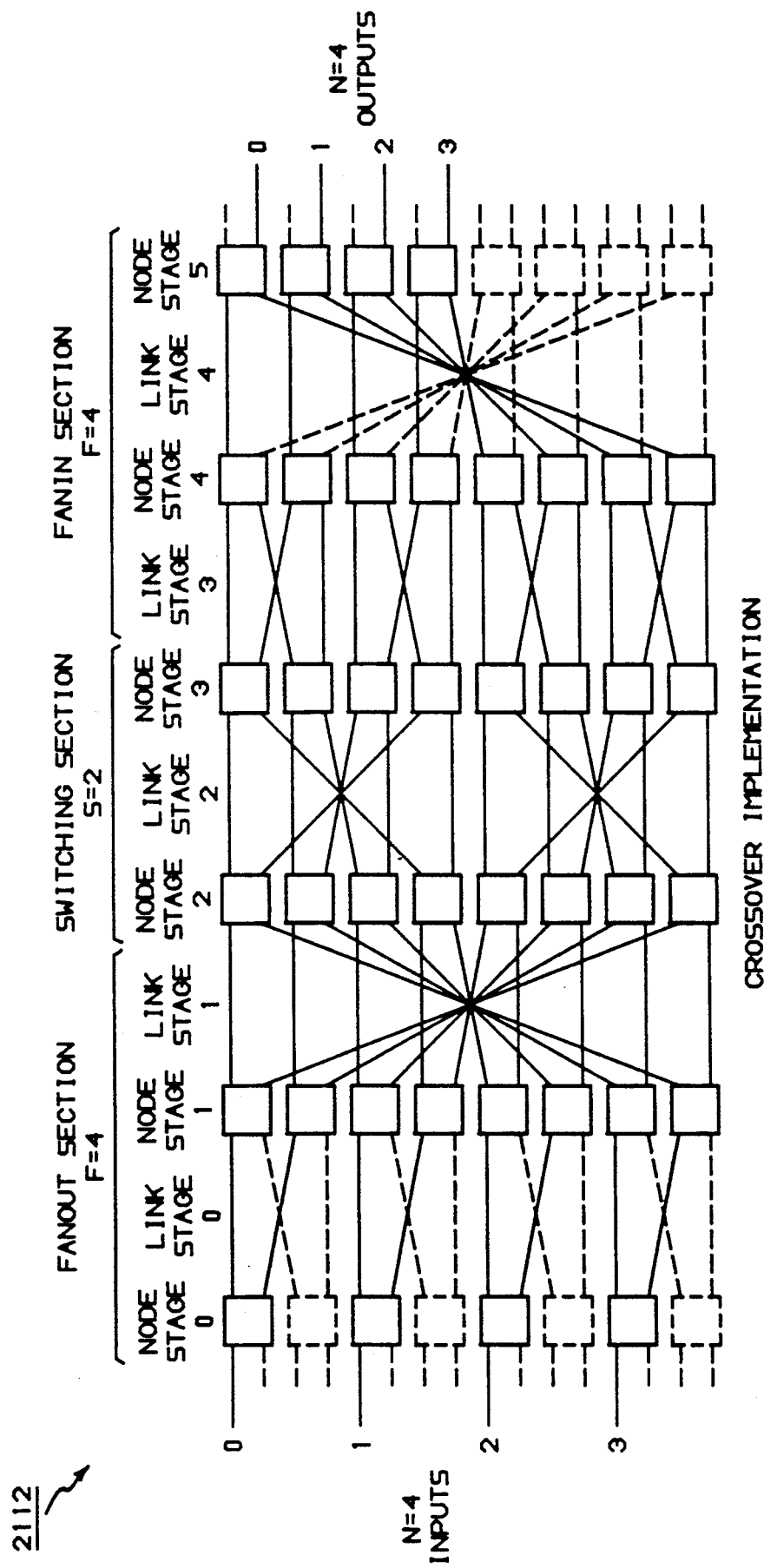
Figure 74:
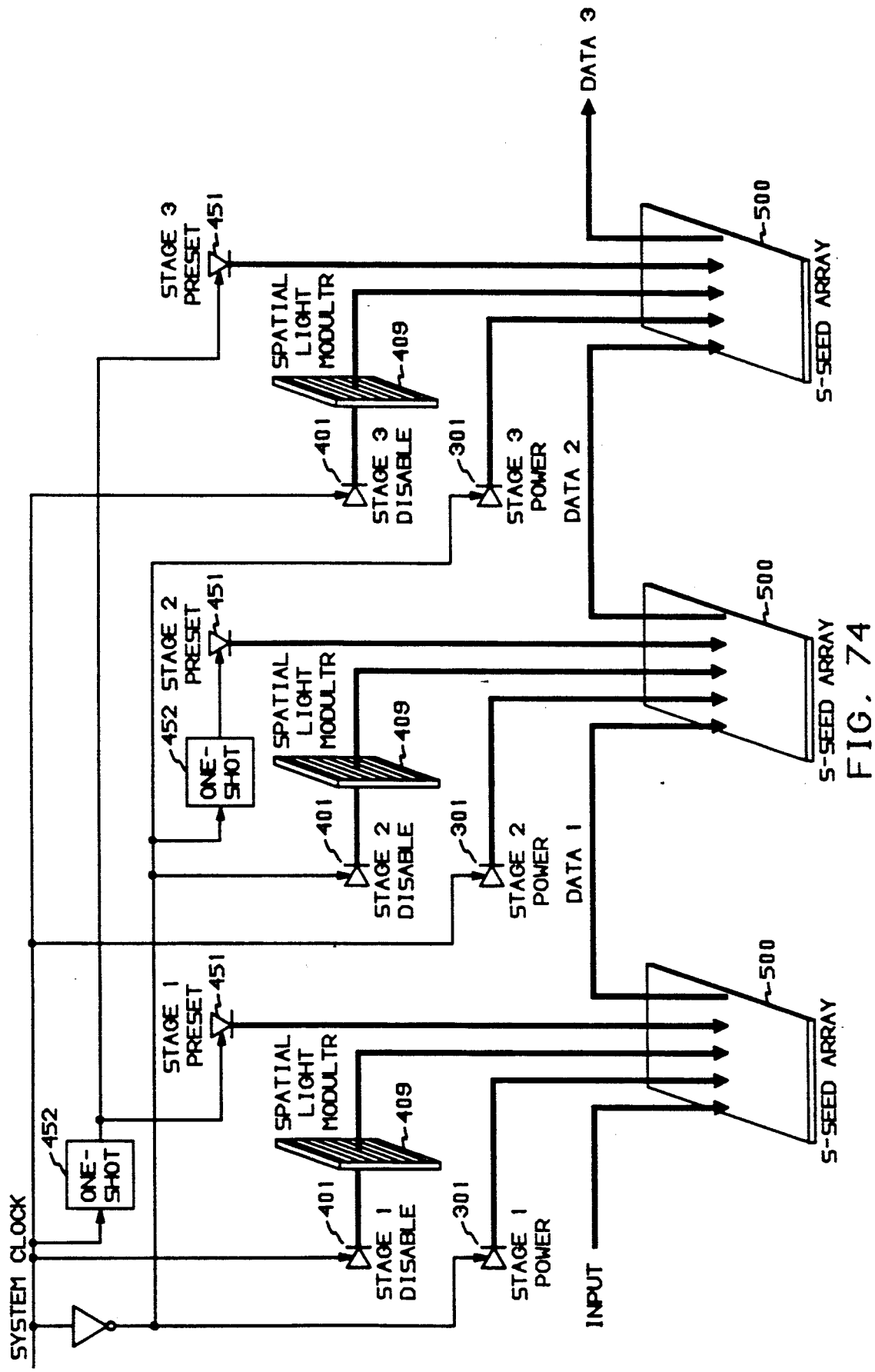
Figure 75:
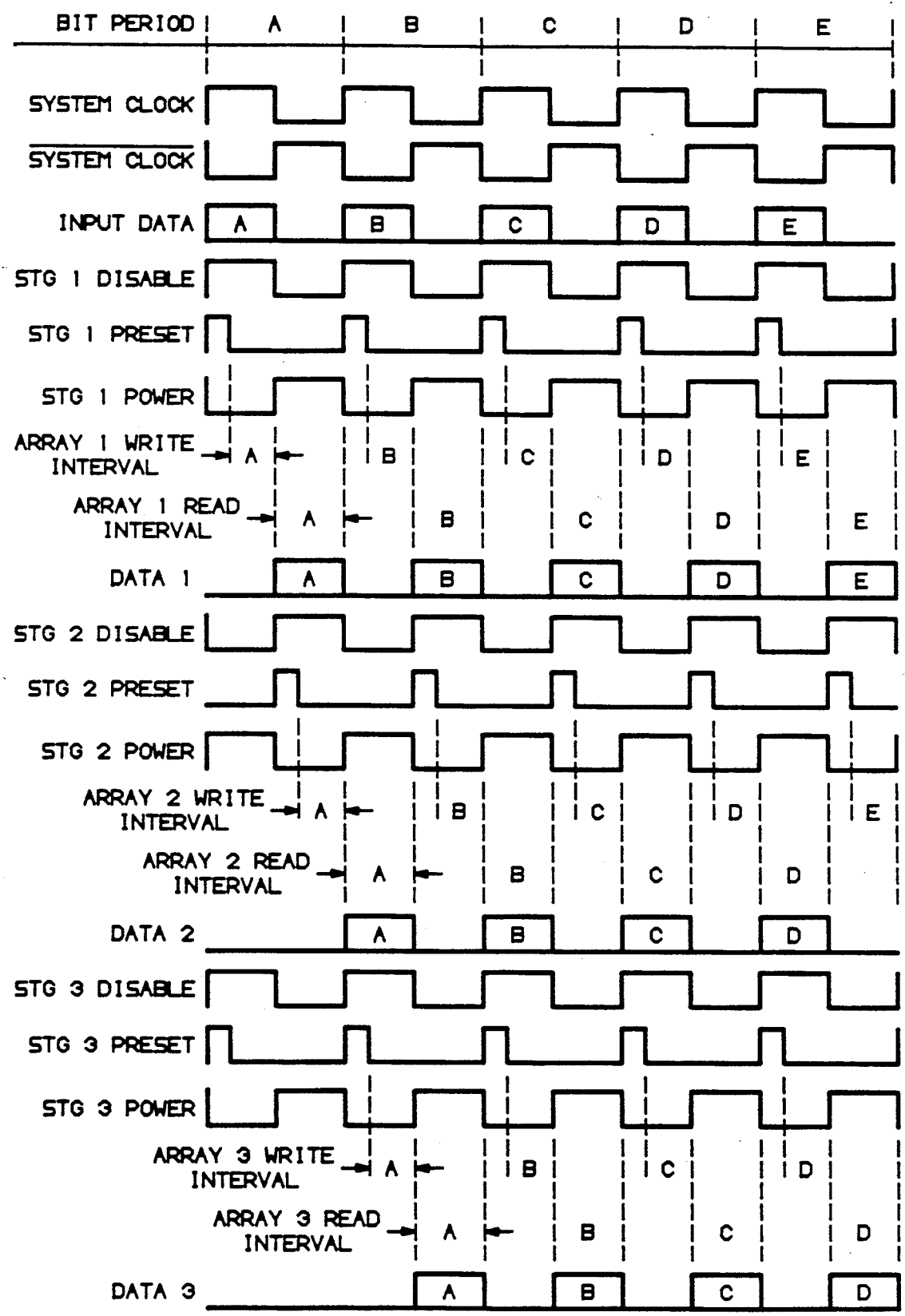
Figure 77:
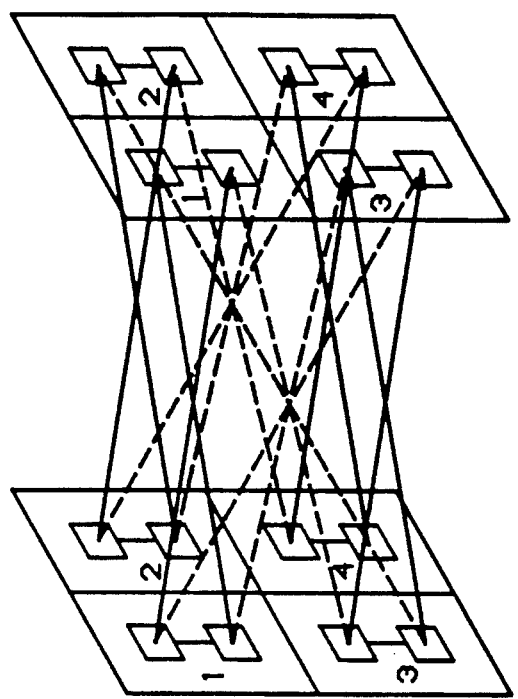
Figure 76:
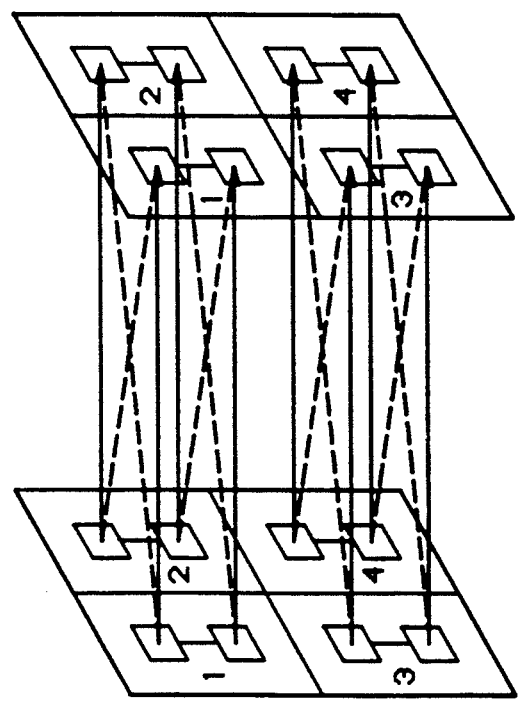
Figure 78:
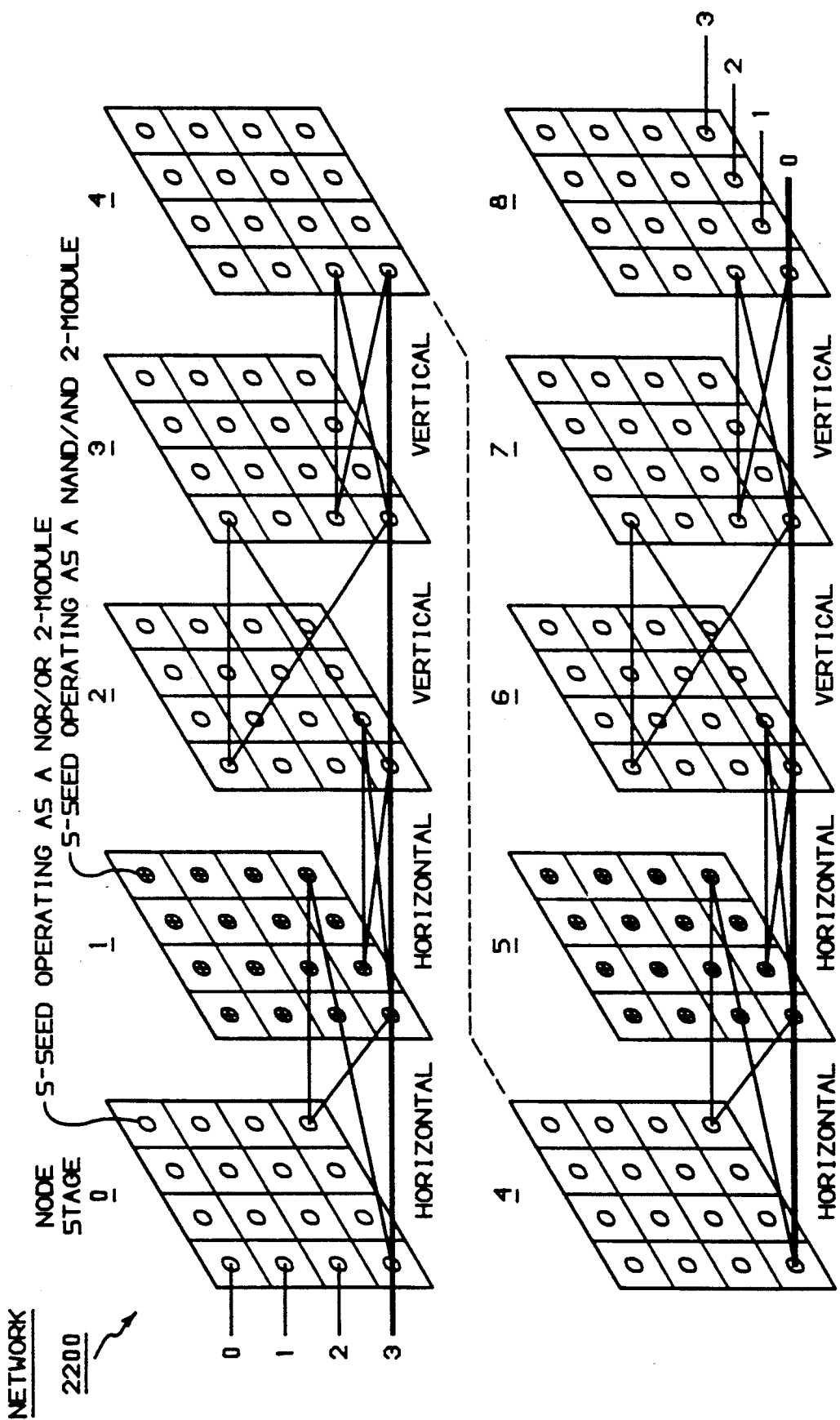
Figure 79:
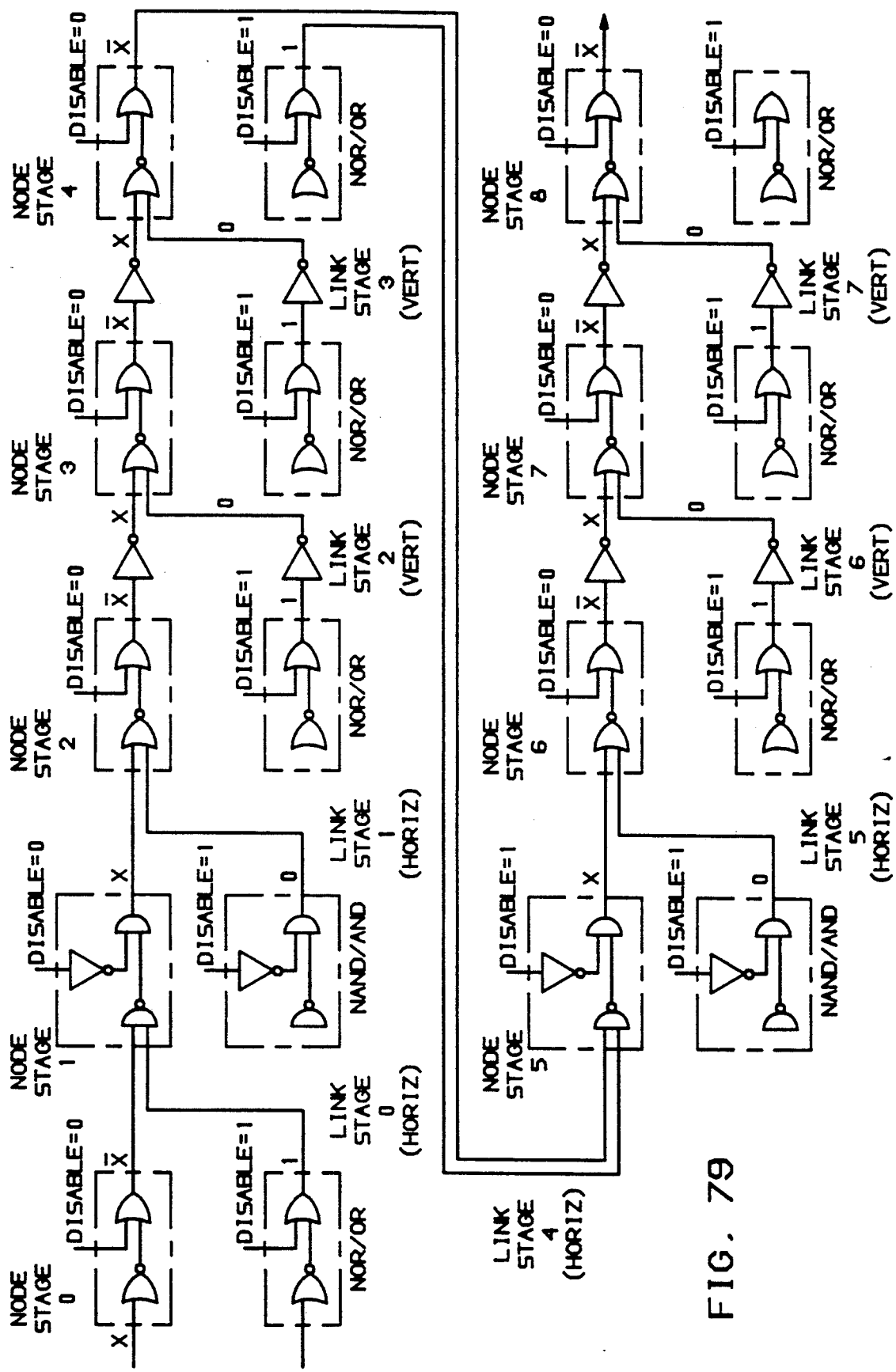
Figure 80:
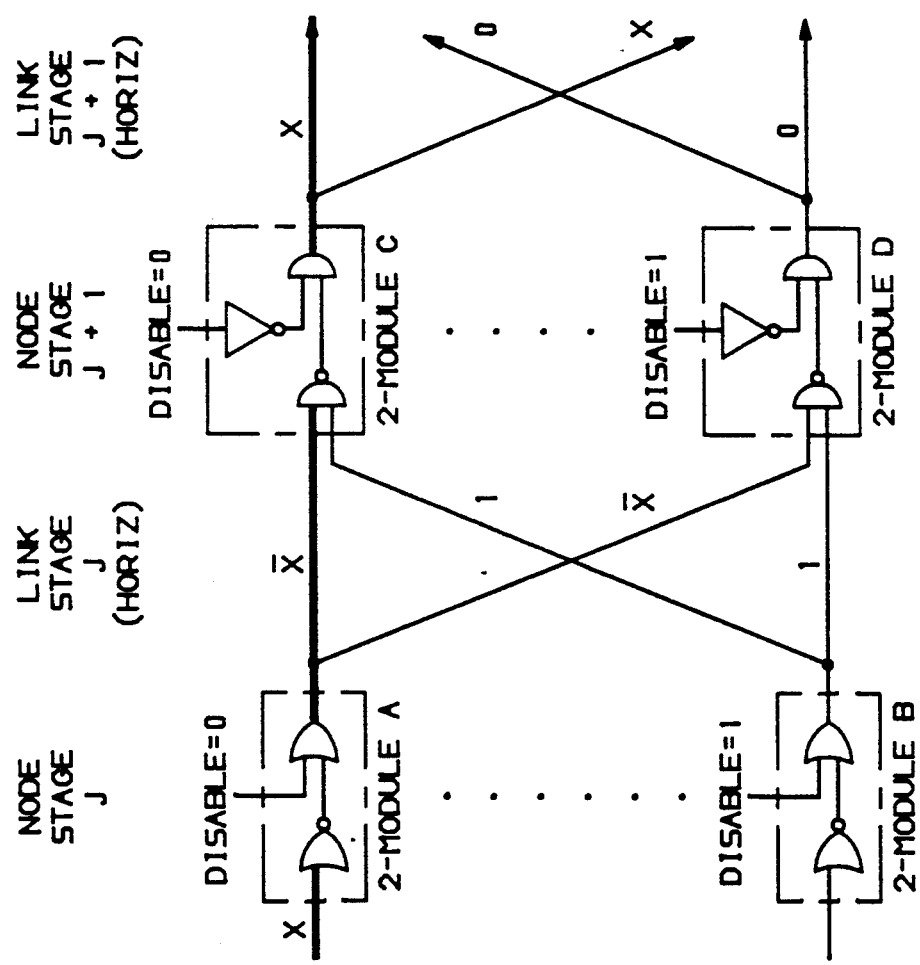
Figure 81:
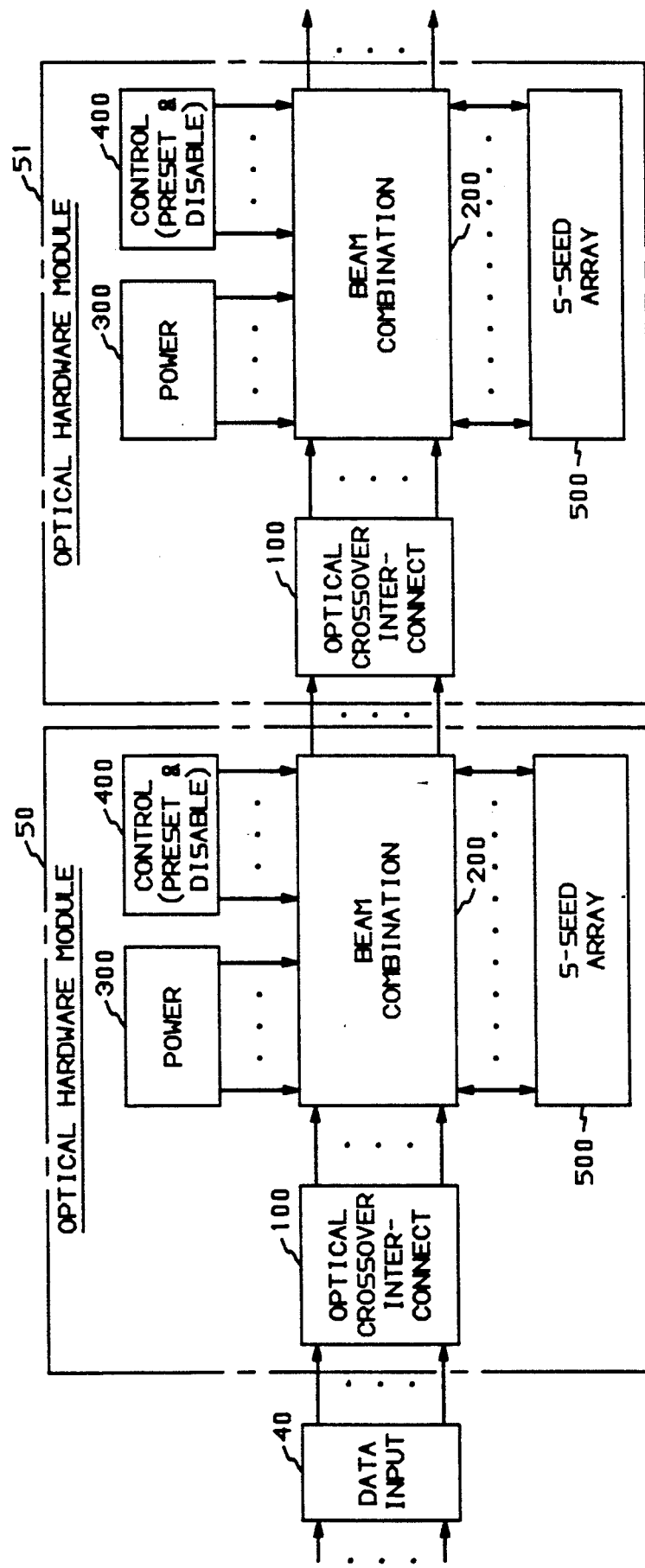
Figure 83:
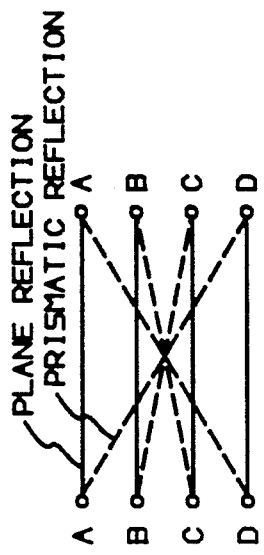
Figure 84:
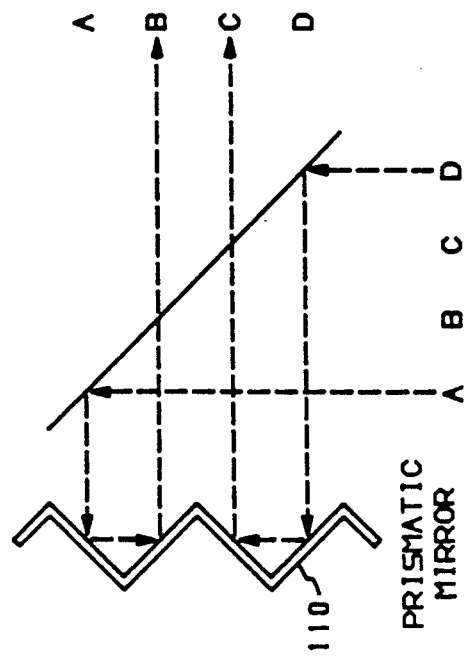
Figure 82:
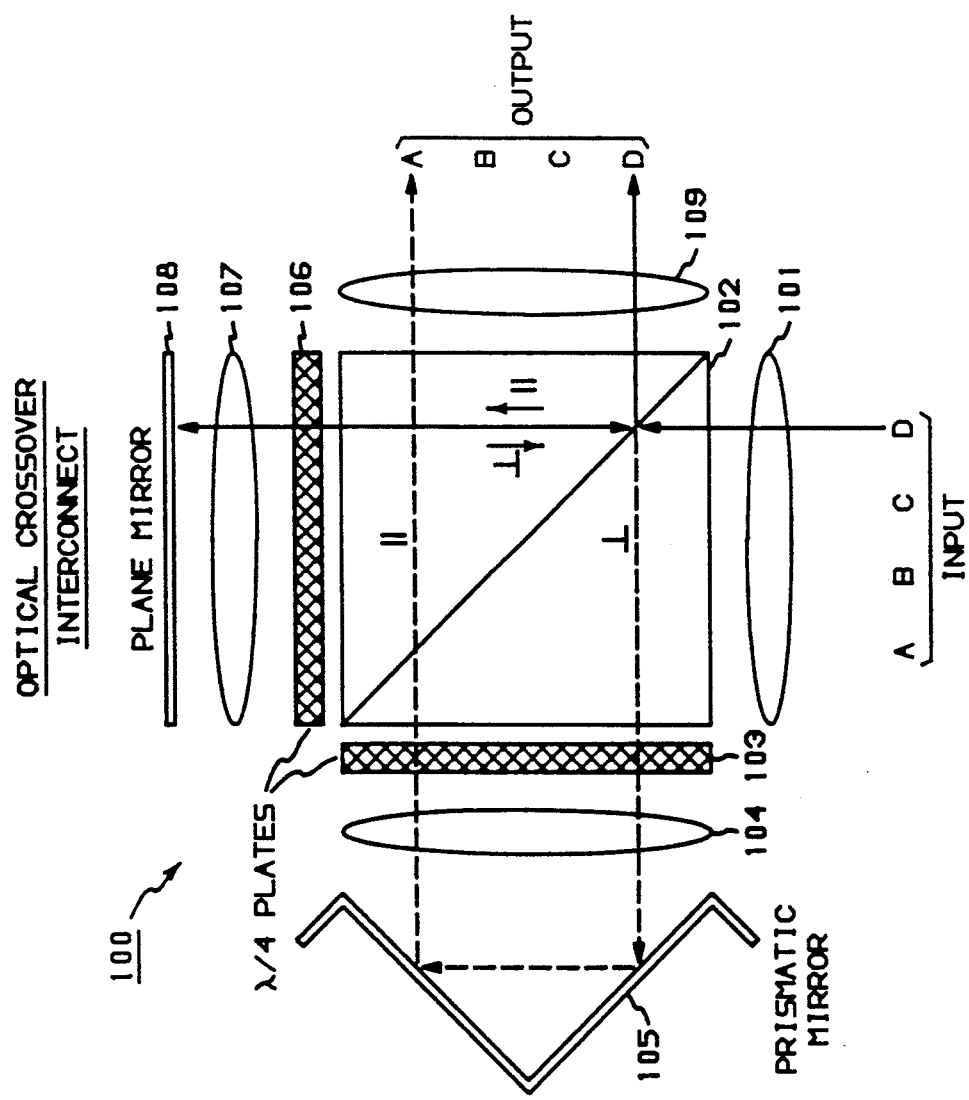
Figure 85:
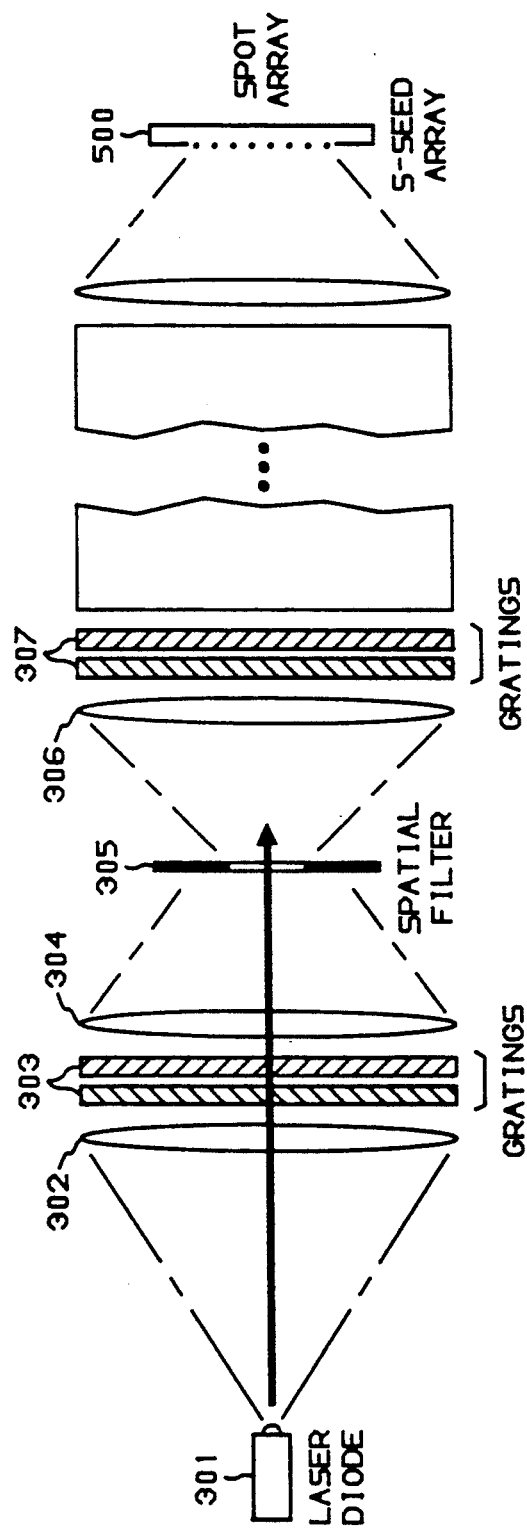
Figure 86:
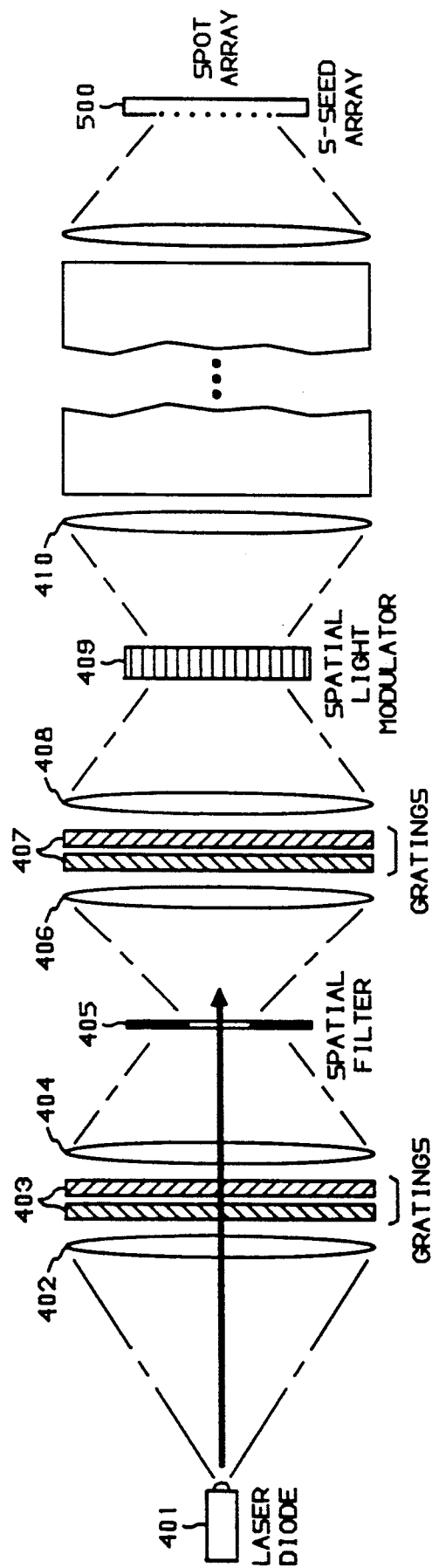
Figure 87:
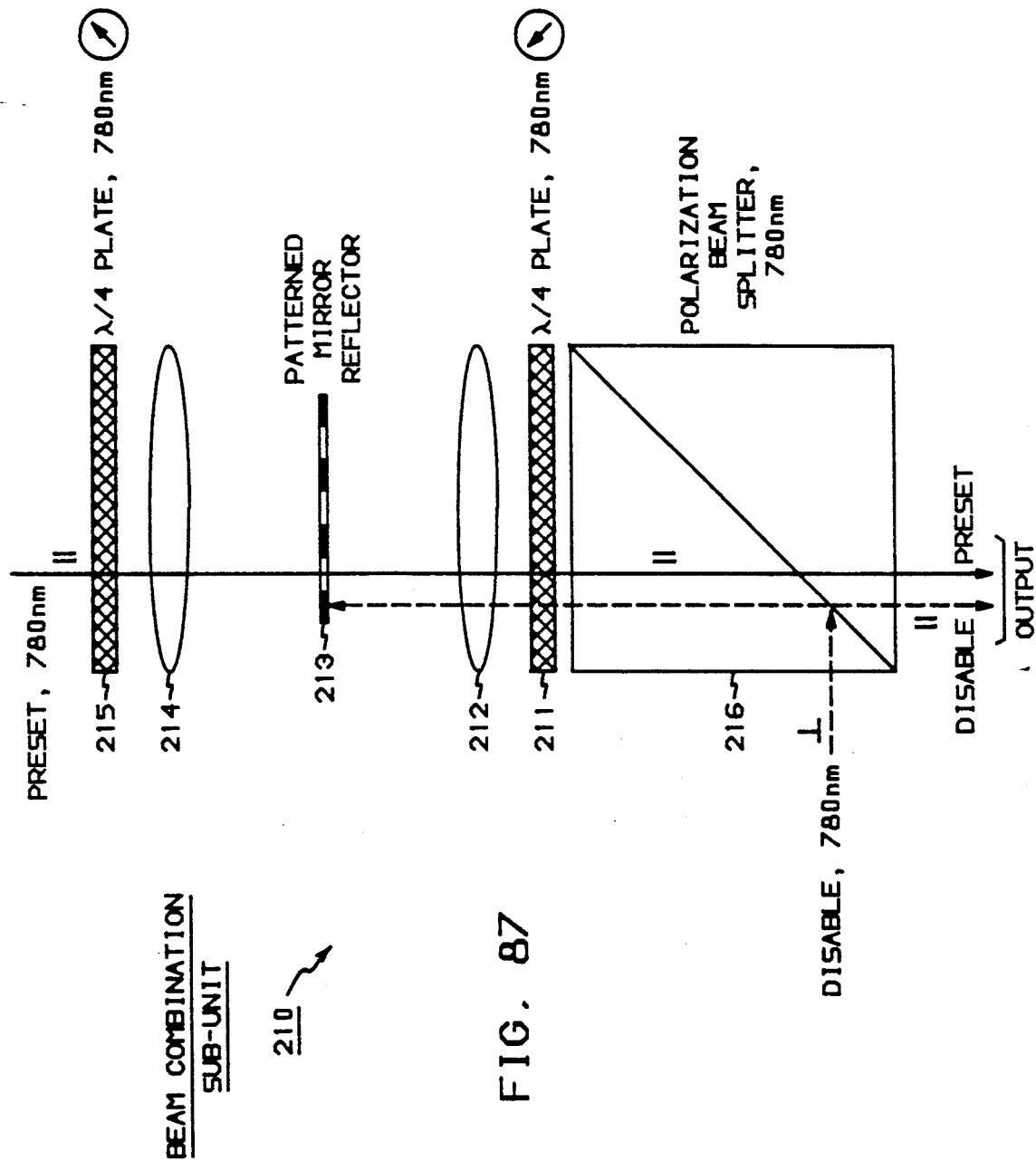
Figure 88:
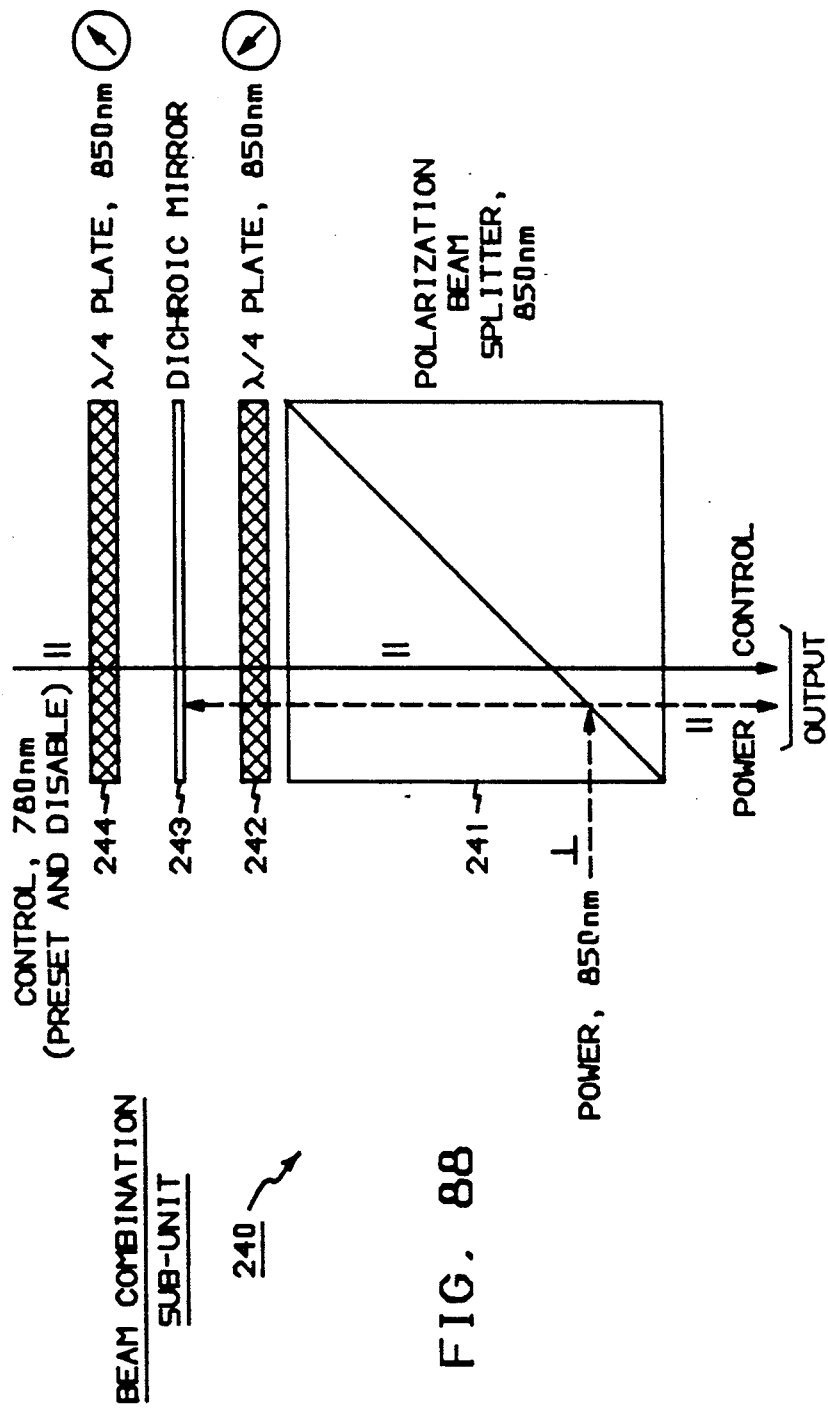
Figure 89:
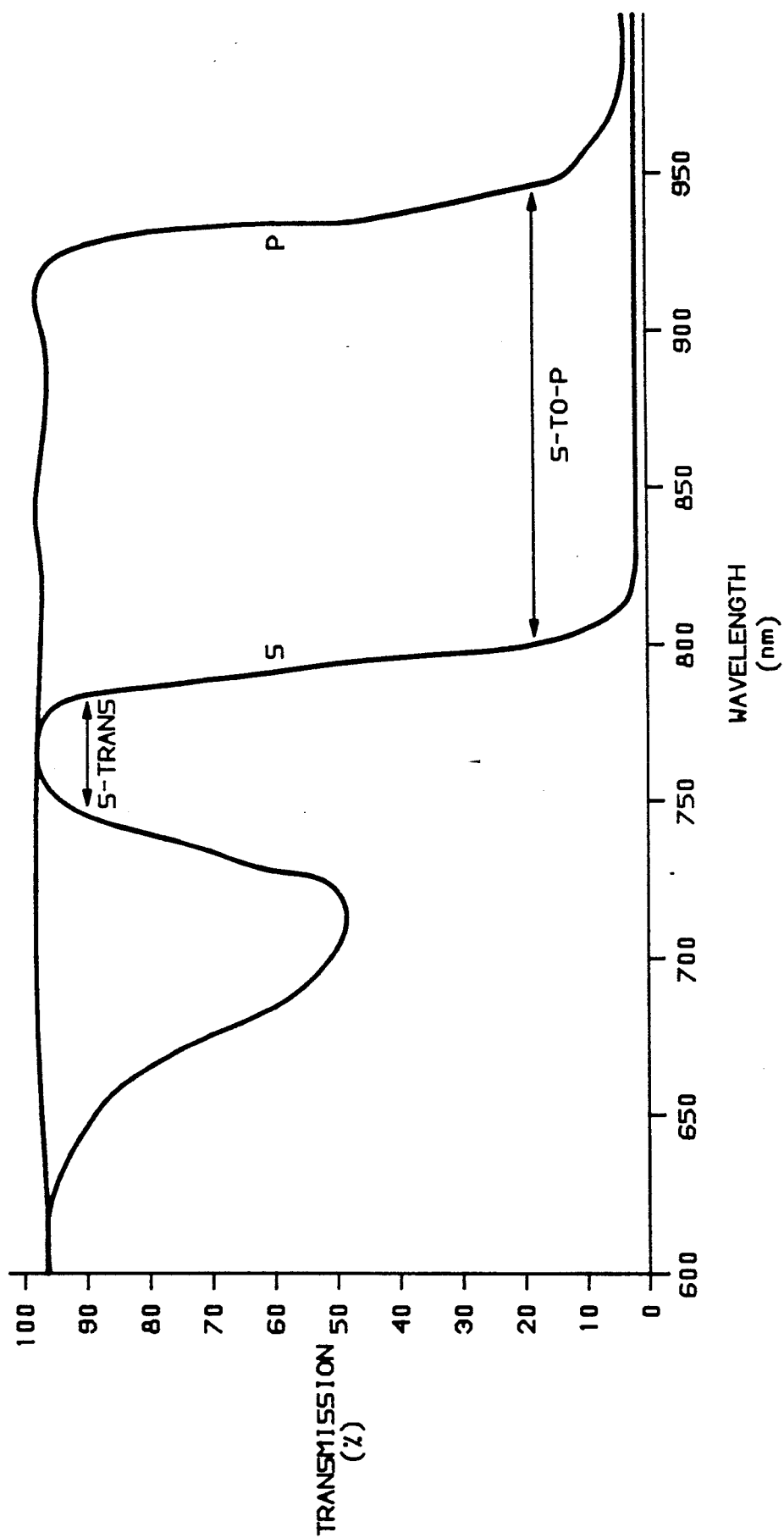
Figure 90:
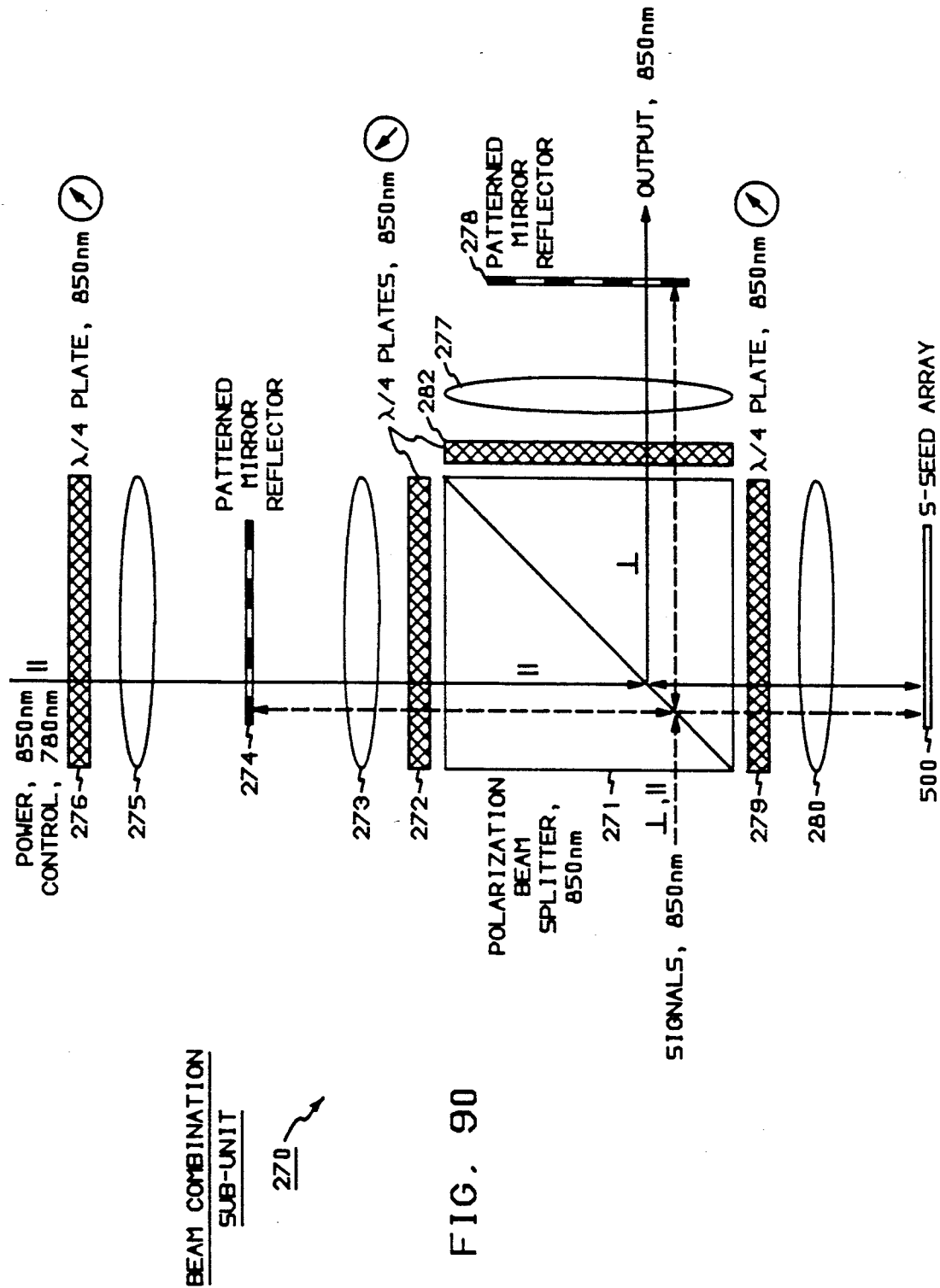
Figure 92:
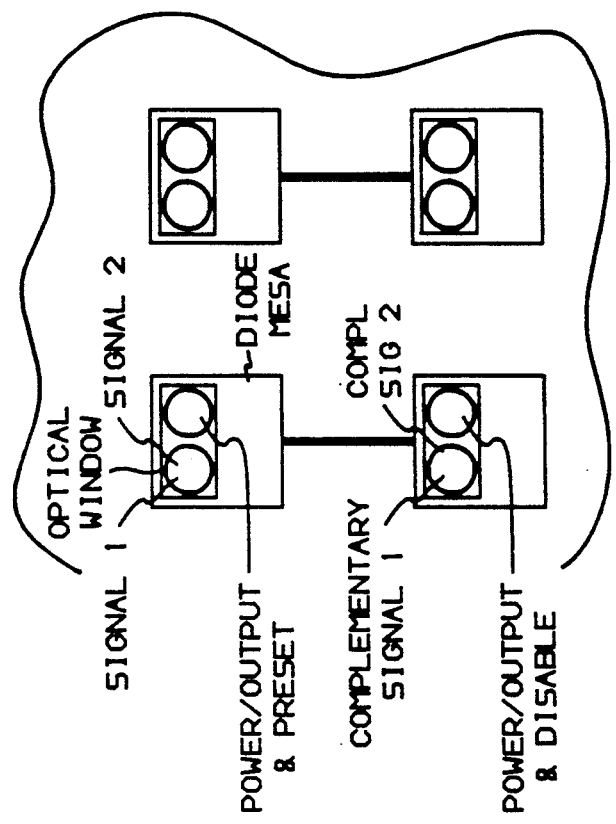
Figure 91:
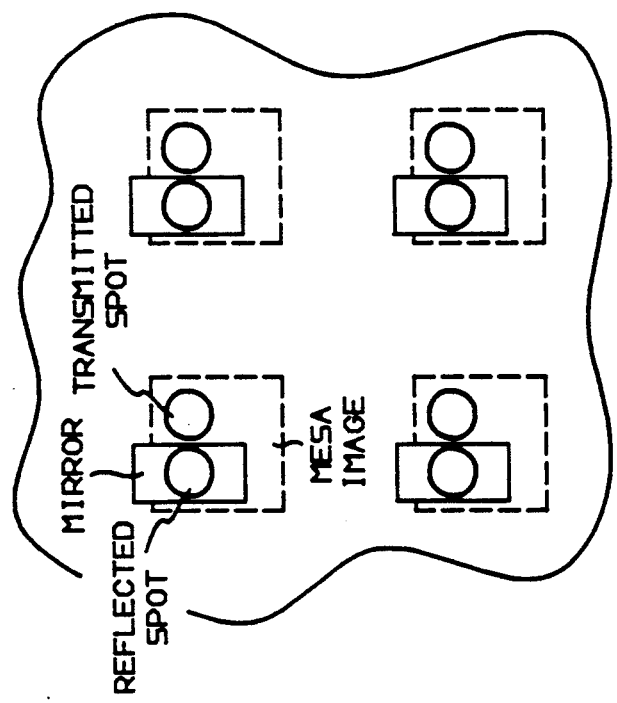
Figure 93:
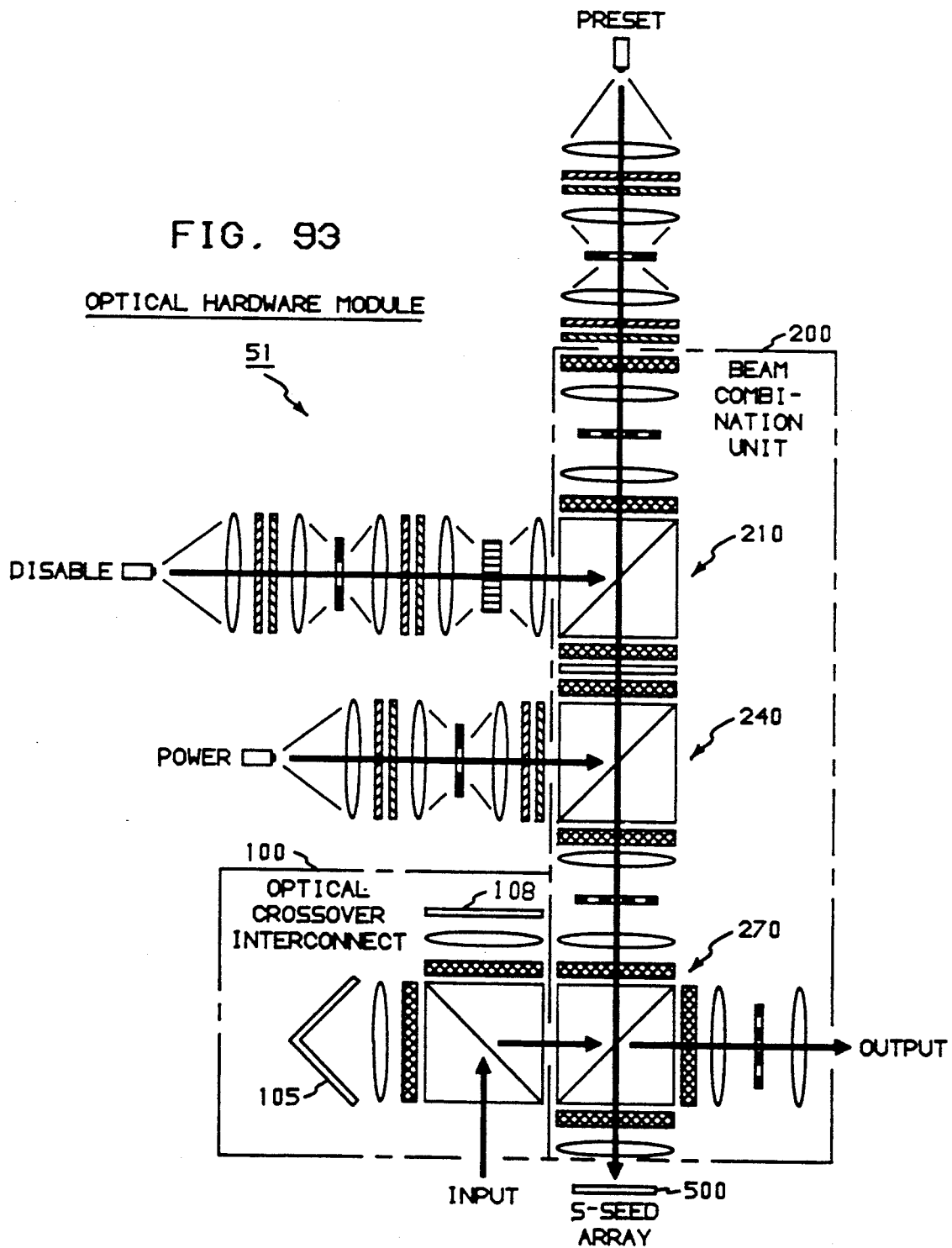
Figure 94:
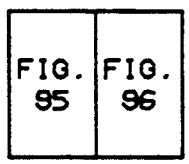
Figure 95:
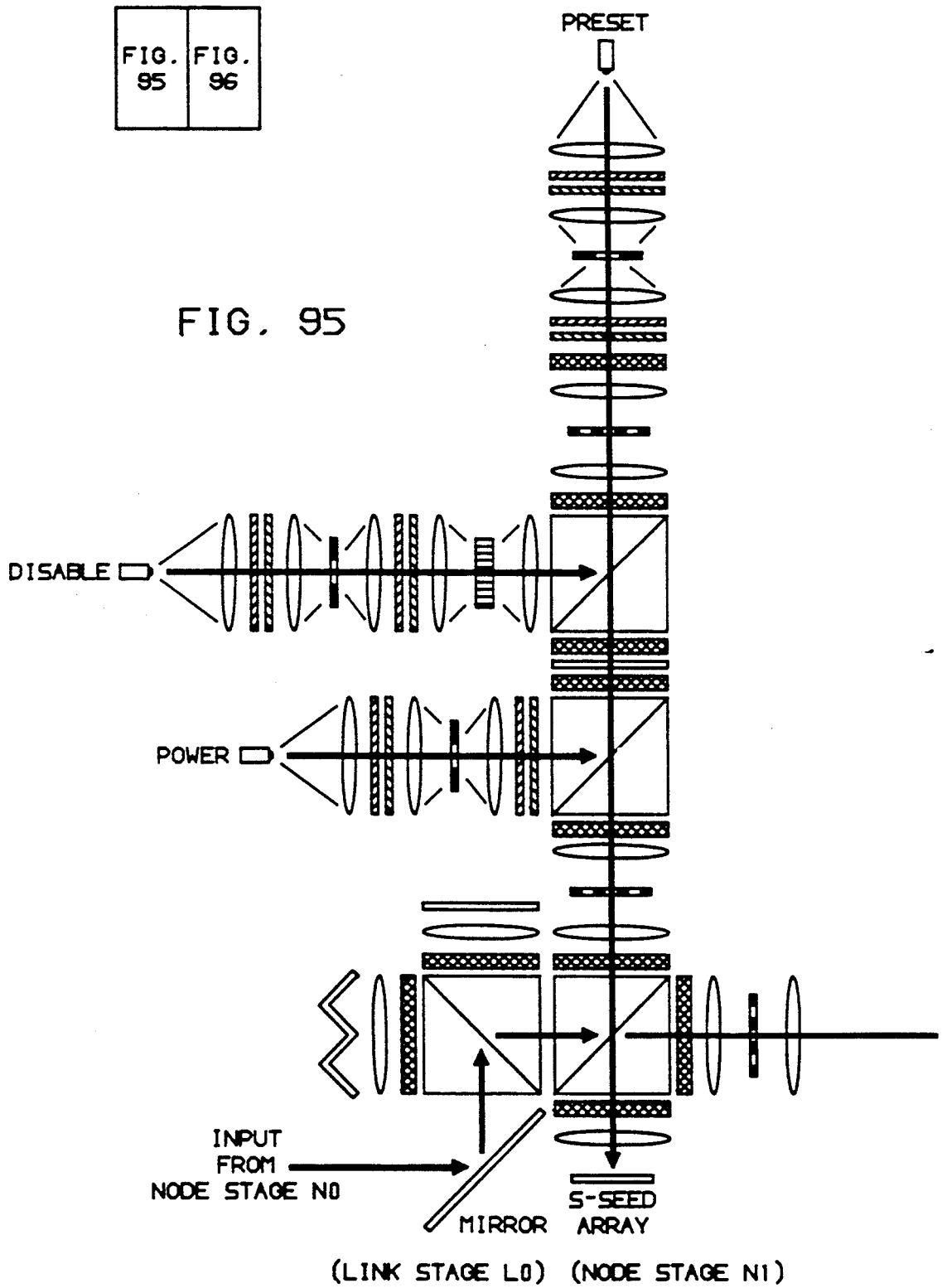
Figure 96:
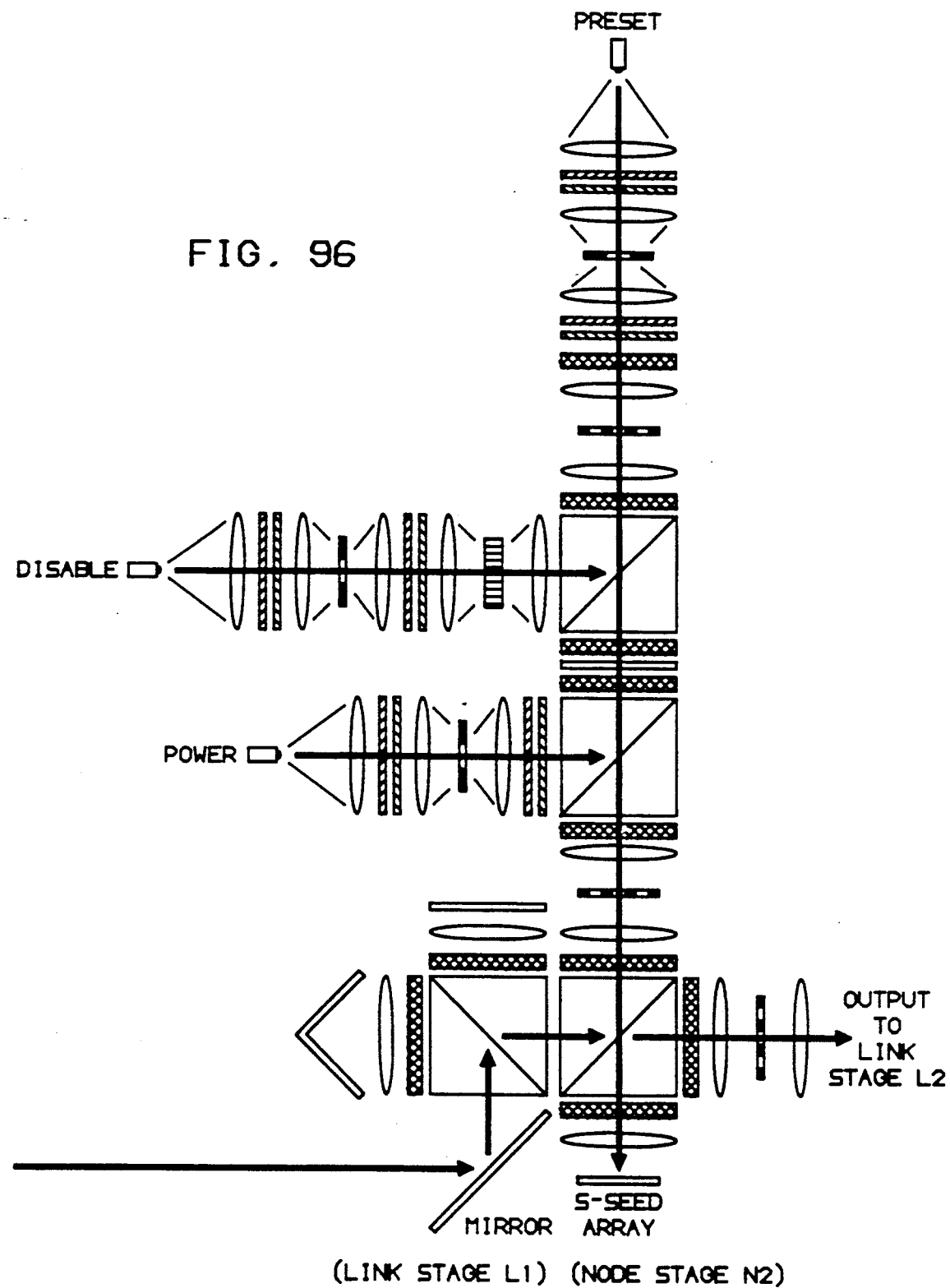
Figure 97:
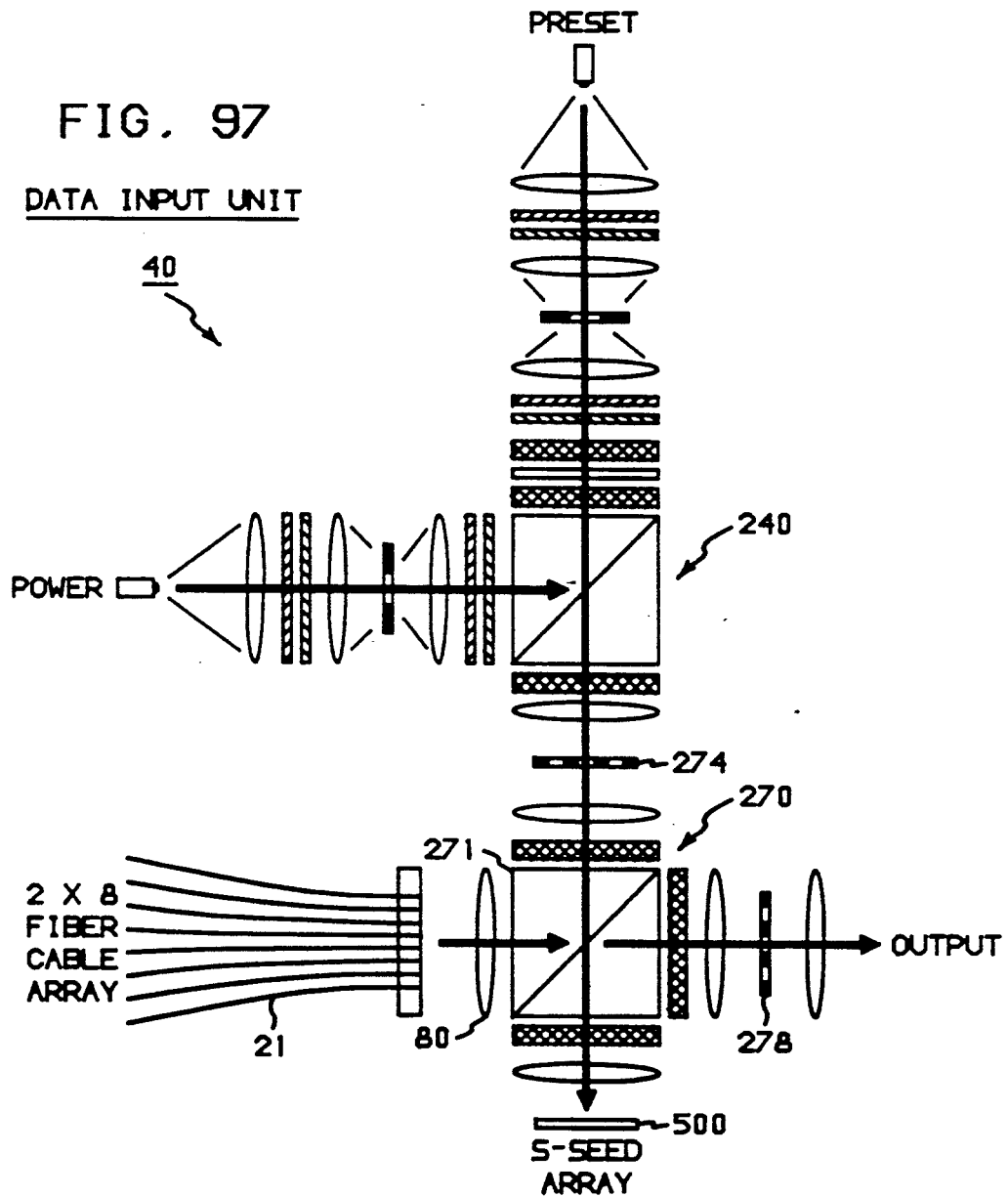
Figure 98:
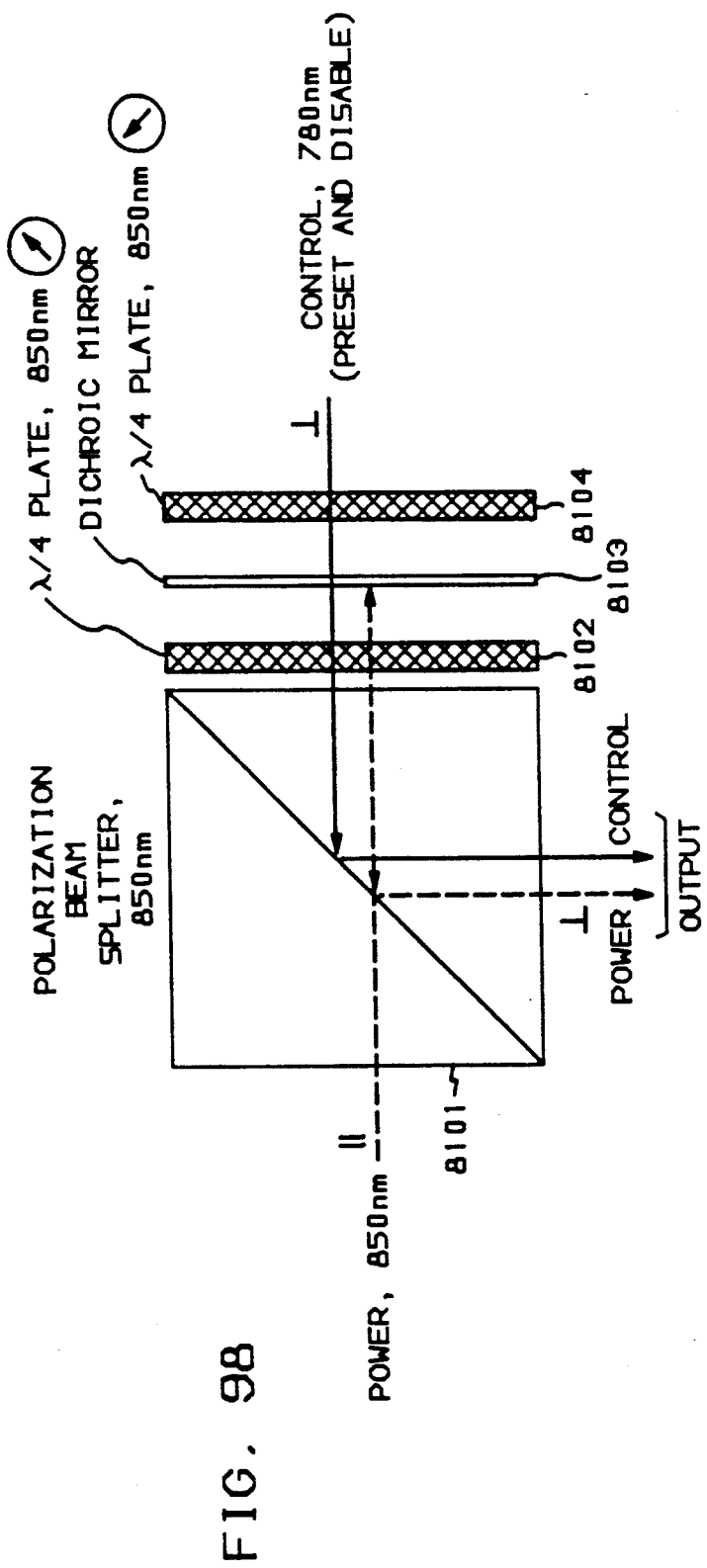
Figure 99:
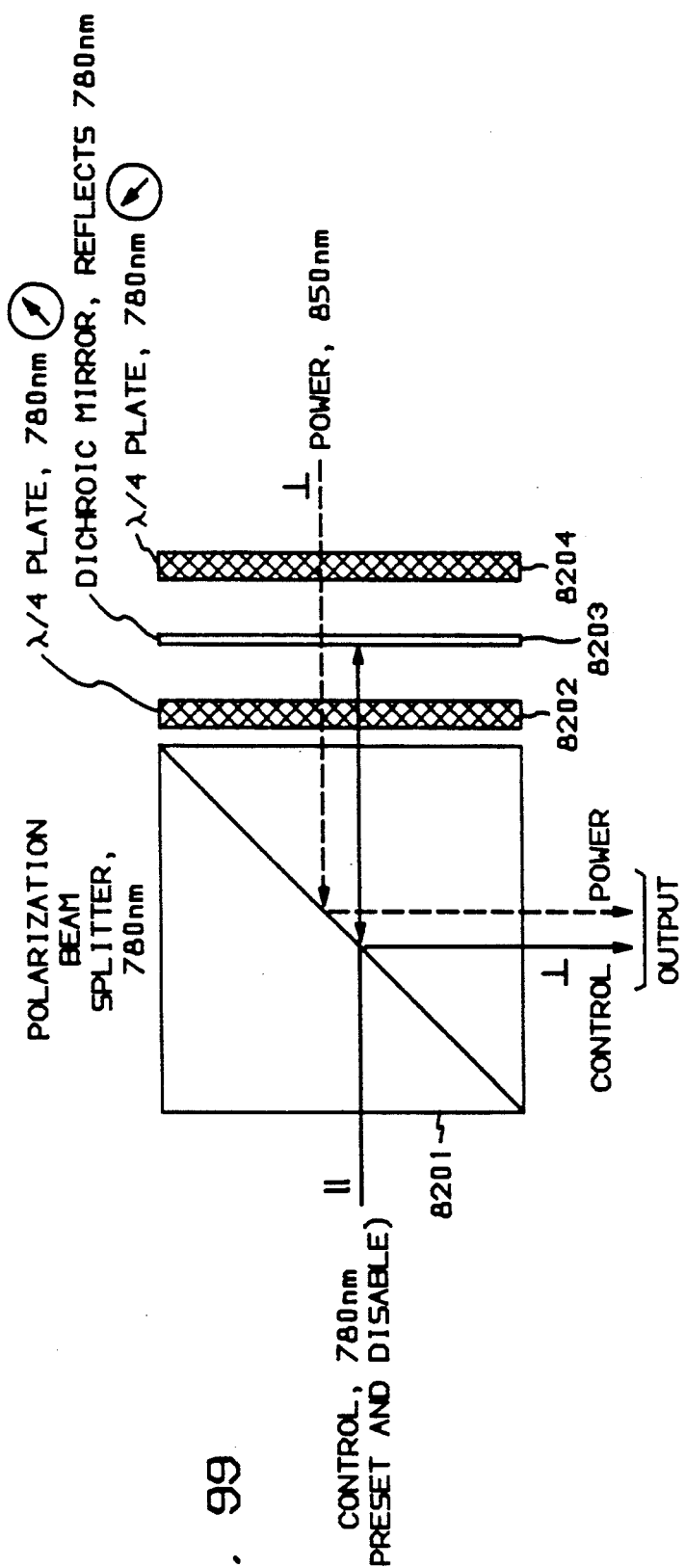

FIGS. 3, 4, and 5 are diagrams of the network topology of FIG. 2 but with different expansion and concentration implementations;

FIGS. 6, 7, and 8 are diagrams of a full capacity node, a capacity one node with selectivity, and a capacity one node without selectivity, respectively, for use in the system of FIG. 2;

FIG. 9 is a diagram of a network topology similar to that of FIG. 2 but without concentration;

FIG. 10 is a diagram of a network topology similar to that of FIG. 2 but without expansion;

FIG. 11 is a diagram of a single stage strictly nonblocking network;

FIG. 12 is a diagram of a strictly nonblocking three stage Clos network;

FIG. 13 is a diagram of a general strictly nonblocking three stage Clos network;

FIG. 14 is a diagram of a strictly nonblocking five stage Clos network;

FIG. 15 is a diagram of a multistage interconnection network (MIN);

FIG. 16 is a diagram of a particular type of MIN, referred to herein as an extended generalized shuffle (EGS) network;

FIGS. 17 and 18 are diagrams of an example EGS network;

FIG. 19 is a diagram illustrating a channel graph L(x,y) from inlet x to outlet y of the network of FIGS. 17 and 18;

FIG. 20 is a diagram showing a single intersecting call in addition to the channel graph L(x,y) of FIG. 19;

FIGS. 21 and 23 are diagrams of the network of FIG. 16 that are used in deriving nonblocking criteria for the network;

FIG. 22 is a diagram of the network of FIG. 18 that is used in describing a network property referred to herein as the forward-backward invariance property (FBIP);

FIG. 24 is a diagram of an example nonblocking EGS network;

FIG. 25 is a diagram of a particular perfect shuffle equivalent network—the crossover (or half crossover) network;

FIG. 26 is a diagram of an EGS network representing an important special case of perfect shuffle equivalent networks;

FIG. 27 is a path hunt processing flow chart used to effect the path hunt function in an EGS network of FIG. 16 with full capacity nodes;

FIG. 28 is a path hunt processing flow chart used to effect the path hunt function in an EGS network of FIG. 16 with capacity one nodes;

FIG. 29 is a diagram of an exemplary shuffle network used in explaining the relationship of the switches and links of a shuffle network to the inlet, path and outlet numbers;

FIG. 30 is a diagram illustrating the concatenation of binary representations of inlet, path, and outlet numbers for the network of FIG. 29 to form a single binary number;

FIG. 31 is a diagram illustrating the determination of switches, links, inputs and outputs for the network of FIG. 29 from a single binary number;

FIG. 32 is a schematic illustration of the transformations between various stages of two isomorphic network types—crossover networks and shuffle networks—where the transformations are specified herein in Tables 1-3;

FIGS. 34-36, when arranged in accordance with FIG. 33, comprise a diagram of a 16×16 two-dimensional crossover network using one-dimensional arrays of nodes;

FIG. 37 is a diagram illustrating the relative sizes of the 16×16 crossover network of FIGS. 34-36, a 128×128 crossover network, and a 512×512 crossover network of FIG. 38;

FIG. 38 is a diagram of a 512×512 crossover network and a corresponding crossover network controller;

FIG. 39 is a connection request processing flow chart for the crossover network controller of FIG. 38;

FIG. 40 is a disconnect request processing flow chart for the crossover network controller of FIG. 38;

FIGS. 42-44, when arranged in accordance with FIG. 41, comprise a diagram of a hardware logic circuit implementation of the crossover network controller of FIG. 38;

FIG. 45 is a diagram of an alternative network controller embodiment that has duplicate copies of the network controller memories;

FIG. 46 is a diagram of a disjoint path check unit of the controller of FIGS. 42-44;

FIG. 47 is a timing diagram illustrating overlap path hunt processing by the controller of FIGS. 42-44;

FIG. 48 is a timing diagram illustrating overlap path hunt processing by the alternative controller of FIG. 45;

FIG. 49 is a diagram of a network having a first stage of $1 \times 2^n$ elements, a last stage of $2^n \times 1$ elements, and for which the disjoint path check unit of FIG. 46 is applicable;

FIG. 50 is a diagram of a crossover to shuffle mapping unit of the controller of FIGS. 42-44;

FIG. 51 is a diagram of an idle path select unit of the controller of FIGS. 42-44;

FIGS. 52 and 53 are diagrams of a two-dimensional crossover network implementation and a two-dimensional shuffle network implementation, respectively;

FIGS. 55-57, when arranged in accordance with FIG. 54, comprise a diagram of a 16×16, three-dimensional crossover network that is topologically equivalent to the two-dimensional crossover network of FIGS. 34-36;

FIG. 58 is a diagram of an array of symmetric self electro-optic effect devices (S-SEEDs) used in the network of FIGS. 55-57;

FIG. 59 is a diagram of a crossover network having two-input, two-output switching nodes within the fan-out (expansion) and fanin (concentration) sections as well as within the switching section;

FIG. 60 is a diagram of an electronic tri-state buffer implementation of a switching node referred to herein as a 2-module;

FIG. 61 is a truth table defining the operation of the tri-state buffer of FIG. 60;

FIG. 62 is a diagram of an electronic inverting tri-state buffer implementation of a 2-module;

FIG. 63 is a diagram of an optical 2-module implementation using a device referred to herein as an M-SEED;

FIG. 64 is a truth table defining the operation of the M-SEED implementation of FIG. 63;

FIG. 65 is a diagram of an electronic OR/AND implementation of a 2-module;

FIG. 66 is a truth table defining the operation of the electronic OR/AND implementation of FIG. 65;

FIG. 67 is a diagram of an electronic NOR/OR implementation of a 2-module;

FIG. 68 is a diagram of an optical NOR/OR S-SEED implementation of a 2-module;

FIG. 69 is a truth table defining the operation of the optical NOR/OR S-SEED implementation of FIG. 68;

FIG. 70 is a diagram of an electronic NAND/AND implementation of a 2-module;

FIG. 71 is a diagram of an optical NAND/AND S-SEED implementation of a 2-module;

FIG. 72 is a truth table defining the operation of the optical NAND/AND S-SEED implementation of FIG. 71;

FIG. 73 is a diagram of a timing circuit used to drive the laser diodes for a single network stage;

FIG. 74 is a diagram of a timing circuit used to drive the laser diodes for three successive network stages;

FIG. 75 is a timing diagram associated with the timing circuit of FIG. 74;

FIG. 76 is a diagram illustrating horizontal connections in the three-dimensional crossover network of FIGS. 55-57;

FIG. 77 is a diagram illustrating vertical connections in the three-dimensional crossover network of FIGS. 55-57;

FIG. 78 is a diagram of a network having nine node stages and having a single path identified by bold links;

FIG. 79 is a diagram showing the line of linked 2-modules of the single path of FIG. 78 and associated disabled 2-modules;

FIG. 80 is a diagram illustrating the relationship of the 2-modules of successive stages of the network of FIG. 78;

FIG. 81 is a functional block diagram of a portion of the photonic system of FIG. 1;

FIG. 82 is a diagram of an implementation of an optical crossover interconnect in the photonic system of FIG. 1;

FIG. 83 is a diagram illustrating the connection formed by the optical crossover interconnect of FIG. 82;

FIG. 84 is a diagram of a prismatic mirror array which may replace a prismatic mirror in the optical crossover interconnect of FIG. 82 to vary the width of the cross in a crossover network;

FIG. 85 is a diagram of an optical arrangement used for generating the preset and power beam arrays in the photonic system of FIG. 1;

FIG. 86 is a diagram of an optical arrangement including a spatial light modulator used for generating the disable beam arrays in the photonic system of FIG. 1;

FIGS. 87, 88, and 90 are diagrams of sub-units of a beam combination unit included in the photonic system of FIG. 1;

FIG. 89 is a plot of typical transmission curves for a polarization beam splitter designed for 850-nanometer operation;

FIG. 91 is a diagram illustrating the transmission and reflection of spots by patterned mirror reflectors included in the beam combination sub-unit of FIG. 90;

FIG. 92 is a diagram illustrating the receipt and reflection of spots by the S-SEED array of FIG. 58;

FIG. 93 is a diagram of an optical hardware module included in the photonic system of FIG. 1 and comprising the optical crossover interconnect of FIG. 82, the beam combination sub-units of FIGS. 87, 88 and 90, power and preset beam array generators of the type shown in FIG. 85, a disable beam array generator of the type shown in FIG. 86 and the S-SEED array of FIG. 58;

FIGS. 95 and 96, when arranged in accordance with FIG. 94, comprise a diagram of two cascaded optical hardware modules included in the photonic system of FIG. 1;

FIG. 97 is a diagram of a data input unit included in the photonic system of FIG. 1; and FIGS. 98, 99 and 100 are diagrams of alternative wavelength-dependent beam combination apparatus.

DETAILED DESCRIPTION

The description which follows is arranged in four parts. First, a reduced blocking network topology upon which photonic system 10 is based is described. Second, network control arrangements are described for rapidly finding paths and establishing communications through such reduced blocking networks. Third, photonic system 10, including the underlying three-dimensional crossover network 2110 and a reduced-functionality switching node, referred to herein as a 2-module, is described in detail. Finally, the free-space optical arrangements used to implement photonic system 10, including an optical apparatus for combining beams of different wavelengths, are described.

NETWORK TOPOLOGY

FIG. 2 is a diagram of a system 1600 comprising an expansion (fanout) section 1610, a perfect shuffle equivalent network 1620, and a concentration (fanin) section 1630. System 1600 has $N=4$ inlets and $M=4$ outlets. Perfect shuffle equivalent network 1620 has four node stages 1621-0, 1621-1, 1621-2 and 1621-3 comprising $2\times2$ nodes, and three link stages 1622-0, 1622-1 and 1622-2 each effecting the same perfect shuffle interconnection of successive node stages. Expansion section 1610 expands the $N=4$ inlets to 16 (more than N) inputs of the first node stage 1621-0. Concentration section 1630 concentrates 16 (more than M) outputs of the last node stage 1621-3 to the $M=4$ outlets. System 1600 has more than two paths between each of the N inlets and each of the M outlets. Individual nodes of the node stages 1621-0, 1621-1, 1621-2 and 1621-3 are controlled by corresponding stage controllers 1640, 1641, 1642, 1643 in response to instructions from a shuffle network controller 1650.

Three alternative implementations for the expansion section 1610 and concentration section 1630 are shown in FIGS. 3, 4 and 5. In expansion section 1710 (FIG. 3), each of the $N=4$ inlets is directly connected to four of the inputs of node stage 1621-0. In concentration section 1730, four outputs of node stage 1621-3 are directly connected to each of the $M=4$ outlets. Expansion section 1810 (FIG. 4) has a single stage 1811 of $1\times4$ nodes and concentration section 1830 has a single stage 1831 of $4\times1$ nodes. Expansion section 1910 (FIG. 5) has two stages 1911 and 1912 of $1\times2$ nodes and concentration section 1930 has two stages 1931 and 1932 of $2\times1$ nodes. Each of the expansion sections 1710, 1810, 1910 connects each of the N inlets to multiple inputs of node stage 1621-0 in a perfect shuffle sustaining pattern as defined herein. Each of the concentration sections 1730, 1830, 1930 connects multiple outputs of node stage 1621-3 to each of the M outlets in a perfect shuffle sustaining pattern as defined herein.

Three alternative $2\times2$ switching nodes 1510, 1520, and 1530 for use in system 1600 are shown in FIGS. 6, 7 and 8. A node with n inputs and m outputs is said to be a full capacity node if it is able to convey $\min\{n,m\}$ signals at the same time. A node is said to be a capacity one node if it is able to convey only one signal at a time. A capacity one node may have selectively of either inputs or outputs or may have no selectivity.

Node 1510 (FIG. 6), a full capacity node, comprises two selectors 1511 and 1512. Selector 1511 connects either of the node inputs I1 and I2 to node output O1 in response to a selection signal S1. Selector 1512 connects either of the node inputs I1 and I2 to node output O2 in response to a selection signal S2.

Node 1520 (FIG. 7), a capacity one node with input selectivity, comprises two AND-gates 1521 and 1522, and an OR-gate 1523. AND-gate 1521 transmits a signal from input I1, via OR-gate 1523, to both outputs O1 and O2 in response to a selection signal S1. AND-gate 1522 transmits a signal from input I2, via OR-gate 1523, to both outputs O1 and O2 in response to a selection signal S2. Only one of the selection signals S1 and S2 is a logic one at any time.

Node 1530 (FIG. 8), a capacity one node without selectivity, comprises an OR-gate 1531 and an AND-gate 1532. When a control signal C is a logic one, AND-gate 1532 transmits the logic union of the signals at the inputs I1 and I2, to both outputs O1 and O2. When the control signal C is a logic zero, AND-gate 1532 transmits a logic zero to both outputs O1 and O2. Only one of the inputs I1 and I2 receives an active signal at any time.

Node 1530 represents a special case of a more general switching node referred to herein as an $n\times m$-module. An $n\times m$-module, which has n inputs and m outputs, either routes the logical union of the signals at the n inputs to all of the m outputs, or routes none of the signals at the n inputs to any of the m outputs. If a network of $n\times m$-modules is controlled such that at most one input of an $n\times m$-module has an active signal, the $n\times m$-module functions to either route the signal to all of the m outputs or to leave the m outputs idle. Node 1530 is a $2\times2$-module, also referred to herein as a 2-module.

When system 1600 (FIG. 5) is implemented using 2-modules, such as node 1530, as the switching nodes of perfect shuffle equivalent network 1620 as well as in expansion section 1910 and concentration section 1930, the 2-modules of perfect shuffle equivalent network 1620 are individually disabled or enabled as necessary such that none of the 2-modules has more than one active input signal. The 2-modules of the last expansion node stage 1912 are also individually disabled or enabled (not shown in FIG. 5) such that a signal received at a given one of the N inlets is transmitted to only two 2-modules of node stage 1621-0. To improve the tolerance of system 1600 to faults, such as a particular 2-module output becoming locked at one logic value, all the expansion and concentration 2-modules may be controllable.

FIG. 9 is a diagram of a system 1601 having $N=4$ inlets and $M=16$ outlets. System 1601 is identical to system 1600 (FIG. 2) except that concentration section 1630 is not required.

FIG. 10 is a diagram of a system 1602 having $N=16$ inlets and $M=4$ outlets. System 1602 is identical to system 1600 (FIG. 2) except that expansion section 1610 is not required.

Before describing the blocking characteristics of systems such as system 1600, the fundamental principles of strictly nonblocking networks are discussed. The condition for a network to be strictly nonblocking is that the minimum number of paths between any input-output pair must exceed the maximum number of paths which can be blocked between that pair. However, a sufficient (but not necessary) condition for a network to be strictly nonblocking is that the minimum number of paths between any input-output pair exceeds the maximum number of paths which can be blocked between any input-output pair. In equation form, this sufficient condition is expressed as:

PATHS $\geq$ BLOCKED PATHS + 1.

A helpful network attribute is that the number of paths and blocked paths varies only slightly (or not at all) for any input-output pair selection.

A single stage strictly nonblocking network 1002 is shown in FIG. 11. In network 1002, the minimum number of paths between any input-output pair is equal to one. There are no blocked paths because each horizontal rail is uniquely associated with an input and each vertical rail is uniquely associated with an output. Therefore, we have PATHS $= 1 \geq$ BLOCKED PATHS $+ 1 = 0 + 1$.

Accordingly, network 1002 is a strictly nonblocking network. In network 1002, there are $N \times M$ crosspoints but only min $\{N,M\}$ are ever used at one time. To make a more efficient network, multiple stages are employed so as to create more paths than possible blocked paths while simultaneously decreasing the number of crosspoints.

A $24 \times 24$ strictly nonblocking three stage Clos network 1004 is shown in FIG. 12. There are five paths between each inlet and outlet, one through each middle stage switch. Any inlet (outlet) may have two paths blocked by the other two inlets (outlets) on its switch. If these two pairs of blocked paths are disjoint, a total of four paths are blocked. Thus, applying the strictly nonblocking condition, we have $5 \geq (2+2)+1$. The number of crosspoints in network 1004 is $3 \times 5 \times 8 + 8 \times 8 \times 5 + 5 \times 3 \times 8 = 560$. For comparison, a $24 \times 24$ crossbar network has 576 crosspoints.

A general strictly nonblocking three stage Clos network 1006 is shown in FIG. 13. (The inner-stage links are omitted in FIG. 13.) Applying the strictly nonblocking condition to network 1006, the minimum number of paths between any input-output pair is equal to r. The maximum number of blocked paths is equal to $(n-1)+(m-1)$ and therefore whenever $r \geq n+m-1$, network 1006 is strictly nonblocking. Note that an $S+2$ stage Clos network can be recursively produced from an S stage Clos network by simply replacing each switch in a given stage with a three stage Clos network. A strictly nonblocking five stage Clos network 1008 as shown in FIG. 14 with the number of links between stages indicated thereon. Two problems in implementing Clos networks in the photonic domain are: 1) non-square, non-small switching elements, and 2) different numbers of links between stages (increasing geometrically toward the center).

A multistage interconnection network (MIN) 1010 is shown in FIG. 15 and is defined by the following five conditions:

(1) a MIN has some arbitrary number S stages of nodes,
(2) there are $r_i$ nodes in stage i, each having $n_i$ inputs and $m_i$ outputs,
(3) nodes in different stages may have different values of $n_i$ and $m_i$,
(4) for $1 \leq i \leq S-1$, the outputs of nodes in stage i are connected (via links) to the inputs of nodes in stage $i+1$, and
(5) $r_i m_i = r_{i+1} n_{i+1}$ for $1 \leq i \leq S-1$.

An extended generalized shuffle (EGS) network 1012 is shown in FIG. 16. An EGS network is a MIN with a particular specified link interconnection pattern. In any stage i the nodes are numbered consecutively from 0 to $r_i - 1$ and the outputs on a particular node are numbered consecutively from 0 to $m_i - 1$. The outputs of the stage i nodes are then numbered consecutively from 0 to $r_i m_i - 1$; output $o_i$ on node $x_i$ is numbered $x_i m_i + o_i$. The EGS interconnection pattern is stated as follows: stage i output $x_i m_i + o_i$ is connected to node $(x_i m_i + o_i)_{mod \ r_{i+1}}$ in stage $i+1$. This interconnection pattern assigns links consecutively to nodes in the next stage (the so called perfect shuffle). An important implication of the EGS interconnection pattern is that the number of paths between any two nodes in two given stages never differs by more than one. For $i < j$, the number of paths between a node in stage i and a node in stage j is either $$\left\lceil \prod_{k=i}^{j-1} m_k/r_j \right\rceil = \left\lceil \prod_{k=i+1}^{j} n_k/r_i \right\rceil \text{ or}$$

$$\left\lfloor \prod_{k=i}^{j-1} m_k/r_j \right\rfloor = \left\lfloor \prod_{k=i+1}^{j} n_k/r_i \right\rfloor ,$$

where $\lceil x \rceil$ denotes the smallest integer $\geq x$ and $\lfloor x \rfloor$ denotes the largest integer $\leq x$. Consider an EGS network with $N = n_1 r_1$ inlets and $m = m_s r_s$ outlets. The minimum number of paths between any inlet-outlet pair is given by $$\left\lfloor \prod_{k=1}^{S-1} m_k/r_S \right\rfloor = \left\lfloor \prod_{k=1}^{S} m_k/M \right\rfloor =$$

-continued
$$\left\lceil \prod_{k=2}^{S} n_k/r_1 \right\rceil = \left\lceil \prod_{k=1}^{S} n_k/N \right\rceil.$$

An example EGS network 1014 is shown in FIGS. 17 and 18. To determine the number of paths between input x and output y, we calculate $$\text{Paths} = \left\lfloor \prod_{k=1}^{S} m_k/M \right\rfloor = \lfloor 3 \times 3 \times 2 \times 2 \times 1/12 \rfloor = \lfloor 36/12 \rfloor = 3.$$

The channel graph L(x,y) of input x and output y is the union of all paths between x and y. To ascertain an upperbound on the number of blocked paths, we must determine the number of calls which can intersect any channel graph and also the number of paths that each call can block. The channel graph L(x,y) is shown by dark lines in FIG. 19.

The channel graph L(x,y) is shown by dashed lines in FIG. 20. A single intersecting call (shown by dark lines in FIG. 20) blocks one of the three paths of L(x,y). Consider a call that intersects L(x,y) on j-i links from node stage i to node stage j (j>i). Denote a link from node stage k to node stage k+1 as a stage k link. The number of paths between input x and output y blocked by link i of the intersecting call C(i,j) is given by the product of the number of paths from x to the stage i node of C(i,j) and the number of paths from the stage i+1 node of C(i,j) to y. The maximum number of paths from any input (or stage 1 node) to any stage i node is $$\left\lceil \prod_{k=2}^{i} n_k/r_1 \right\rceil = \left\lceil \prod_{k=1}^{i} n_k/N \right\rceil$$

and the maximum number of paths from any stage i+1 node to any output (or stage S node) is $$\left\lceil \prod_{k=i+1}^{S-1} m_k/r_S \right\rceil = \left\lceil \prod_{k=i+1}^{S} m_k/M \right\rceil.$$

Thus, the maximum number of paths between x and y blocked by link i of C(i,j) is $$\left\lceil \prod_{k=1}^{i} n_k/N \right\rceil \times \left\lceil \prod_{k=i+1}^{S} m_k/M \right\rceil.$$

The additional number of paths blocked by link i+1 is given by $$\left\lceil \prod_{k=1}^{i+1} n_k/N \right\rceil \times \left\lceil \prod_{k=i+2}^{S} m_k/M \right\rceil - \left\lceil \prod_{k=1}^{i} n_k/N \right\rceil \times \left\lceil \prod_{k=i+2}^{S} m_k/M \right\rceil.$$

The second term subtraction corrects for the fact that the first term includes some paths blocked by link i; namely, all those paths reaching link i+1 via link i. Employing a similar correction for each remaining link of C(i,j) we have that the number of paths blocked by C(i,j) is given by BLOCKED PATHS $(i, j) \leq$ $$\sum_{k=i}^{j-1} \left\lceil \frac{\prod_{p=1}^{k} n_p}{N} \right\rceil \left\lceil \frac{\prod_{p=k+1}^{S} m_p}{M} \right\rceil - \sum_{k=i}^{j-2} \left\lceil \frac{\prod_{p=1}^{k} n_p}{N} \right\rceil \left\lceil \frac{\prod_{p=k+2}^{S} m_p}{M} \right\rceil.$$

Referring to network 1012 (FIG. 21), consider the following. Since $n_1 \leq N$ and $$\left\lceil \prod_{p=1}^{k} n_p \right\rceil$$

is nondecreasing in k, there must exist some stage such that for $1 \leq k \leq t$, $$\left\lceil \frac{\prod_{p=1}^{k} n_p}{N} \right\rceil = 1$$

and for $t+1 \leq k \leq S$, $$\left\lceil \frac{\prod_{p=1}^{k} n_p}{N} \right\rceil > 1.$$

Similarly, there must exist a stage u such that for $u \leq k \leq S$, $$\left\lceil \frac{\prod_{p=k}^{S} m_p}{M} \right\rceil = 1$$

and for $1 \leq k \leq u-1$, $$\left\lceil \frac{\prod_{p=k}^{S} m_p}{M} \right\rceil > 1.$$

The relationship $$\left\lceil \frac{\prod_{p=1}^{t+1} n_p}{N} \right\rceil > 1$$

implies that all inlets have at least one path to every stage t+1 node and therefore that intersecting call C(i,j) must have $i \leq t+1$ and similarly, because $$\left\lceil \frac{\prod_{p=u-1}^{S} m_p}{M} \right\rceil > 1,$$

must have $j \geq u-1$. Using all of this information, we are able to establish that the expression for blocked paths becomes $$\text{BLOCKED PATHS } (i,j) \leq \left\lceil \frac{\prod_{p=i+1}^{S} m_p}{M} \right\rceil +$$

$$\left\lceil \frac{\prod_{p=1}^{j-1} n_p}{N} \right\rceil + \sum_{k=t+1}^{u-2} \left\lceil \frac{\prod_{p=1}^{k} n_p}{N} \right\rceil \times$$

$$\left( \left\lceil \frac{\prod_{p=k+1}^{S} m_p}{M} \right\rceil - \left\lceil \frac{\prod_{p=k+2}^{S} m_p}{M} \right\rceil \right) - \left\lceil \frac{\prod_{p=t+2}^{S} m_p}{M} \right\rceil$$

where, conventionally, it is understood that the summation term $$\sum_{k=t+1}^{u-2}$$

equals zero if $t+1 > u-2$ and the product term $$\prod_{p=t+2}^{S}$$

equals one if $t+2 > S$. Note that $$\left\lceil \frac{\prod_{p=i+1}^{S} m_p}{M} \right\rceil$$

is a function of the entry point i and that $$\left\lceil \frac{\prod_{p=1}^{j-1} n_p}{N} \right\rceil$$

is a function of the departure point j. In addition, $$\sum_{k=t+1}^{u-2} \left\lceil \frac{\prod_{p=1}^{k} n_p}{N} \right\rceil \left( \left\lceil \frac{\prod_{p=k+1}^{S} m_p}{M} \right\rceil - \left\lceil \frac{\prod_{p=k+2}^{S} m_p}{M} \right\rceil \right) - \left\lceil \frac{\prod_{p=t+2}^{S} m_p}{M} \right\rceil$$

is a constant for all intersecting calls. Therefore, the upperbound on paths blocked by a single intersecting call is a separable function of the entry point, departure point, plus a constant.

We are now left with determining the maximum number of calls that can intersect a channel graph. Since the number of paths blocked by a single intersecting call is a separable function of the entry point, departure point, plus a constant, we need only determine the maximum number of calls which can enter and depart at each stage. We do not have to associate the entry and departure points of a given call. We are now ready to consider an important property of EGS networks (called the forward-backward invariance property) which holds for any set of consecutive stages of the network meeting a particular condition. If the forward-backward invariance property holds for certain portions of the network, the maximum number of entering and departing calls at each stage can be drastically reduced.

The forward-backward invariance property (FBIP) can be stated as follows: every stage j node which can be reached by a given stage i node reaches exactly the same set of stage i nodes. The FBIP holds for stages i and j in an EGS network if $$\prod_{k=i}^{j-1} m_k$$

divides $r_j$. The paths between certain stage 3 and stage 5 nodes for network 1014 are shown by dark lines in FIG. 22. Note that every stage 5 node which can be reached by a given stage 3 node reaches exactly the same set of stage 3 nodes. The FBIP is important because it drastically reduces intersecting calls and produces multistage modularity.

With reference to network 1012 shown in FIG. 23, assume that FBIP holds for stages 1 through i, i.e., $$\prod_{p=1}^{i-1} m_p$$

divides $r_i$. Thus, every stage i node which can be reached by some inlet x reaches exactly the same set of first stage nodes or inlets. Since any stage i node can reach at most $$\prod_{p=1}^{i} n_p$$

inlets (the product of the $n_p$ fanouts from stage i through stage 1), at most $$\prod_{p=1}^{i} n_p - 1$$

calls can enter the channel graph L(x,y) from stage 1 through stage i (point A in FIG. 23). Similarly, if FBIP holds for stages $i+2$ through S, then at most $$\prod_{p=i+2}^{S} m_p - 1$$

calls can depart from stage $i+2$ through stage S (point B in FIG. 23). For worst case considerations, we assume that all calls which enter at or before stage i depart at or before stage $i+1$ and all calls which depart at or after stage $i+2$ enter at or after stage $i+1$. Thus, for a given i, $1 \leq i \leq S-2$, the number of calls intersecting a channel graph is upperbounded by $$\prod_{p=1}^{i} n_p - 1 + \prod_{p=i+2}^{S} m_p - 1.$$

Minimizing for i and considering that at most min{N−1,M−1} calls can intersect a channel graph, we have that the maximum number of calls ω intersecting a channel graph is given by:

$$\omega = \min_{1 \leq i \leq S-2} \left\{ \prod_{p=1}^{i} n_p + \prod_{p=i+2}^{S} m_p - 2, N-1, M-1 \right\}.$$

The arguments which are used to obtain this result are valid if FBIP holds for all stages 1 through i in which $$\prod_{p=1}^{i} n_p \leq \omega$$

and also for all stages j through S in which $$\prod_{p=j}^{S} m_p \leq \omega.$$

We have thus far determined that there are:
(1) at least $$\left\lfloor \frac{\prod_{k=1}^{S} m_k}{M} \right\rfloor$$

paths between any input-output pair,
(2) at most $$\left\lceil \frac{\prod_{p=i+1}^{S} m_p}{M} \right\rceil + \left\lceil \frac{\prod_{p=1}^{j-1} n_p}{N} \right\rceil + \sum_{k=i+1}^{u-2} \left\lceil \frac{\prod_{p=1}^{k} n_p}{N} \right\rceil \times$$

$$\left( \left\lceil \frac{\prod_{p=k+1}^{S} m_p}{M} \right\rceil - \left\lceil \frac{\prod_{p=k+2}^{S} m_p}{M} \right\rceil \right) - \left\lceil \frac{\prod_{p=i+2}^{S} m_p}{M} \right\rceil$$

paths blocked by a call entering a channel graph at stage i and departing at stage j, and
(3) at most $$\omega = \min_{1 \leq i \leq S-2} \left\{ \prod_{p=1}^{i} n_p + \prod_{p=i+2}^{S} m_p - 2, N-1, M-1 \right\}$$

calls intersecting a channel graph if $$\prod_{p=1}^{i} n_p$$

divides N for $$\prod_{p=1}^{i} n_p \leq \omega$$

and $$\prod_{p=j}^{S} m_p$$

divides M for $$\prod_{p=j}^{S} m_p \leq \omega.$$

So, all we have left to determine are the maximum numbers of calls which can enter and depart at each stage of the channel graph.

Recall that at most $$\prod_{p=1}^{i} n_p - 1$$

calls can enter L(x,y) in network 1012 (FIG. 23) at point A from stage 1 through stage i. But also, at most ω calls can enter from stage 1 through stage i. Also recall that at most $$\prod_{p=i+2}^{S} m_p - 1$$

calls can depart L(x,y) from point B of network 1012 from stage i+2 through stage S. But also, at most ω calls can depart from stage i+2 through stage S. Thus, as many as $$\min \left\{ \prod_{p=1}^{i} n_p - 1, \omega \right\}$$

calls can enter from stage 1 through stage i, and as many as $$\min \left\{ \prod_{p=1}^{i-1} n_p - 1, \omega \right\}$$

calls can enter from stage 1 through stage i−1. Assuming a maximum number of calls entering through stage i−1, we have at most $$\min\left\{\prod_{p=1}^{i} n_p - 1, \omega\right\} - \min\left\{\prod_{p=1}^{i-1} n_p - 1, \omega\right\}$$

calls entering at stage i. And similarly, we have at most $$\min\left\{\prod_{p=1}^{S} m_p - 1, \omega\right\} - \min\left\{\prod_{p=i+1}^{S} m_p - 1, \omega\right\}$$

calls departing at stage i. We are now able to state the fundamental condition for strictly nonblocking EGS networks:

$$\left\lfloor \prod_{k=1}^{S} m_k/M \right\rfloor \geq \sum_{i=1}^{S} \left( \left( \min\left\{\prod_{p=1}^{i} n_p - 1, \omega\right\} - \min\left\{\prod_{p=1}^{i-1} n_p - 1, \omega\right\} \right) \times \left\lceil \frac{\prod_{p=i+1}^{S} m_p}{M} \right\rceil + \right.$$

$$\left( \min\left\{\prod_{p=1}^{S} m_p - 1, \omega\right\} - \min\left\{\prod_{p=i+1}^{S} m_p - 1, \omega\right\} \right) \times$$

$$\left\lceil \frac{\prod_{p=1}^{i-1} n_p}{N} \right\rceil \right) + \omega \times \left( \sum_{k=i+1}^{u-2} \left\lceil \frac{\prod_{p=1}^{k} n_p}{N} \right\rceil \times \right.$$

$$\left( \left\lceil \frac{\prod_{p=k+1}^{S} m_p}{M} \right\rceil - \left\lceil \frac{\prod_{p=k+2}^{S} m_p}{M} \right\rceil \right) -$$

$$\left\lceil \frac{\prod_{p=t+2}^{S} m_p}{M} \right\rceil \right) + 1, \text{ where } \left\lfloor \prod_{k=1}^{S} m_k/M \right\rfloor$$

is the minimum number of paths between any input-output pair, $$\min\left\{\prod_{p=1}^{i} n_p - 1, \omega\right\} - \min\left\{\prod_{p=1}^{i-1} n_p - 1, \omega\right\}$$

is the maximum number of entering calls at stage i, $$\left\lceil \frac{\prod_{p=i+1}^{S} m_p}{M} \right\rceil$$

is the number of paths blocked by calls entering at stage i, $$\min\left\{\prod_{p=1}^{S} m_p - 1, \omega\right\} - \min\left\{\prod_{p=i+1}^{S} m_p - 1, \omega\right\}$$

is the maximum number of departing calls at stage i, $$\left\lceil \frac{\prod_{p=1}^{i-1} n_p}{N} \right\rceil$$

is the number of paths blocked by the call departing at stage i, $\omega$ is the maximum number of intersecting calls, and $$\sum_{k=i+1}^{u-2} \left\lceil \frac{\prod_{p=1}^{k} n_p}{N} \right\rceil \left( \left\lceil \frac{\prod_{p=k+1}^{S} m_p}{M} \right\rceil - \left\lceil \frac{\prod_{p=k+2}^{S} m_p}{M} \right\rceil \right) - \left\lceil \frac{\prod_{p=t+2}^{S} m_p}{M} \right\rceil$$

is a constant component of blocked paths for all intersecting calls.

This can then be stated as a fundamental theorem for strictly nonblocking EGS networks: any EGS network which has $N = n_1 r_1$ inlets and $M = m_S r_S$ outlets and in which $$\prod_{p=1}^{i} n_p$$

divides N for $$\prod_{p=1}^{i} n_p \leq \omega \text{ and } \prod_{p=j}^{S} m_p$$

divides M for $$\left\lfloor \prod_{p=j}^{S} m_p \leq \omega, \right\rfloor$$

and in which $$\left\lfloor \prod_{k=1}^{S} m_k/M \right\rfloor \geq \omega \times$$

$$\left( \sum_{k=i+1}^{u-2} \left\lceil \frac{\prod_{p=1}^{k} n_p}{N} \right\rceil \left( \left\lceil \frac{\prod_{p=k+1}^{S} m_p}{M} \right\rceil - \right. \right.$$

$$\left. \left. \left\lceil \frac{\prod_{p=k+2}^{S} m_p}{M} \right\rceil \right) - \left\lceil \frac{\prod_{p=t+2}^{S} m_p}{M} \right\rceil \right) + 1 +$$

-continued $$\sum_{i=1}^{S}\left(\left(\min\left\{\prod_{p=1}^{i}n_p-1,\omega\right\}-\min\left\{\prod_{p=1}^{i-1}n_p-1,\omega\right\}\right)\times\left[\frac{\prod_{p=i+1}^{S}m_p}{M}\right]+\left(\min\left\{\prod_{p=1}^{S}m_p-1,\omega\right\}-\min\left\{\prod_{p=i+1}^{S}m_p-1,\omega\right\}\right)\times\left[\frac{\prod_{p=1}^{i-1}n_p}{N}\right]\right),$$

where t is the largest value of i such that $$\prod_{p=1}^{i}n_p\leq N,$$

u is the smallest value of i such that $$\prod_{p=1}^{S}m_p\leq M,$$

and $$\omega=\min_{1\leq i\leq S-2}\left\{\prod_{p=1}^{i}n_p+\prod_{p=i+2}^{S}m_p-2,N-1,M-1\right\}$$

is strictly nonblocking for point-to-point connections.

The previous development assumed full capacity nodes (capacity=min{$n_i,m_i$}). Similar developments can be made for capacity one nodes with selectivity, and for capacity one nodes without selectivity. Separate results are merged via the introduction of a variable $\alpha$, where $\alpha=1$ for full capacity nodes, $\alpha=0$ for capacity one nodes with selectivity, and $\alpha=-1$ for capacity one nodes without selectivity. The fundamental theorem for strictly nonblocking EGS networks is then stated as follows: any EGS network (where $\alpha=1$ for full capacity nodes, $\alpha=0$ for capacity one nodes with selectivity, and $\alpha=-1$ for capacity one nodes without selectivity) which has $N=n_1r_1$ inlets and $M=m_Sr_S$ inlets and in which $$\prod_{p=1}^{i}n_p$$

divides N for $$\prod_{p=1}^{i}n_p\leq\omega\text{ and }\prod_{p=j}^{S}m_p$$

divides M for and in which $$\prod_{p=j}^{S}m_p\leq\omega,$$

$$\left[\frac{\prod_{k=1}^{S}m_k/M}\right]\geq\omega\times$$

$$\left(\sum_{k=t+1}^{u-1-\alpha}\left[\frac{\prod_{p=1}^{k}n_p}{N}\right]\left(\left[\frac{\prod_{p=k+\alpha}^{S}m_p}{M}\right]-\left[\frac{\prod_{p=k+1+\alpha}^{S}m_p}{M}\right]\right)-\left[\frac{\prod_{p=t+1+\alpha}^{S}m_p}{M}\right]\right)+1+$$

$$\sum_{i=1}^{S}\left(\left(\min\left\{\prod_{p=1}^{i}n_p-1,\omega\right\}-\min\left\{\prod_{p=1}^{i-1}n_p-1,\omega\right\}\right)\times\left[\frac{\prod_{p=i+\alpha}^{S}m_p}{M}\right]+\left(\min\left\{\prod_{p=1}^{S}m_p-1,\omega\right\}-\min\left\{\prod_{p=i+1}^{S}m_p-1,\omega\right\}\right)\times\left[\frac{\prod_{p=1}^{i-\alpha}n_p}{N}\right]\right),$$

where t is the largest value of i such that $$\prod_{p=1}^{i}n_p\leq N,$$

u is the smallest value of i such that $$\prod_{p=1}^{S}m_p\leq M,$$

and $$\omega=\min_{1\leq i\leq S-1-\alpha}\left\{\prod_{p=1}^{i}n_p+\prod_{p=i+1+\alpha}^{S}m_p-2,N-1,M-1\right\}$$

is strictly nonblocking for point-to-point connections.

The great design flexibility of EGS networks stems primarily from the fact that the conditions for nonblocking operation are global and are based solely on N, M, $\alpha$, and various $n_i$ and $m_j$ products. Thus, in general, nonblocking conditions do not depend on the relationship between a particular $n_i$ and $m_j$.

An example nonblocking EGS network 1016 is shown in FIG. 24. If the output links in each stage of this network are assigned consecutively to the nodes in the next stage (perfect shuffle), then any idle input can be connected to any idle output, regardless of the current connection state of the network, i.e., the network is strictly nonblocking.

A multistage interconnection network (MIN) G is said to be a perfect shuffle equivalent network if either of the following two conditions holds.

Condition 1:

For every stage i of G there exists a one-to-one mapping $\phi_i$ from the $r_i$ stage i nodes of G onto the integer set $\{0,1,\ldots,r_i-1\}$ such that node $\alpha$ in stage i of G is connected to node $\beta$ in stage i+1 of G if and only if $$\phi_{i+1}(\beta) \in \{[\phi_i(\alpha) \times m_i + o_i]_{\mod r_{i+1}} : o_i \in \{0,1,\ldots,m_i-1\}\}.$$

Condition 2:

For every stage i of G there exists a one-to-one mapping $\Psi_i$ from the $r_i$ stage i nodes of G onto the integer set $\{0,1,\ldots,r_i-1\}$ such that node $\beta$ in stage i+1 of G is connected to node $\alpha$ in stage i of G if and only if $$\psi_i(\alpha) \in \{[\psi_{i+1}(\beta) \times n_{i+1} + i_{i+1}]_{\mod r_i} : i_{i+1} \in \{0,1,\ldots,n_{i+1}-1\}\}.$$

Note that an EGS network is a perfect shuffle equivalent network in that Condition 1 holds when each $\phi_i$ is simply the identity mapping. Let $C_1 = \{\phi_i : i \in \{1,2,\ldots,S\}\}$ represent a set of S mappings $\phi_i$ satisfying Condition 1 and let $C_2 = \{\psi_i : i \in \phi\{1,2,\ldots,S\}\}$ represent a set of S mappings satisfying Condition 2.

An expanding means is said to connect each of the N inlets of G to multiple inputs of the first stage nodes of G in a perfect shuffle sustaining pattern if either of the following two conditions holds.

Condition 1e:
$C_1$ exists, $$\frac{n_1 r_1}{N} = F,$$

an integer, and there exists a one-to-one mapping $\phi_I$ from the N inlets of G onto the integer set $\{0,1,\ldots,N-1\}$ such that inlet $\alpha$ is connected to node $\beta$ in stage 1 of G if and only if $$\phi_1(\beta) \in \{(\phi_I(\alpha) \times F + o_I)_{\mod r_1} : o_I\{0,1,\ldots,F-1\}\},$$
where $\phi_1 \in C_1$.

Condition 2e:
$C_2$ exists, $$\frac{n_1 r_1}{N} = F,$$

an integer, and there exists a one-to-one mapping $\psi_I$ from the N inlets of G onto the integer set $\{0,1,\ldots,N-1\}$ such that node $\beta$ in stage 1 of G is connected to inlet $\alpha$ of G if and only if $$\psi_I(\alpha) \in \{[\psi_1(\beta) \times n_1 + i_1]_{\mod N} : i_1 \in \{0,1,\ldots,n_1-1\}\}, \text{ where } \psi_1 \in C_2.$$

A concentrating means is said to connect multiple outputs of the last stage S of nodes of G to each of the M outlets of G in a perfect shuffle sustaining pattern if either of the following two conditions holds.

Condition 1c:
$C_1$ exists, $$\frac{n_S r_S}{M} = F,$$

an integer, and there exists a one-to-one mapping $\phi_o$ from the M outlets of G onto the integer set $\{0,1,\ldots,M-1\}$ such that node $\alpha$ in stage S of G is connected to outlet $\beta$ if and only if $$\phi_o(\beta) \in \{[\phi_S(\alpha) \times m_S + o_S]_{\mod M} : o_S \in \{0,1,\ldots,m_S-1\}\}, \text{ where } \phi_S \in C_1.$$

Condition 2c:
$C_2$ exists, $$\frac{n_S r_S}{N} = F,$$

an integer, and there exists a one-to-one mapping $\psi_o$ from the M outlets of G onto the integer set $\{0,1,\ldots,M-1\}$ such that outlet $\beta$ is connected to node $\alpha$ in stage S of G if and only if $$\psi_S(\alpha) \in \{[\psi_o(\beta) \times F' + i_o]_{\mod r_S} : i_o \in \{0,1,\ldots,F'-1\}\}, \text{ where } \psi_S \in C_2.$$

Network G with such expanding and concentrating means can be equivalently represented as an S+2 stage perfect shuffle equivalent network comprised of an expansion stage of N $1 \times F$ nodes, followed by the S stages of G, followed by a concentration stage of M $F' \times 1$ nodes. If Condition 1 (2) holds, $\phi_I(\psi_I)$ is applied to the N inlet nodes and inlet node $\alpha$ is connected to node $\beta$ in stage 1 of G according to Condition 1e (2e) and $\phi_o(\psi_o)$ is applied to the M outlet nodes and node $\alpha$ in stage S of G is connected to outlet node $\beta$ according to Condition 1c (2c). The above theorem on strictly non-blocking conditions applies to such networks.

Crossover network 1020 shown in FIG. 25 is a perfect shuffle equivalent network. This can easily be verified by examining the labeling of the nodes in each stage and the interconnection between stages. The existance of such regularized physical interconnection patterns of perfect shuffle equivalent networks is important for implementation consideration.

In a crossover network with $2^k$, $2 \times 2$ nodes per stage, each link stage i is comprised of a crossover interconnection pattern having $2^{r_i}$ partitions, where $r_i \in I(k) = \{0,1,\ldots,k-1\}$. The values selected for the various $r_i$ greatly affect the performance and connectivity of the network.

One very useful pattern of $r_i$ selection (that produces a perfect shuffle equivalent network) is to have $r_1, r_2, \ldots, r_k$ be given by any permutation of I(k) and for $i \geq k$, $r_i = r_j$ where $j = 1 + (i-1)_{\mod k}$; i.e. $r_{k+1} = r_1, r_{k+2} = r_2, \ldots, r_{2k} = r_k$, etc. Many other useful patterns exist that correspond to networks not in the perfect shuffle equivalent network family.

EGS network 1022 shown in FIG. 26 represents an important special case of perfect shuffle equivalent networks. In network 1022 $S \geq 3$, $n_1 = 1$, $m_1 = F$, $r_1 = N$, $n_S = F$, $M_S = 1$, $r_S = N$, and for $2 \leq i \leq S-1$, $n_i = m_i = n$, and $$r_i = \frac{FN}{n}.$$

LET:

P(B)=probability that a given idle inlet and outlet cannot be connected (blocked).

P(F)=probability that a given nxn node in stages 2 through S-1 is unusable due to a failure.

OCC=probability that a given inlet or outlet is busy.

$\alpha = 0$ for capacity one nxn nodes (with selectivity).

$\alpha = 1$ for full capacity nxn nodes.

THEN:

N,F,n,S,P(B),OCC, and $\alpha$ are approximately related by $$P(B) \approx \left[ 1 - \left(1 - P(F) - \frac{(n-1)OCC}{n^\alpha F}\right)^{S-2-\alpha} \right]^{\frac{FnS-2}{N}}$$

For $3 \leq S \leq 2\log_n N + 1 - \alpha$

LET:

$P_S(B) = P(B)$ for a network with S stages

THEN:

$P_{S+1}(B)$ and $P_S(B)$ are approximately related by $$P_{S+1}(B) \approx P_S(B)^{[n(1-P(F))-(n-1)n^{1-\alpha} \times OCC/F]}.$$

If $$F > \frac{(n-1)OCC}{n^\alpha(1-P(F))},$$

then the exponent is greater than one and $P_S(B)$ decreases double exponentially in S; i.e., $$\log\left(\log \frac{1}{P_S(B)}\right)$$

plotted versus S is a straight line. To demonstrate this dramatic effect assume $P_S(B) = 10^{-1}$ and $P_{S+1}(B) = [P_S(B)]^2$. Then $P_{S+1} = (10^{-1})^2 = 10^{-2}$, $P_{S+2}(B) = [10^{-2}]^2 = 10^{-4}$, $P_{S+3}(B) = [10^{-4}]^2 = 10^{-8}$, $P_{S+4}(B) = [10^{-8}]^2 = 10^{-16}$, etc. Thus, in such a network we have reduced the probability of blocking from $10^{-1}$ to $10^{-16}$ by simply adding four stages.

The previous approximate expression for probability of blocking may be generalized for any perfect shuffle equivalent network G with S stages of nodes, with stage i comprised of $n_i \times m_i$ nodes and with $N = n_1 r_1$ inlets and $M = r_s m_s$ outlets. Setting P(F)=0, OCC=1, and $\alpha = 1$ we get the probability of blocking in G, P(G), approximately given by $$P(G) \approx \left[ \prod_{i=1}^{S-1} \left[ 1 - (n_i - 1) \prod_{j=1}^{i-1} n_j / \prod_{j=1}^{i} m_j \right] \right]^{\prod_{j=1}^{S} m_j / M}.$$

$P(G) \leq 0.5$ is a conservative threshold for network G to be useful in applications where blocking probability is at all significant.

NETWORK CONTROL

Recall that network 1012, shown in FIG. 16, is an EGS network having an interconnection pattern that simply assigns links consecutively to switches in the next stage—a perfect shuffle interconnection. The number of paths P between any inlet x and any outlet y in network 1012 is given by $$P = 1 + \left\lfloor \frac{\prod_{j=1}^{S} m_j - 1 - \left(y - x \prod_{j=1}^{S} m_j\right)_{\mod M}}{M} \right\rfloor$$

Let I(k) denote the integer set $\{0,1,\ldots,k-1\}$. Denote a given path from inlet x to outlet y by the triple (x,P*,y), where P* is an element of I(P). Path (x,P*,y) will pass through stage i switch $$S_i(x, P^*, y) =$$

$$\left\lfloor \frac{x \prod_{j=1}^{S} m_j = P^*M + \left(y - x \prod_{j=1}^{S} m_j\right)_{\mod M}}{\prod_{j=1}^{S} m_j} \right\rfloor_{\mod r_i}$$

for $1 \leq i \leq S$. Denote a link between stages i and i+1 as a stage i link. Path (x,P*,y) utilizes stage i link $$L_i(x, P^*, y) =$$

$$\left\lfloor \frac{x \prod_{j=1}^{S} m_j + P^*M + \left(y - x \prod_{j=1}^{S} m_j\right)_{\mod M}}{\prod_{j=i+1}^{S} m_j} \right\rfloor_{\mod r_i m_i}$$

for $1 \leq i \leq S-1$.

FIG. 27 is a path hunt processing flow chart used to effect the path hunt function in network 1012 where the switches are full capacity, i.e., $cap(S_i) = \min\{n_i, m_i\}$. Processing begins with block 1102 where a previously unchecked path P* is selected. In block 1104 the busy/idle status of $L_i(x,P^*,y)$ is checked for all i, $1 \leq i \leq S-1$. In decision block 1106 a determination is made of whether all the $L_i(x,P^*,y)$ are idle. If all the $L_i(x,P^*,y)$ are idle, processing proceeds from block 1106 to block 1108 where it is concluded that path P* may be used to connect inlet x to outlet y. If it is determined in block 1106 that all the $L_i(x,P^*,y)$ are not idle, processing continues with decision block 1110. In block 1110 it is determined whether there are other unchecked paths. If there are, processing returns to block 1102 and the processing flow chart is repeated for a new unchecked path. However, if in decision block 1110 it is determined that there are no other unchecked paths, processing branches to block 1112 where it is concluded that all paths are blocked between inlet x and outlet y. The links $L_i$ are checked in the flow chart of FIG. C1 because the switches of network 1012 were assumed to be full capacity.

FIG. 28 is a path hunt processing flow chart used to effect the path hunt function in network 1012 where the switches are capacity one, i.e., $cap(S_i) = 1$. Processing begins with block 1122 where a previously unchecked path P* is selected. In block 1124 the busy/idle status of $S_i(x,P^*,y)$ is checked for all i, $1 \leq i \leq S$. In decision block 1126 a determination is made of whether all the $S_i(x,P^*,y)$ are idle. If all the $S_i(x,P^*,y)$ are idle processing proceeds from block 1126 to block 1128 where it is concluded that path $P^*$ may be used to connect inlet $x$ to outlet $y$. If it is determined in block 1126 that all the $S_i(x,P^*,y)$ are not idle, processing continues with decision block 1130. In block 1130 it is determined whether there are other unchecked paths. If there are, processing returns to block 1122 and the processing flow chart is repeated for a new unchecked path. However, if in decision block 1130 it is determined that there are no other unchecked paths, processing branches to block 1132 where it is concluded that all paths are blocked between inlet $x$ and outlet $y$. The switches $S_i$ are checked in the flow chart of FIG. 28 because the switches of network 1012 were assumed to be of capacity one.

It is significant to note that in performing the path hunt for network 1012, parallel operations are possible. All $S_i(x,P^*,y)$ or $L_i(x,P^*,y)$ busy/idle statuses for all $i$ and $P^*$ may be read concurrently, and then all $P$ paths can be determined busy or idle concurrently. A specific path is then chosen from those found idle, if any.

If the network under consideration is not an EGS network, but is an isomorphic version of an EGS network, inlet $x$ and outlet $y$ must be mapped into their EGS equivalents before applying the routing algorithm(s). A reverse mapping is required to operate switches.

Overlap operation can be performed on a multiplicity of connections to be made if all paths for each inlet/outlet pair are disjoint from all paths for every other inlet/outlet pair.

For convenience, denote $$\prod_{j=1}^{S} m_j = M_i.$$

If $M$ divides $M_1$, the equations for $P$, $S_i(x,P^*,y)$, and $L_i(x,P^*,y)$ given previously become $$P = \frac{M_1}{M},$$

$$S_i(x, P^*, y) = \left\lfloor \frac{xM_1 + P^*M + y}{M_i} \right\rfloor_{\mod r_i}, \text{ and}$$

$$L_i(x, P^*, y) = \left\lfloor \frac{xM_1 + P^*M + y}{M_{i+1}} \right\rfloor_{\mod r_i m_i}.$$

Consider a network G in which $N=M=2^n$, $n_1=m_S=1$, $m_1=n_S=2^k=F$, and, for $2 \leq i \leq S-1$, $n_i=m_i=2$, where $n$ and $k$ are integers. Then $M_1=2^{S-2} \times F = 2^{S-2} \times 2^k = 2^{S+k-2}$ and $$P = \frac{M_1}{M} = \frac{2^{S+k-2}}{2^n} = 2^{S+k-n-2}.$$

We also have $r_1 = r_S = N = M = 2^n$ and $$r_i = \frac{2^n \times 2^k}{2} = 2^{n+k-1}$$

for $2 \leq i \leq S-1$. Additionally, $M_i = 2^{S-i}$ for $2 \leq i \leq S$.

The term $xM_1 + P^*M + y$ thus becomes $x2^{S+k-2} + P^*2^n + y$, $x$ and $y$ range through integer values 0, 1, ..., $2^n - 1$ and $P^*$ ranges through integer values 0, 1, ..., $2^{S+k-n-2} - 1$. Thus, $P^*2^n$ has values 0, $2^n$, $2 \cdot 2^n$, $3 \cdot 2^n$, ..., $2^{S+k-2} - 2^n$ and $P^*2^n + y$ ranges through all integer values from 0 to $2^{S+k-2} - 1$. Also, $x \cdot 2^{S+k-2}$ has values 0, $2^{S+k-2}$, ..., $2^{S+k+n-2} - 2^{S+k-2}$ and thus $x2^{S+k-2} + P^*2^n + y$ ranges through all integer values from 0 to $2^{S+k+n-2} - 1$. We can thus represent $xM_1 + P^*M + y = x2^{S+k-2} + P^*2^n + y$ as an $S+k+n-2$ bit binary number as follows $$xM_1 + P^*M + y = \underbrace{xx \ldots x}_{n} \underbrace{pp \ldots p}_{S+k-n-2} \underbrace{yy \ldots y}_{n}$$

Let us consider the expression $$S_i(x, P^*, y) = \left\lfloor \frac{xM_1 + P^*M + y}{M_i} \right\rfloor_{\mod r_i} =$$

$$\left\lfloor \frac{xM_1 + P^*M + y}{2^{S-i}} \right\rfloor_{\mod 2^{n+k-1}}$$

for $2 \leq i \leq S-1$. Dividing a binary number by $2^{S-i}$ and taking the floor function is equivalent to shifting the binary number $S-1$ places to the right. Thus, $$\left\lfloor \frac{xM_1 + P^*M + y}{2^{S-i}} \right\rfloor$$

is equivalent to the binary number enclosed in the following rectangle:

$$\boxed{xx \ldots xpp \ldots} \; .pyy \ldots y$$
$$|\!\leftarrow k+n+i-2 \rightarrow\!|\!\leftarrow S-i \rightarrow\!|$$

A binary number modulo $2^{n+k-1}$ is given by the rightmost $n+k-1$ bits of the binary number. Thus, $$\left\lfloor \frac{xM_1 + P^*M + y}{2^{S-i}} \right\rfloor_{\mod 2^{n+k-1}}$$

is equivalent to the binary number enclosed in the following rectangle:

$$xx \ldots \ldots \boxed{xpp \ldots \ldots} \; .pyy \ldots y$$
$$|\!\leftarrow i-1 \rightarrow\!|\!\leftarrow n+k-1 \rightarrow\!|\!\leftarrow S-i \rightarrow\!|$$

$S_i(x,P^*,y)$ is thus given by a window of $\log_2 r_i$ bits displaced $\log_2 M_i$ bits from the right of the binary representation of $xM_1 + P^*M + y$. Similarly, $L_i(x,P^*,y)$ is given by a window of $\log_2(r_i m_i)$ bits displaced by $\log_2 M_{i+1}$ bits from the right of the binary representation of $xM_1 + P^*M + y$.

The relationship of the switches and links of a shuffle network to the inlet/outlet and path numbers is described herein for the exemplary network 1140, shown in FIG. 29. FIG. 30 illustrates the concatenation of binary representations of inlet 137, path 417, and outlet 291 to form a single binary number. FIG. 31 illustrates that the determination of a particular switch in a given stage can be made simply by selecting a certain number of consecutive bits of the binary number. The particular eleven-bit sequences used to identify the stage 2 switch and the stage 16 switch are illustrated in FIG. 31. Similarly, the twelve-bit sequences used to identify the particular links in stage 2 and stage 16 are also illustrated. The eleven-bit strings identify one out of 2048 switches. The twelve-bit strings identify one out of 4096 links. Also illustrated in FIG. 31 is the method for identifying the particular inputs and outputs of the various stages, based on the bit(s) adjacent to the bit sequences used to identify the switches and links. For example, the stage 2 and stage 16 inputs are identified and the stage 1, stage 2 and stage 16 outputs are identified. Note that for network 1140, output routing is "self-routing"—independent of the input.

Recall that the crossover network and the shuffle network are isomorphic. The transformations between various stages of the two network types are illustrated schematically in FIG. 32. The particular transformations identified in FIG. 32 are listed herein in Tables 1-3. In FIG. 32 the switch and output of stage i of a crossover network identified in block 1150 and the switch and output of a shuffle network stage i identified in block 1154 are related by transformations 1, 2, 3, and 4 of block 1152. Similarly, the switch and input for stage i+1 of a crossover network represented in block 1160 and the switch and input for stage i+1 of a shuffle network represented in block 1164 are related as defined by transformations 9, 10, 11, and 12 of block 1162. The transformations between stage i switch and output number for a crossover network and stage i+1 switch and input number for a crossover network are specified by transformations 13, 14, 15, and 16 of block 1156. The corresponding relationships between successive stages of a shuffle network are given by transformations 5, 6, 7, and 8 of block 1158. The transformations 1 through 16 are listed in Tables 1-3. For each transformation, the number to be transformed is an n-bit binary number represented by $B_{n-1} \ldots B_1 B_0$.

TABLE 1

(1) $CS_i \rightarrow SS_i$:
$$\overbrace{B_{i+1} \oplus B_i, B_{i+2} \oplus B_{i+1}, \ldots, B_{n-1} \oplus B_{n-2}}^{n-i-1}, \overbrace{B_{n-i}}^{1}$$
$$\overbrace{B_1 \oplus B_0, B_2 \oplus B_1, \ldots, B_i \oplus B_{i-1}}^{i}$$

(2) $CO_i \rightarrow SO_i$: $B_{i+1} \oplus B_i \oplus CO_i$ if $i \leq n-2$;
$B_{n-1} \oplus CO_i$ if $i = n-1$ (3) $SS_i \rightarrow CS_i$:
$$\overbrace{B_i, B_{i+1} \oplus B_i, B_{i+2} \oplus B_{i+1} \oplus B_i, \ldots, \oplus B_{n-1,\ldots,i}}^{n-i}$$
$$\overbrace{\oplus B_{n-1,\ldots,i,0}, \ldots, \oplus B_{n-1,\ldots,i,1\ldots i-1}}^{i}$$

(4) $SO_i \rightarrow CO_i$: $B_{n-i} \oplus SO_i$ (5) $SS_i, SO_i \rightarrow SS_{i+1}$: $B_{n-2}, B_{n-3}, \ldots, B_0, SO_i$ (6) $SS_i, SO_i \rightarrow SI_{i+1}$: $B_{n-1}$

TABLE 2

(7) $SS_{i+1}, SI_{i+1} \rightarrow SS_i$: $SI_{i+1}, B_{n-1}, B_{n-2}, \ldots, B_1$ (8) $SS_{i+1}, SI_{i+1} \rightarrow SO_i$: $B_0$ (9) $CS_{i+1} \rightarrow SS_{i+1}$:
$$\overbrace{B_{i+2} \oplus B_{i+1}, B_{i+3} \oplus B_{i+2}, \ldots, B_{n-1} \oplus B_{n-2}}^{n-i-2}, \overbrace{B_{n-1}}^{1},$$
$$\overbrace{B_1 \oplus B_0, B_2 \oplus B_1, \ldots, B_{i+1} \oplus B_i}^{i+1}$$

(10) $CI_{i+1} \rightarrow SI_{i+1}$: $B_{i+1} \oplus B_i \oplus CI_{i+1}$ if $i+1 \geq 1$;
$B_{n-1} \oplus CI_{i+1}$ if $i+1 = 0$ (10a) $CI_i \rightarrow SI_i$: $B_i \oplus B_{i-1} \oplus CI_i$ if $i \geq 1$;
$B_{n-1} \oplus CI_i$ if $i = 0$

(11) $SS_{i+1} \rightarrow CS_{i+1}$:
$$\overbrace{B_{i+1}, B_{i+2} \oplus B_{i+1}, B_{i+3} \oplus B_{i+2} \oplus B_{i+1}, \ldots, \oplus B_{n-1,\ldots,i+1}}^{n-i-1},$$
$$\overbrace{\oplus B_{n-1,\ldots,i+1,0}, \ldots, \oplus B_{n-1,\ldots,i+1,0,\ldots,i}}^{i+1}$$

TABLE 3

(12) $SI_{i+1} \rightarrow CI_{i+1}$: $B_0 \oplus SI_{i+1}$ (12a) $SI_i \rightarrow CI_i$: $B_0 \oplus SI_i$

(13) $CS_i, CO_i \rightarrow CS_{i+1}$:
$$\overbrace{B_{n-1}, B_{n-2}, \ldots, B_{i+1}}^{n-i-1},$$
$$\overbrace{B_i \oplus CO_i, B_{i-1} \oplus CO_i, \ldots, B_0 \oplus CO_i}^{i+1}$$

(14) $CS_i, CO_i \rightarrow CI_{i+1}$: $CO_i$

(15) $CS_{i+1}, CI_{i+1} \rightarrow CS_i$:
$$\overbrace{B_{n-1}, B_{n-2}, \ldots, B_{i+1}}^{n-i-1},$$
$$\overbrace{B_i \oplus CI_{i+1}, B_{i-1} \oplus CI_{i+1}, \ldots, B_0 \oplus CI_{i+1}}^{i+1}$$

(16) $CS_{i+1}, CI_{i+1} \rightarrow CO_i$: $CI_{i+1}$

Arrangements for controlling a 512×512 crossover network 1200 (FIG. 38) are now described. To get a better understanding of the size of such a network, first refer to the 16×16 crossover network 1170 (FIGS. 34-36) and note the pattern of crossover connections from stage to stage. FIG. 37 is a representation of the relative sizes of the 16×16 network 1170 and the 512×512 network 1200. Also shown is an intermediate size 128×128 network. Crossover network 1200 (FIG. 38) includes 15 stages; however stages 1, 2, 3, 13, 14, and 15 do not perform a switching function but are used only to implement the fanout/fanin F=8. A crossover network controller 1300 is used to effect path hunt, connect, and disconnect functions for network 1200 via a plurality of stage controllers 1201 through 1209, individual to the stages 4 through 12. For the present example, the nodes of the switching stages 4 through 12 are full capacity switching nodes such as the node of FIG. 5. The nodes of the fanout stages 1, 2 and 3 and the nodes of the fanin stages 13, 14, and 15 are simple fanout elements and fanin elements, respectively. Crossover network controller 1300, which may be implemented as a single processor operated under stored program control or as a hardware logic circuit arrangement, implements the control processing shown, for example, in FIGS. 39 and 40 to effect connections and disconnections respectively.

Connection processing (FIG. 39) begins when a network 1200 inlet/outlet pair for a given connection request is stored in a queue in block 1402. When the stored inlet/outlet pair is to be processed, a conversion of the inlet and outlet numbers is made in block 1404 to the corresponding inlet and outlet numbers of the shuffle network topologically equivalent to network 1200. Then in block 1406 a disjoint path check is made using procedures described further herein to determine whether any of the possible paths for this connection request intersect with any of the possible paths for other connection requests being processed concurrently. If there is no conflict with other connection requests in progress, execution proceeds to block 1408 where the switches or links associated with all paths from the inlet to the outlet of the equivalent shuffle network are determined. Since, in network 1200, the switches (or nodes) are full capacity switches, it is sufficient to determine the links of a given path through the network. If the network switches are capacity one switches, it is sufficient to determine the switches of a given path through the network. Once the path components of all paths have been determined, an idle path is identified in block 1410 if such idle path exists. When an idle path is found, a path memory is updated in block 1412 to define the idle path using the inlet, outlet, and path numbers for the equivalent shuffle network. Connection orders are sent in block 1414 to the network stage controllers 1201 through 1209. Further, the path components (switches or links) for the identified path are marked busy in block 1416 for all stages.

Returning to block 1406, if it is determined that the given connection request is in conflict with other connection requests being processed, information concerning the given connection request in stored in a queue in block 1420. Once an idle path is found in block 1410 for one of the other connection requests, a report is made to the queue of block 1420. The disjoint path check of block 1406 is then repeated. If no idle path is identified in block 1410 for a connection request, blocks 1422 and 1424 are executed. In block 1422, a report is made to the queue of block 1420 that connection processing is completed. In block 1424, a blocking failure report is made to the queue of block 1402 such that the unsuccessful connection request can be processed again later.

Disconnection processing (FIG. 40) begins when a network 1200 inlet for a given disconnection request is stored in a queue in block 1440. When the stored inlet is to be processed, a conversion of the inlet number is made in block 1442 to the corresponding inlet number of the shuffle network topologically equivalent to network 1200. In block 1444, the shuffle inlet number is used to index the path memory to determine the shuffle outlet number and the path number for the connection. Disconnect orders are sent in block 1448 to the network stage controllers 1201 through 1209. Further, the path components (switches or links) for the path being disconnected are again marked idle for all stages.

A hardware embodiment of network controller 1300 is shown in FIGS. 42–44. Connection requests, specifying a particular network 1200 inlet/outlet pair, are stored in a connect request queue 1302. The nine-bit binary crossover inlet number and the nine-bit binary crossover outlet number are transmitted to a crossover to shuffle mapping unit 1304 (FIG. 50) for conversion to the corresponding nine-bit shuffle inlet number and the corresponding nine-bit shuffle outlet number. The shuffle inlet and outlet numbers are stored in a connect/disconnect request queue 1305 and then transmitted to a disjoint path check unit 1306 (FIG. 46). Unit 1306 determines whether the present inlet/outlet number pair defines paths through network 1200 which are link disjoint from the paths associated with another inlet/outlet number pair. When two or more connection requests define disjoint paths through network 1200, multiple connection requests and path hunts can be processed at the same time in what is referred to herein as an overlap mode of operation. The shuffle inlet/outlet numbers are then stored in a connect/disconnect request queue 1308. When a path hunt is to be performed, connect request queue 1308 transmits a read request signal to a plurality of memories 1312 that store the link busy/idle bits for a corresponding one of the link stages 4 through 11 of network 1200. (Link stage i is the stage of links between node stage i and node stage i+1.) The nine-bit shuffle inlet and the nine-bit shuffle outlet signals are also transmitted in parallel from connect request queue 1308 and predetermined ones of the inlet and outlet signals are used to address locations of the memories 1312.

Note that in network 1200 there are eight paths associated with any specified inlet/outlet pair. Each memory 1312 has 512 locations, each comprising eight bits. Each of the 512 locations of a given memory 1312 corresponds to a different value of the predetermined nine bits extracted from the binary number formed by concatenating the inlet number, path number, and outlet number in the manner of FIG. 30. However, none of the path number bits are extracted for any of the stages. As a result, a memory 1312 location defines the busy/idle status of a link stage for each of the eight paths associated with a given inlet/outlet number pair. All eight bits of the addressed memory 1312 locations are read and concurrently combined by a plurality of path busy/idle check units 1314, implemented, for example, as multi-input OR-gates. One of the path check units 1314 transmits an idle signal when all of its input signals indicate an idle status of links. An idle path select unit 1316 (FIG. 51) receives the busy/idle signals from each of the units 1314 and selects in a predetermined fashion one of the defined idle paths. Idle path select unit 1316 then transmits the binary number corresponding to the one of the eight paths selected. Unit 1316 also transmits a blocked path indicator if, in fact, there is no path found. The blocked path indicator is fed back to the connect request queue 1302 such that the connection request can be repeated at a later time. The inverse of the blocked path indicator is used as a write request signal to write a busy bit into each of the memories 1312. The idle path number is transmitted to the memories 1312 to additionally identify the particular path and therefore the particular bit of the location addressed by the inlet and outlet numbers. In addition, a path memory 1318 is updated in response to the write request and stores, at an address defined by the shuffle inlet, both the shuffle outlet and the selected idle path number.

A disconnect request queue 1320 effects disconnections by transmitting the crossover inlet to be disconnected, to crossover to shuffle mapping unit 1304 for conversion to the corresponding shuffle inlet. The shuffle inlet is then used to address path memory 1318. Disconnect request queue 1320 transmits a read request signal to path memory 1318 and reads the shuffle outlet stored at the location of path memory 1318 defined by the shuffle inlet address. The read shuffle outlet is then transmitted along with the shuffle inlet via queue 1305, disjoint path check unit 1306 and queue 1308 to address memories 1312. The addressed path memory 1318 location also includes the path number of the path to be disconnected. The read path number is transmitted in parallel to each of the memories 1312 to additionally specify the particular bit to be returned to an idle status. Thereafter, disconnect request queue 1320 transmits a write request which effects the change to idle status in the memories 1312 and also deletes information concerning that connection from path memory 1318. Each of the node stage controllers 1201 through 1209 includes a translator which effects a predetermined combination of the shuffle inlet, outlet, and path signals to determine both the node and the node input to node output connection to be enabled as part of a new path or to be disabled for a disconnection. The design of these translators is based on the following logic. Following reasoning similar to that to determine $S_i(x,P^*,y)$ and $L_i(x,P^*,y)$ from a binary representation of $xM_1+P^*M+y$, we may determine $I_i(x,P^*,y)$ (the input used on $S_i(x,P^*,y)$) and $O_i(x,P^*,y)$ (the output used on $S_i(x,P^*,y)$).

$$I_i(x, P^*, y) = \left\lfloor \frac{xM_1 + P^*M + y}{r_i M_i} \right\rfloor_{m_i}$$

For $2 \leq i \leq S-1$, $r_i = 2^{n+k-1}$, $M_i = 2^{S-i}$ and $n_i = 2^1$, $I_i(x,P^*,y)$ is given by a window of one bit displaced $n+k-1+S-i$ bits from the right of the binary representation of $xM_1+P^*M+y$.

$$O_i(x, P^*, y) = \left\lfloor \frac{xM_1 + P^*M + y}{M_{i+1}} \right\rfloor_{\mod m_i}$$

$O_i(x,P^*,y)$ is then given by a window of one bit displaced $S-i-1$ bits from the right of the binary representation of $xM_1+P^*M+y$.

To map $S_i(x,P^*,y)$, $I_i(x,P^*,y)$, and $O_i(x,P^*,y)$ from the shuffle domain to the crossover domain we employ expressions (3) and (4) in Table 1 and expression (12a) in Table 3, respectively. The required exclusive-OR functions are easily implemented in hardware and the inputs to these functions are obtained directly from the binary representation of $xM_1+P^*M+y$.

The crossover to shuffle mapping unit 1304 (FIG. 50) comprises a set of exclusive-OR gates combining the appropriate inlet and outlet signals. Since the network has fan-out and fan-in of eight, we may interpret the entire network as being comprised of a total of fifteen stages—three stages for one to eight fan-out, nine stages for switching, and three stages for one to eight fan-in. The fan-out/fan-in is accomplished by selectively equipping only one of each eight inlets/outlets (one inlet/outlet on one of four switches). The selected 512 inlet and outlet switches are then mapped to the shuffle domain using expression (1), of Table 1. The resulting logic is indicated in FIG. 50.

The memories 1312 are each 512×8 random acess memories storing the link busy/idle bits. The path busy/idle check units 1314 are implemented as OR gates. The select unit 1316 (FIG. 51) is implemented using an arrangement of AND, NAND, OR, and NOR gates to define, using three path signals, the selected idle path, and to generate a single signal for use both as a blocked path indicator and as a write request signal.

The disjoint path check unit 1306 is based on the logic arrangement shown in FIG. 46. The two inlet/outlet pairs checked are designated as (X9, X8, X7, X6, X5, X4, X3, X2, X1)−(Y9, Y8, Y7, Y6, Y5, Y4, Y3, Y2, Y1) and (x9, x8, x7, x6, x5, x4, x3, x2, x1)−(y9, y8, y7, y6, y5, y4, y3, y2, y1). The logic arrangement of unit 1306 is applicable for checking disjoint paths in network 1330, shown in FIG. 49, independent of the fanout as indicated by the first stage of elements being $1 \times 2^n$ elements and independent of the fanin as indicated by the last stage of elements being $2^n \times 1$ elements. The logic arrangement of unit 1306 generates a logic zero signal when all paths for the inlet/outlet pairs are not link disjoint and generates a logic one signal when all pairs are link disjoint. The explanation of this logic is as follows. Consider the binary representation of $xM_1+P^*M+y$ for the two inlet/outlet pairs being checked.

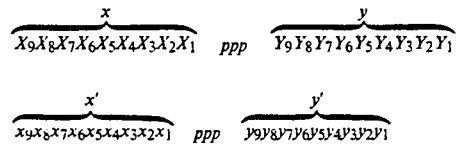

$L_i(x,P^*,y)$ is given by a window of $\log_2 (r_i m_i) = n+k = 9+3 = 12$ bits displaced by $\log_2 M_{i+1} = 1-2-i$ bits from the right of these binary values for $4 \leq i \leq 11$. Since any stage 1, 2, or 3 link is accessible by only one inlet (the three stages of fan-out) and any stage 12, 13, or 14 link is accessible by only one outlet (the three stages of fan-in) we are concerned with $L_i$ only for $4 \leq i \leq 11$.

Consider $L_4(x,P^*,y)$ and $L_4(x',P^*,y')$.

$L_4(x,P^*,y) = X_8 X_7 X_6 X_5 X_4 X_3 X_2 X_1 ppp Y_9$ $L_4(x',P^*,y') = x_8 x_7 x_6 x_5 x_4 x_3 x_2 x_1 ppp y_9$.

Since the ppp field can take on all possible eight values, these two sets of links will be disjoint only if the remaining bits differ in at least one position. Thus, these two link sets will be disjoint if $D_4 = (X_8 \oplus x_8) + (X_7 \oplus x_7) + \ldots + (X_1 \oplus x_1) + (Y_9 \oplus y_9) = 1$. Similarly, $L_5(x,P^*,y)$ will be disjoint from $L_5(x',P^*,y')$ if $D_5 = (X_7 \oplus x_7) + \ldots + (X_1 \oplus x_1) + (Y_9 \oplus y_9) + (Y_8 \oplus y_8) = 1$ and so on until we reach $D_{11} = (X_1 \oplus x_1) + (Y_9 \oplus y_9) + \ldots + (Y_2 \oplus y_2) = 1$. The entire set of links will disjoint only if each $D_i = 1$ or $D_T = D_4 x D_5 x \ldots x D_{11} = 1$. The logic shown in FIG. 46 is a Boolean reduction of $D_T$.

When two inlet/outlet pairs are determined to be link disjoint, then the path hunt function to establish connections can be performed in an overlap mode of operation, as shown in the timing diagram of FIG. 47. As shown, the times needed to perform a read of the memories 1312, the subsequent operation of the logic circuitry comprising OR gates 1314 and idle path select unit 1316, and then the subsequent time for writing of path memory 1318, as well as writing busy bits into the memories 1312, are indicated in FIG. 47 by the times $R_1$, $L_1$, $W_1$. The corresponding times for a second connection request are designated $R_2$, $L_2$, $W_2$. As shown, the second read occurs during the time that the results of the first reading are propagating through the several levels of logic gates. As shown in FIG. 48, when duplicate copies of the network controller memories, etc., are used, as in FIG. 45, four reads can be effected before the corresponding four writes occur.

Alternatively, instead of checking whether there are any conflicts among the paths between a first inlet and first outlet, and a second inlet and second outlet, one can simply proceed as if the selected paths did not conflict, and in case of a conflict, choose an alternate path between the second inlet and outlet. The presence of a conflict is detected if any of the busy-idle indicators for the second selected path are marked busy; in that case, the busy-idle indicators for that second path must be retained as idle, except for those detected to be already busy, and a hunt for an alternate path between the second inlet and outlet is made.

In many EGS networks, the probability that two connection requests are disjoint is high. Consider an EGS network with N inlets and M outlets, S stages, and with $n_i$ inlets on each switch in stage i and $m_i$ outlets on each switch in stage i and where $$N = 0 \underset{\mod \prod_{j=1}^{i} n_j}{i} \text{ for } \prod_{j=1}^{i} n_j \leq N$$

and $$M = 0 \underset{\mod \prod_{j=i}^{S} m_j}{S} \text{ for } \prod_{j=i}^{S} m_j \leq M.$$

Define L(a,b) as the set of all links in all paths between inlet a and outlet b, S(a,b) as the set of all switches in all paths between inlet a and outlet b, and $\phi$ as the empty or null set. With these definitions, we state the following theorems.

Link disjoint path theorem:

$$L(x,y) \cap L(x', y') = \phi \text{ if and only if } t \geq u,$$

Switch disjoint path theorem:

$$S(x,y) \cap S(x',y') = \phi \text{ if and only if } t > u,$$

where
t is the smallest value of i for which $$x \equiv x'_{\mod} \left\lceil \frac{N}{\prod_{j=1}^{i} n_j} \right\rceil$$

and
u is the largest value of i for which $$\left\lfloor \frac{Y}{\prod_{j=i}^{S} m_j} \right\rfloor = \left\lfloor \frac{Y'}{\prod_{j=i}^{S} m_j} \right\rfloor$$

and where
$\lfloor W \rfloor$ denotes the largest integer $\leq W$ and
$\lceil W \rceil$ denotes the smallest integer $\geq W$.

For x, y and x', y' chosen at random, we consider two cases:

Case 0: x and x' are chosen with replacement from the set of N inlets, i.e., x and x' are allowed to be the same inlet. Similarly, y and y' are chosen with replacement from the set of M outlets. For this case we set a variable $\beta = 0$.

Case 1: x and x' and also y and y' are chosen without replacement from the sets of N inlets and M outlets, respectively. Thus, $x \neq x'$, and $x \neq y'$. For this case we set $\beta = 1$.

Link disjoint path probability:
The probability that $L(x,y) \cap L(x',y') = \phi$ is given by $$1 - \frac{(n_1 - \beta) \times \min\left\{ \prod_{j=2}^{S} m_j - \beta, N - \beta \right\}}{(N - \beta)^2} +$$

$$\frac{\sum_{i=2}^{S-1} \left[ \min\left\{ \prod_{j=1}^{i} n_j, N \right\} - \min\left\{ \prod_{j=1}^{i-1} n_j, N \right\} \right] \left[ \min\left\{ \prod_{j=i+1}^{S} m_j - \beta, N - \beta \right\} \right]}{(N - \beta)^2}$$

Switch disjoint path probability:
The probability that $S(x,y) \cap S(x',y') = \phi$ is given by $$1 - \frac{(n_1 - \beta) \times \min\left\{ \prod_{j=1}^{S} m_j - \beta, N - \beta \right\}}{(N - \beta)^2} +$$

$$\frac{\sum\limits_{i=2}^{S}\left[\left[\min\left\{\prod\limits_{j=1}^{i} n_j, N\right\} - \min\left\{\prod\limits_{j=1}^{i-1} n_j, N\right\}\right]\left[\min\left\{\prod\limits_{j=i}^{S} m_j - \beta, N - \beta\right\}\right]\right]}{(N - \beta)^2}$$

For $\log_2 N \leq S \leq 2 \log_2 N$: P (disjoint) = P (all paths between a given inlet/outlet pair are switch and link disjoint from all paths between another inlet/outlet pair) =

$$1 - \frac{2^S(2 \log_2 N - S + 1) - 2N + 1}{(N - 1)^2}.$$

There are $$\frac{N^2}{2} [2^S(2 \log_2 N - S + 1) - 2N + 1]$$

ways to select two inlet/outlet pairs that have common switches for some paths. There are $$N^2 \frac{(N - 1)^2}{2}$$

ways to select two inlet/outlet pairs. By way of example, for N=512, S=9, there are $$\frac{512^2}{2} [512(18 - 9 + 1) - 1024 + 1] = 537,001,984$$

ways to select two inlet/outlet pairs with intersecting paths and $$\frac{512^2 \times 511^2}{2} = 34,225,651,712$$

ways to select two inlet/outlet pairs.

$$P(\text{disjoint}) = 1 - \frac{537,001,984}{34,225,651,712} = .9843.$$

In addition, P (at least 2 of 3 pairs are disjoint) $\approx 0.99999613$, P (each of 4 pairs are disjoint from the other three) $\approx 0.9094$, and P (some 4 of 5 pairs are all disjoint) $\approx 0.996$.

PHOTONIC SYSTEM 10

For the present description of photonic system 10 (FIG. 1), only N-input, N-output networks including a fanout section (expansion), a switching section and a fanin section (concentration) (FIG. 2) are considered. Every node stage in the switching section has NF/2 two-input, two-output switching nodes. The fanout section multiples each of the N inputs to F links at the input of the switching section. Accordingly there are FN links entering the switching section. The switching section contains S node stages with each node stage interconnected to the preceding node stage and the succeeding node stage with perfect shuffle equivalent interconnections. The fanin section groups together sets of F links and connects each group of F links to a different one of the N outputs.

Crossover interconnects are topologically equivalent to perfect shuffle interconnections. FIGS. 52 and 53 show two different two-dimensional implementations of a network with N=4, F=2, and S=4, Network 2101 (FIG. 52) uses crossover interconnections and network 2102 (FIG. 53) uses shuffle interconnections. Note that the nodes in the two-dimensional crossover network 2101 are renumbered such that network 2101 has the same node connectivity as the two-dimensional shuffle network 2102. Also note that the shuffle interconnections are invariant from link-stage to link-stage, while the crossover interconnections vary from link-stage to link-stage.

A three-dimensional crossover network 2110 (FIGS. 55-57) is topologically equivalent to the two-dimensional crossover network 1170 of FIGS. 34-36. In network 1170, note that each node of a given node stage is labeled with a number from 0 through 31. Since network 1170 is a half-crossover network, it includes both crossover connections and straight connections. If the node numbers 0 through 31 are represented as the binary addresses 00000 through 11111, the crossover connections are such that a node in one stage is connected to the node in the next stage having a binary address differing in each of the p low order bit positions, where p is a positive integer at most equal to five. Thus node 0 (00000) in stage 0 is connected to node 1 (00001) in stage 1, node 0 (00000) in stage 1 is connected to node 3 (00011) in stage 2, node 0 (00000) in stage 2 is connected to node 7 (00111) in stage 3, node 0 (00000) in stage 3 is connected to node 15 (01111) in stage 4, node 0 (00000) in stage 4 is connected to node 31 (11111) in stage 5, node 0 (00000) in stage 5 is connected to node 1 (00001) in stage 6, node 0 (00000) in stage 6 is connected to node 3 (00011) in stage 7, and node 0 (00000) in stage 7 is connected to node 7 (00111) in stage 8. For the straight connections, each node in one stage is connected to the node in the next stage having the same binary address. Note that the three-dimensional crossover network 2110 (FIGS. 55-57) achieves the same node connectivity as two-dimensional crossover network 1170 (FIGS. 34-36) when the node numbers 0 through 31 are associated with successive nodes of rows and in opposite direction across successive rows in serpentine fashion. Also note that certain stages are interconnected with only horizontal connections (only nodes in the same row are interconnected) and the other stages are interconnected with only vertical connections (only nodes in the same column are interconnected). More generally, if a network is made up of two-dimensional arrays of nodes, each array having C columns and R rows, the crossover connections are defined as follows: when the binary addresses corresponding to the integers from zero through RC-1 are respectively associated with successive nodes of rows and in opposite directions across successive rows in serpentine fashion, each node in one array is connected to the node in the successive array having a binary address differing in each of the p low order bit positions, p being a positive integer at most equal to $\log_2(RC)$.

Photonic system 10 includes stages of two-input, two-output switching nodes within the fanout section and fanin section as well as within the switching section.

Network 2112 (FIG. 59) is an example of a crossover network of this type. Unused nodes and links are indicated by dashed lines in FIG. 59. Since each stage in the fanout section results in a fanout of two, $\log_2 F$ stages are required to achieve a fanout of F. Similarly, $\log_2 F$ stages are required for a fanin of F. Thus, the total number (T) of node-stages in a network, with S stages in the switching section and having fanout and fanin equal to F, is given by: $T = S + 2 \log_2 F$. Since network 2112 has the parameters N=4, F=4, and S=2, the total number of node-stages is six.

Recall that an n×m-module is a node that broadcasts the logical union of its n inputs to all of its m outputs. Photonic system 10 is implemented using 2-modules as the switching nodes (unlike network 1170 of FIGS. 34-36 which was assumed to have full capacity nodes). System 10 is controlled such that any given 2-module has only one active input at any time. Several electronic implementations of 2-modules are described herein along with optical counterparts.

One electronic 2-module implementation is based on a tri-state buffer 2120 (FIG. 60). The truth table of FIG. 61 defines the operation of a tri-state buffer. If the tri-state control input is low (0), the output is a regenerated version of the active input signal. If the tri-state control input is high (1), the output is tri-stated and appears as a high impedance. Since the tri-state buffer accepts only one active input signal from the signals that are connected in wire-OR fashion at the input, at least one of the input signals must be disabled or tri-stated by the previous stage.

An optical device 2125 (FIG. 63) similar to an inverting tri-state buffer 2122 (FIG. 62) can be used to implement an optical 2-module. The device is a three-diode M-SEED, also referred to as an enabled S-SEED. M-SEEDs (M=3), which are described in U.S. Pat. No. 4,800,262 issued to A. L. Lentine on Jan. 24, 1989, have quantum-well diodes electrically connected in series (FIG. 63) and operate as defined by the truth table of FIG. 64. Assume that a binary one is encoded as the presence of optical power and a binary zero is encoded as the absence of optical power, i.e., less than a predefined threshold. In FIG. 63, the three diodes are labeled S (set), R (reset), and E (enable). The truth table defines that the S and R diodes operate as an S-R flip-flop when the E diode has optical power directed at it. When the E diode has no optical power (less than the predefined threshold) directed at it, no optical power is transmitted from the S or R outputs when the clock or power signals are directed at the three diodes.

The operation of an M-SEED is similar to that of a tri-state buffer. Throughout the present description, it is assumed that the top rail of the figures is the positive rail and the bottom rail is the negative rail. As a result, a binary one is encoded as the presence of optical power on the top (positive) rail and the absence of optical power on the bottom (negative) rail. The S-R flip-flop operates as an inverting buffer. Data streams are transmitted through the S-R flip-flop using a two-phase approach where a bit is stored during the first half of a bit period and transmitted to the next stage during the second half of the bit period. Each bit period includes a write cycle followed by a read cycle. The clock or power signal is directed at all three diodes of the M-SEED during the read cycle. The directed signals are modulated by the M-SEED and the resulting output signals represent the complement of the bit that was stored during the previous cycle. Data is complemented when it is transmitted through an M-SEED since the Q output is associated with the R input of the S-R flip-flop. A binary one entering the S-R flip-flop resets the device and is transmitted (when the S-R flip-flop is clocked) as a binary zero. M-SEED 2125 (FIG. 63) performs the function of inverting buffer 2122 (FIG. 62). Since data transmitted through multiple stages of inverting buffers is successively complemented, the complementation has no effect for an even number of stages. If there is an odd number of stages, one additional complementation may be effected at the output.

A second electronic 2-module 2130 is shown in FIG. 65. The corresponding truth table is given in FIG. 66. In 2-module 2130, the two input signals are combined by an OR gate. The output of the OR gate is transmitted to an AND gate where the enable control signal is combined with the data signal. If the enable control signal is high (1), the data is transmitted to the two outputs. If the enable control signal is low (0), the 2-module is disabled and the outputs are held at logic zero. One of the two inputs to the OR-gate must be disabled by the 2-modules of the previous stage since the data would otherwise be combined and corrupted at the output of the OR-gate. Electronic 2-module 2130 generates a logic zero at the disabled output instead of the high impedance that is generated at the disabled output of the tri-state buffer. Thus, the technique of wire-ORing the two inputs of the 2-module is not used; a logic OR-gate is required.

Some variations of OR/AND logic are used to implement 2-modules in the optical domain. In the present embodiment of photonic system 10, two types of 2-modules are used to implement a three-dimensional network. Instead of using the OR/AND implementation of FIG. 65, NOR/OR implementation 2132 (FIG. 67) and NAND/AND implementation 2136 (FIG. 70) are used as the bases of the two types of 2-modules.

NOR/OR implementation 2132 (FIG. 67) combines the two data inputs at a NOR gate, complementing the sense of the incoming data as it is transmitted through the NOR gate. The complemented data is transmitted to an OR gate, where it is combined with the disable control signal. When the disable control signal is low (0), the complemented data is transmitted to the two outputs. When the disable control signal is high (1), the 2-module is disabled and the outputs are held at logic one. One of the two NOR gate inputs must be a disabled logic zero signal from the 2-module in the previous stage. Since the NOR/OR 2-module implementation generates a logic one at its disabled output, a second type of 2-module is required that generates a logic zero at its disabled output.

NAND/AND implementation 2136 (FIG. 70) combines the two data inputs at a NAND gate, complementing the sense of the incoming data as it is transmitted through the NAND gate. The complemented data is transmitted to an AND gate, where it is combined with the complement of the disable control signal. When the disable control signal is low (0), the complemented data is transmitted to the two outputs. When the disable control signal is high (1), the 2-module is disabled and the outputs are held at logic zero. One of the two NAND gate inputs must be a disabled logic one signal from the 2-module in the previous stage.

If no complementing of data occurs within the interconnections, the NOR/OR 2-module may be used in stages preceding stages with NAND/AND 2-modules and the NAND/AND 2-module may be used in stages preceding those with NOR/OR 2-modules. A system including alternating stages of NOR/OR 2-modules and NAND/AND 2-modules would satisfy the requirements on the disabled signals for both of the 2-module implementations.

A symmetric self electro-optic effect device (S-SEED), described in U.S. Pat. No. 4,754,132 issued to H. S. Hinton et al., on Jun. 28, 1988, is used to provide the functionality of both types of 2-modules. When a bit stream is transmitted through an S-SEED logic gate, three functions are performed in time sequence during each bit period. During a first, preset period, the S-SEED is forced into a known state such that its output Q(t) is a known binary value. During a second, write period, the dual-rail input data is used to write the new state of the S-SEED. Assume that the S-SEED windows are vertically oriented with the top window referred to as the R (reset) input and the bottom window as the S (set) input (FIGS. 68 and 71). The output from the top window is referred to as the Q output and the output from the bottom window is referred to as the $\overline{Q}$ output. The S-SEED is a ratio device that changes state when the ratio of the power entering one optical window to the power entering the other optical window exceeds a predefined threshold T. If the power entering the S window is $P_S$ and the power entering the R window is $P_R$, the S-SEED is set ($Q[t+1]=1$) if $P_S/P_R > T$. The S-SEED is reset ($Q[t+1]=0$) if $P_R/P_S > T$. During a third, read period, the new state of the S-SEED is read out and transmitted to the next stage. By applying a high-powered clock or power signal of equal intensity to both the R and S inputs, the clock signal is modulated and reflected from the windows with two unequal intensities that represent the dual-rail information presently stored in the S-SEED. The Q output power exceeds the $\overline{Q}$ output power when the S-SEED is set; the $\overline{Q}$ output power exceeds the Q output power when the S-SEED is reset. An S-SEED array 500 shown in FIG. 58 is used to implement each of the node stages of network 2110 (FIGS. 55–57) and photonic system 10 (FIG. 1). Although in the present example and for purposes of illustration, array 500 is a 4×8 rectangular, S-SEED array, such arrays are typically implemented such that the photodetector array is a square array.

The preset, write, and read period durations are determined by the pulse rate of the laser diodes that generate the clock or power signal, the preset signal, and the disable signal (a continuous disable signal may also be used). Timing control of the electronic clock signals which drive laser diodes 301, 401 and 451 is provided by the circuit of FIG. 73. The output pulse of a one-shot 452 of FIG. 73 has a duration $T_{shot}$, which is typically less than one-fourth of a bit period, and is synchronized to the data bit stream. The circuit of FIG. 74 may be used to drive the lasers in, for example, three stages of the system if appropriate delay lines (not shown) are added to the electronic signal paths to account for the optical propagation delays between stages. FIG. 75 is a typical timing diagram for the three stages. In FIG. 75, it is assumed that the input data is formatted using a return-to-zero format and that the serial bits arriving at the input are labeled in alphabetical order A, B, C, D, and E. During the first half of each bit period, data is written into the odd-numbered S-SEED arrays and read out from the even-numbered S-SEED arrays. During the second half of each bit period, data is written into the even-numbered S-SEED arrays and read out from the odd-numbered S-SEED arrays. Thus, the data is transmitted from stage to stage within the network in the pipelined fashion of a shift register of master-slave flip-flops. The odd-numbered S-SEED arrays perform as the master flip-flops and the even-numbered S-SEED arrays perform as the slave flip-flops.

Data is written into S-SEED array i during the interval when both the clock signal and the preset signal directed at array i are low (off). Data from the previous stage (i-1) is transmitted to array i during this interval. The clock in S-SEED array (i-1) is set high (on) when the clock in S-SEED array i is low (off). This permits S-SEED array i to receive data and preset signals at the same time. The preset signals have sufficient optical power to overcome any effects of the low optical power data signals. The duration of the pulses generated by one-shot 452 defines the length of the write period. In particular, if the duration of the incoming bit period is $T_{bit}$ and the one-shot period is $T_{shot}$, the read period for the S-SEED array is $T_{bit}/2$ and the write period is $(T_{bit}/2) - T_{shot}$. The differential power arriving as data at each S-SEED must be sufficient to set the state of the S-SEED within the write period.

The function of 2-module 2132 (FIG. 67) is performed by an S-SEED 2134 having signals directed at it as shown in FIG. 68. The truth table for the optical 2-module comprising S-SEED 2134 is given in FIG. 69. It is assumed that the state of the S-SEED is initially set to $Q[t]=0$ by pulsing the R input during the preset period. The columns labeled P(S) and P(R) indicate the power entering each of the S-SEED windows during the write period. As indicated $P(S)=P(\overline{In0})+P(\overline{In1})+P(Disable)$ and $P(R)=P(In0)+P(In1)$. For purposes of explanation, typical power values are assumed. An active signal on any of the data inputs In0, In1, $\overline{In0}$, $\overline{In1}$, contributes 3.0 power units, while the inactive signals each contribute 1.0 power unit. Thus, the contrast ratio of the S-SEED in the previous stage is 3:1. When the disable signal is activated, it contributes 7.1 power units; when it is not activated, it contributes 0.071 power units. Thus, the spatial light modulator that controls the disable signal is assumed to have a contrast ratio of 100:1. The S-SEED ratio threshold T is assumed to be equal to 1.5. Thus, if the ratio P(S)/P(R) is greater than 1.5, the output is set, $Q[t+1]=1$. If the ratio P(R)/P(S) is greater than 1.5, the output is reset, $Q[t+1]=0$. If the ratio P(S)/P(R) is between 0.667 and 1.5, the output does not change; therefore $Q[t+1]=Q[t]=0$, the preset output state. The outputs read during the read period are given in the last column of the truth table of FIG. 69.

The function of 2-module 2136 (FIG. 70) is performed by S-SEED 2138 having signals directed at it as shown in FIG. 71. The truth table for the optical 2-module comprising S-SEED 2138 is given in FIG. 72. The implementation of FIG. 71 is very similar to the implementation of FIG. 68 except that the disable signal has been moved from the S input to the R input, and the preset signal has been moved from the R input to the S input. The state of the S-SEED is initially set to $Q[t]=1$ by pulsing the S input during the preset period. With the same assumptions about power levels, the outputs read during the read period are given in the last column of the truth table of FIG. 72.

Two basic approaches have been described for 2-module optical implementations—one using three-diode M-SEEDs and the other using two-diode S-SEEDs. The M-SEED approach has an advantage in that it only requires two lasers (one for the clock or power signals and one for the enable signals) whereas the S-SEED approach uses three lasers (one for the clock or power signals, one for the disable signals and one for the preset signals). However, the M-SEED approach requires three diodes rather than two; accordingly, the system optics must image larger fields when the M-SEED approach is followed. The S-SEED approach is used in photonic system 10 of FIG. 1.

The relationship between the orientation of the S-SEED and the orientation of the plane containing the crossing links in a crossover connection has an impact on the design of the overall network. This relationship determines the types of 2-modules (NOR/OR or NAND/AND) that are used in particular stages of the network. Assume that the S-SEEDs are oriented vertically as shown in FIG. 58. The horizontal crossover connection is then defined to be a crossover connection where the crossing links form a plane that is perpendicular to the line formed by the S-SEED diodes. The vertical crossover connection is defined to be a crossover connection where the crossing links form a plane that is parallel to the line formed by the S-SEED diodes.

Optical hardware module 51 of FIGS. 1 and 93 is used to provide the horizontal crossing connections and the straight connections for horizontal crossover stages. The straight connections are provided by the planar mirror 108 and the horizontal crossing connections are provided by a prismatic mirror 105 or, if more than one cross is required, by a prismatic mirror array 110 (FIG. 84). Prismatic mirror array 110 has its V-grooves oriented in the vertical direction to provide horizontal shifts. The resulting horizontal crossover connections between two consecutive S-SEED arrays are shown in FIG. 76.

A modification of optical hardware module 51 of FIG. 93 is used to provide the vertical crossover stages. The prismatic mirror that provides the crossing connections is rotated by 90 degrees about the optical axis. For vertical crossover stages requiring multiple crosses, the prismatic mirror array is rotated by 90 degrees. As a result, the V-grooves of the prismatic mirror array are oriented horizontally to provide vertical shifts. The crossing connections within the vertical crossover stages also cross the data rails. Crossing the rails within a dual-rail system is equivalent to complementing the data bits. If the straight connections were implemented with a mirror as in FIG. 93, the data bits traveling along the straight connections would be complemented. Since some of the bits within a link stage would not be complemented and others would not, equipment at the output of the system would be required to determine which outgoing data streams have been complemented and which ones have not been complemented. This would require information about every path routed through the network. To avoid this problem, the data bits within the straight connections of the vertical crossover stages are also complemented by crossing the dual rails. This is accomplished by replacing mirror 108 of FIG. 93 by a prismatic mirror aray with very narrow V-grooves. The width of these grooves matches the spacing between the S-diode and the R-diode and thus reverses the positions of the outputs of each S-SEED thereby inverting the dual-rail data. The resulting vertical crossover connections between two consecutive S-SEED arrays are shown in FIG. 77.

The 2-modules on either side of a horizontal crossover stage are designed differently than the 2-modules on either side of a vertical crossover stage. The sense of the disabled output data is controlled to ensure that the disabled data entering a NOR/OR 2-module is a logic one, while the disabled data entering a NAND/AND 2-module is a logic zero. In the previous description where only horizontal crossover stages were being considered, a network alternating between NOR/OR 2-modules and NAND/AND 2-modules provides the necessary disabled outputs. However, when vertical crossover stages are added to the network, the design rules are modified. Since all of the dual-rail data passing through a vertical crossover connection is complemented by the connection, the disabled output (logic one) of a NOR/OR 2-module is complemented by the vertical crossover and passed as a logic one directly into the input of a NOR/OR 2-module in the next stage. Similarly, the disabled output (logic zero) of a NAND/AND 2-module is complemented by the vertical crossover and passed as a logic zero directly into the input of a NAND/AND 2-module in the next stage. Thus, the 2-modules on either side of a vertical crossover stage should both be of the same type (NOR/OR or NAND/AND). The following five design rules may be applied: 1) the first node stage should use NOR/OR 2-modules so that there is no need to generate a set of logic one signals to replace the disabled inputs normally received from a previous stage, 2) any node stage that follows NOR/OR 2-modules in the previous node stage and horizontal crossover in the previous link stage should use NAND/AND 2-modules, 3) any node stage that follows NOR/OR 2-modules in the previous node stage and a vertical crossover in the previous link stage should use NOR/OR 2-modules, 4) any node stage that follows NAND/AND 2-modules in the previous node stage and a horizontal crossover connection in the previous link stage should use NOR/OR 2-modules, and 5) any node stage that follows NAND/AND 2-modules in the previous node stage and a vertical crossover connection in the previous link stage should use NOR/OR 2-modules. These rules are based on the assumption that the S-SEED windows are oriented vertically. The rules require that 2-modules of different types are used on the two sides of a horizontal crossover stage and that 2-modules of the same type are used on the two sides of a vertical crossover stage. If the S-SEED windows were oriented horizontally, the design rules would change such that 2-modules of different types are used on the two sides of a vertical crossover stage and 2-modules of the same type are used on the two sides of a horizontal crossover stage.

If the five design rules are used to design a photonic system network, the data streams passed through the network are complemented many times as they are routed through the multi-stage network. Complementing occurs at every node stage due to the function of the NOR and NAND gates and complementing also occurs in vertical crossover link stages. All of the complementing operations must be accounted for in the overall network. If the data is complemented an odd number of times as it passes through the network, one more complementing function is added to correct the sense of the data. This additional complementing function may be provided, for example, by adding an extra stage of 2-modules, by adding an extra stage of connections that cross rails, by inverting the data in interface electronics at the network output or by alignment of the output fiber matrix with the appropriate S-SEED diode. As an example, consider network 2200 (FIG. 78) comprising nine node stages. A single path through the network is identified by bold links in FIG. 78. FIG. 79 shows a line of linked 2-modules comprising the 2-modules of the single path of FIG. 78 and the associated disabled 2-modules. The sense of the data at various points through the network is shown. The complementing in the vertical link stages is also shown. At the output of network 2200, the data is complemented. Accordingly, the data must be complemented one additional time at the output of the network to return to its initial form.

The routing techniques used for 2-module networks are different than those used, for example, for networks of full capacity switching nodes. Every 2-module receives data from two 2-modules in the previous node stage and sends data to two 2-modules in the next node stage as shown in FIG. 80. An active data path affects four 2-modules in any pair of consecutive node stages. Referring to FIG. 80, if 2-module A in node stage j is activated, the output data from 2-module A is directed to two 2-modules C and D in node stage j+1. For point-to-point operation, only one of the two 2-modules receiving data in node stage j+1 is enabled to route the data to node stage j+2. The other 2-module in stage j+1 is disabled. Assume that 2-module C is enabled and 2-module D is disabled. The other 2-module (B) in node stage j that is connected to 2-module D cannot pass data through 2-module D, even though 2-module D is not carrying an active data path. If 2-module D is enabled to carry data from 2-module B, the data arriving at the input of 2-module D from 2-module B is corrupted by the data also arriving at 2-module D from 2-module A. Thus 2-module D is corrupted by the active data path that routes data from 2-module A to 2-module C. Accordingly, 2-module B may not be used. In effect, a node within a 2-module based network exists in one of three states: 1) it may be busy carrying an active call, 2) it may be idle with no calls passing through it, or 3) it may be idle but corrupted by the presence of a call passing through another 2-module of the same stage. Thus, if a call is passed through a 2-module-based network with Y stages, it uses Y active 2-modules (one per stage) to carry the call and it corrupts (Y−1) idle 2-modules (one per stage in all but the first node stage). There are also (Y−1) idle 2-modules that may not be used because they are only connected to an active 2-module and a corrupted 2-module in the next node stage.

A 2-module network is controlled such that at most one of the signals receivable from the preceding stage nodes is active at any time. Each node is associated with one other node of the same stage-the node that is coupled to receive signals from the same two nodes of the preceding stage. Busy/idle information is stored for each of the nodes of each of the stages. A given node of one of the stages is selected for use as part of a connection through the network only when both the given node and the node associated with the given node are marked idle. After the selection, the given node is marked busy.

FREE SPACE OPTICS

The following description relates to a combination of optical techniques which together satisfy the hardware requirements for the optical switching fabric of photonic system 10 (FIG. 1) using two-dimensional arrays of switching devices-in the present embodiment, S-SEEDs. As in electronic systems, the interconnection paths along which the data signals flow are only part of the total system. Each S-SEED array 500 within photonic system 10 requires the following: 1) relaying the data input images onto the S-SEEDs, 2) relaying the power input images onto the S-SEEDs, 3) relaying the control input images onto the S-SEEDs, 4) data connections (crossover alignment network), 5) beam combination for data, power and control inputs, and 6) data outputs to the next stage. These requirements are substantially the same for each S-SEED array; accordingly the optical hardware modules used to meet the requirements for each stage have few variations.

FIG. 81 is a functional block diagram of a portion of photonic system 10. The data signals on the input fibers are conditioned and spatially aligned by the data input unit 40. The crossover interconnections required for the various stages are provided by the optical crossover interconnection unit 100. Arrays of spots which form the power and control inputs are generated by the power and control units 300 and 400. All of the spot arrays (data or information signal, power or clock, and control) are combined into a single spot array to be imaged onto the S-SEED arrays 500. This combination is performed by the beam combination unit 200. The S-SEED array 500 selectively reflects the power signals and beam combination unit 200 redirects the reflected power signals as input data signals to the next stage. The functions are repeated for each stage until the last, where the data signals are imaged onto output fibers by a lens 70 (FIG. 1). It should be noted that further signal conditioning, e.g., demultiplexing/multiplexing, clock extraction, bit and frame alignment, error checking, regeneration, etc., will typically be required to interface the input and output fibers to transmission facilities.

The S-SEED arrays are interconnected in perfect shuffle equivalent fashion using optical crossover interconnect unit 100 shown in FIG. 82. As shown in network 1170 (FIGS. 34–36) the size of the cross varies from stage to stage, and in the three-dimensional crossover network 2110 (FIGS. 55–57), the direction of the cross also varies.

FIG. 82 shows the optical arrangement used to implement optical crossover interconnect 100. The input image (shown entering from the bottom in FIG. 82) is circularly polarized when it passes through lens 101 to polarization beam splitter (PBS) 102, where it is split into two copies. The copy passing through PBS 102 is linearly polarized (p-type) (parallel polarization) until it passes through quarter-wave plate (QWP) 106 and becomes circularly polarized. Lens 107 focuses it to a spot array on plane mirror 108. Reflecting off mirror 108, the image returns through QWP 106. After this second pass through QWP 106, the image is linearly polarized (s-type) (perpendicular polarization) and is reflected by PBS 102. The other image copy, initially reflected by PBS 102, follows a similar path through QWP 103 and lens 104, except that it is imaged onto a prismatic mirror (PM) 105. PM 105 reverses the image about the axis of its corner, as well as reflecting the image back toward lens 104. This reversed and reflected image is collected by lens 104 and passes again through QWP 103. The polarization of the reflected image is rotated and the image passes through PBS 102 on its return trip. At the output, the two image copies are recombined into a single, overlapped image. Thus the connection of FIG. 83 is formed, where the reversed image forms the crossed connections, and the other image, the straight connections. Once the QWPs 103 and 106 are properly oriented with their fast axes at 45 degrees to the plane of incidence of PBS 102, they may be cemented directly to PBS 102. The use of polarization and highly reflective components allows this interconnection to be implemented with very little loss.

As previously mentioned, the width of the cross is varied from stage to stage. One means of realizing this is by replacing the prismatic mirror 105 with a prismatic mirror array (PMA) 110 as in FIG. 84. In this case, each prism facet reverses or crosses a portion of the image. Thus to vary the width of the cross, the width of the facets is varied. Some system stages effect horizontal crossovers and the other stages effect vertical crossovers. The vertical crossovers are achieved by rotating the PMAs by 90 degrees so that the spot array images are reversed about horizontal, rather than vertical axes. The crossover connections which are parallel to the line joining the S and R diodes of the S-SEEDs are referred to as vertical crossovers and the connections perpendicular to this line are referred to as horizontal crossovers. The vertical crossovers not only interconnect the S-SEEDs but also invert the positions of the S and R diodes forming the S-SEEDs. This causes a data inversion within the vertical cross connections and thus requires that a similar data inversion be implemented for the companion straight connections. This is accomplished by replacing plane mirror 108 with a PMA with very narrow V-grooves. The width of these grooves matches the S-R diode spacing and thus reverses the positions of the S and R outputs of each S-SEED, thereby inverting the dual rail data. In all cases, the overall size, shape, and input/output interfaces of the optical crossover interconnect unit 100 remains the same, which significantly eases system integration.

In photonic system 10 (FIG. 1), note prismatic mirror 105 and plane mirror 108 in optical hardware module 51 which implements a horizontal crossover having a single cross. In optical hardware modules 50 and 55, prismatic mirror 105 is replaced by a prismatic mirror array having two V-grooves to implement a horizontal crossover having two crosses. In the optical hardware modules 52, 53, 54, and 57, which implement vertical crossovers, plane mirror 108 is replaced with a prismatic mirror array having narrow V-grooves to perform the data inversion necessary for vertical crossover stages. Also in optical hardware modules 52, 53, 54, and 57, the prismatic mirrors or prismatic mirror arrays are rotated by 90 degrees as required to effect vertical crossovers.

Since the S-SEEDs used in photonic system 10 form two-dimensional arrays, the data signals passed from one stage to the next take the form of two-dimensional arrays of spots. The power inputs, which effect the signal amplification, and the control inputs, which determine the mode of device operation and control the establishment of network paths, also have the form of two-dimensional spot arrays.

The optical arrangement shown in FIG. 85 is used to generate an array of uniform intensity spots of good contrast. A single laser beam generated by laser diode 301 is collimated by lens 302 and is incident upon gratings 303, which split the beam into many uniform intensity beams. These beams are focused by lens 304 into an array of spots in the focal plane of lens 304. Generally, the uniform spots occupy a central region of the plane and are surrounded by non-uniform, lower intensity spots. The unwanted, non-uniform spots are blocked out by spatial filter 305. The spots in the central region pass through spatial filter 305 and are recollimated by lens 306 to form an array of beams. This array is incident on the multiple-imaging gratings 307 which split the array into many uniform copies. When these copies are ultimately focused into spots on S-SEED array 500, many abutted copies of the original central region spot array are produced. A large uniform spot array is achieved by abutting many uniform copies of a small uniform spot array.

To generate the preset and disable spot arrays, optical arrangements similar to that of FIG. 85 are used but with the following differences. To allow low-loss combination of the signal, power, and control spot arrays, the control (preset and disable) spot arrays are formed having a lower wavelength (780 nanometers) than the nominal S-SEED operating wavelength (850 nanometers). The spots in the preset spot array are imaged onto only one diode of each S-SEED in the S-SEED arrays, rather than onto both diodes as the power spots are. Since fewer spots are formed per array, the spots may have more optical power than the spots of the power spot array if laser diodes having the same power output are used; alternatively, lower power laser diodes may be used for the preset beams.

The disable beams are incident only upon the disabled S-SEED 2-modules within each S-SEED array. To generate this space-variant spot array, a space-invariant spot array identical to the preset spot array (but shifted by one diode position) is generated and the spots are passed through an electrically-controlled spatial light modulator which blocks the spots corresponding to enabled devices. The remaining spots pass through the spatial light modulator and are imaged onto the S-SEEDs to be disabled.

The optical arrangement used to generate the disable spot array is shown in FIG. 86. The portion of the arrangement comprising laser diode 401, lens 402, gratings 403, lens 404, spatial filter 405, lens 406, and gratings 407 is substantially identical to the arrangement of FIG. 85. Lens 408 is placed immediately after gratings 407 to focus the beam array to a spot array on spatial light modulator 409. The spots which are passed by spatial light modulator 409 are recollimated into a space-variant beam array by lens 410. These beams are ultimately refocused onto S-SEED array 500. As the paths through the network are changed for new or completed calls, the configuration of spatial light modulator 409 changes to disable or enable different 2-modules.

Beam combination unit 200 (FIG. 81) combines two control beam arrays (preset and disable), a power beam array, and two signal beam arrays onto S-SEED array 500. Beam combination unit 200 also provides an output path for the output beam array that is reflected from S-SEED array 500. Power/speed tradeoffs for the S-SEEDs dictate that the combination be done with as little loss as possible. The size of the S-SEEDs also affects their speed, so the S-SEEDs, and thus the spots, are quite small (1-10 microns). This dictates the use of beam combination techniques which preserve space-bandwidth product, ruling out pupil division. In the present embodiment, beam combination unit 200 comprises three sub-units 210, 240 and 270. Beam combination sub-unit 210 (FIG. 87) combines the preset and disable beam arrays into a control beam set. Beam combination sub-unit 240 (FIG. 88) combines this control beam set with the power beam array. Beam combination sub-unit 270 (FIG. 90) combines the power/control beam set with the two (overlapped) signal beam arrays, and provides a path for the output beam array. The relationship of the sub-units 210, 240, and 270 is shown in beam combination unit 200 of optical hardware module 51 in FIG. 93.

Beam combination sub-unit 210 (FIG. 87) uses a space-multiplexing technique to combine the preset and disable beam arrays. The generation of the disable beams is done such that they are linearly polarized (s-type) (perpendicular polarization) with respect to the plane of incidence of PBS 216. They are reflected by PBS 216 and pass through QWP 211 with its fast axis oriented at 45 degrees to the s-polarization. QWP 211 retards the component of the light perpendicular to the fast axis by one-quarter wavelength, such that resulting beams are circularly polarized. As they pass through lens 212, they are focused onto a patterned mirror reflector (PMR) 213. PMR 213 is an array of small mirrors deposited on a transparent substrate. The size of the mirrors matches the spot size and the mirrors are positioned such that the reflected spots are imaged by the rest of the beam combination optics onto one diode of each S-SEED. After the spots reflect off PMR 213, they are recollimated by lens 212 and pass through QWP 211 a second time. This second pass again retards the perpendicular component by another one-quarter wavelength, thus converting the beams to p-type (parallel) linear polarization and the beams pass through PBS 216.

The preset beam array generation is oriented such that the beams enter sub-unit 210 with p-type linear polarization. QWP 215 retards the polarization component perpendicular to its fast axis by one-quarter wavelength and converts the beams to circular polarization. Lens 214 focuses the beams to spots on transparent areas of PMR 213. These spots are positioned such that they are imaged onto the S-SEED diodes that do not have disable spots. The preset spots pass through PMR 213 and are recollimated by lens 212. QWP 211 is oriented with its fast axis at 90 degrees with respect to QWP 215. Thus QWP 211 retards the other polarization component (the one not retarded by QWP 215) by one-quarter wavelength and returns the beam array to its original p-type linear polarization. The preset beams pass through PBS 216. At the output, the two beam arrays are combined into the same aperture and onto the same polarization. Since the spots are imaged through a glass plate, spherical aberration can accumulate. If the plate is thin (approximately 1 mm) and lenses with focal lengths more than 30 mm are used, the spherical aberration is not significant. The depth of focus of the spot array image at PMR 213 is relatively large (greater than 16 microns), thus easing the alignment tolerances for PMR 213.

Beam combination sub-unit 240 (FIG. 88) combines the control beam array (preset and disable) with the power beam array. In sub-unit 240, a dichroic or wavelength-selective mirror (DM) 243 is used rather than a spatially-selective (space-variant) mirror. DM 243 reflects 850-nanometer light and transmits 780-nanometer light. Similar to the disable beams in sub-unit 210 (FIG. 87), the power beams enter sub-unit 240 (FIG. 88) with linear polarization of s-type, reflect off PBS 241 (designed for 850-nanometer operation) and DM 243, then pass through PBS 241 and exit having p-type linear polarization. The 780-nanometer control beams (preset and disable) transmitted from sub-unit 210 enter having p-type linear polarization and pass through QWP 244 designed for 850-nanometer operation. QWP 244 retards the polarization component perpendicular to its fast axis by greater than one-quarter wavelength, resulting in elliptical polarization. After passing through DM 243, QWP 242 is encountered. QWP 242 is oriented with its fast axis at 90 degrees with respect to QWP 244. QWP 242 causes an identical (greater than one-quarter wavelength) retardation of the other polarization, returning the beam array to p-type linear polarization such that it passes through PBS 241. At the output of sub-unit 240, the two beam sets of different wavelengths are combined into the same aperture and onto the same polarization.

It is significant that the two beam sets are combined onto the same polarization. It is difficult to separate the wavelength and polarization performance of optical elements, except near zero degrees incidence. In the next subunit 270 (FIG. 90), an 850-nanometer PBS 271 is used but it is necessary that the beams of the 780-nanometer control beam array pass through it, either in reflection or transmission. FIG. 89 is a plot of typical transmission curves for a PBS designed for 850-nanometer operation. For the thin film components used in polarization beam splitters, a variation in the angle of incidence corresponds to a variation in wavelength. The beam arrays used in the present embodiment may have a substantial angular field, for example, of plus or minus five degrees. To reflect linearly polarized light of s-type from PBS 271, the s-shoulder to p-shoulder spacing (marked s-to-p in FIG. 89) must be very wide. This is very difficult to achieve over the present wavelength range. To transmit linearly polarized light of s-type through PBS 271, the s-type transmission peak dimension (marked s-trans in FIG. 89) must be wide. This is also difficult to achieve. Thus the solution effected in the present embodiment is to transmit both the 780-nanometer beams and the 850-nanometer beams with p-type linear polarization The optical apparatus of sub-unit 240 (FIG. 88) is used because DM 243 is relatively insensitive to polarization and angle of incidence when used at approximately zero degrees.

Beam combination sub-unit 270 (FIG. 90) combines the two signal (information) beam arrays with the power/control beam array by again using space-multiplexing. Recall that optical crossover interconnect 100 generates two signal beam arrays, spatially overlapped, but on different polarizations. One signal beam array, having s-type linear polarization, is reflected from PBS 271, passes through QWP 272, reflects off of the mirrors of PMR 274 and passes through QWP 272, PBS 271, and QWP 279 onto S-SEED array 500. The other signal beam array, having p-type linear polarization, is transmitted through PBS 271 and QWP 282, reflected off of the mirrors of PMR 278, again passes through QWP 282 and is reflected by PBS 271 onto S-SEED array 500 via QWP 279. Since the signal beam arrays produce overlapped spot arrays when focused (FIG. 91), PMR 274 and PMR 278 are identically aligned. The two signal arrays are reflected off the PMRs 274 and 278 as shown in FIG. 91. As shown, the mirrors of PMRs 274 and 278 are aligned with the diode windows of the S-SEEDs. The diode windows are large enough to admit two spots side by side as shown in FIG. 92. The power/control beam array is passed onto the S-SEEDs in the same manner as the present beams in FIG. 87. The power/control beams are focused through the transparent areas of PMR 274 adjacent to the mirrors as shown in FIG. 91. Thus, they are incident on the S-SEED input windows adjacent to the signal spots as in FIG. 92. The preset and disable spots are focused on different diodes of each S-SEED, and with the signal spots, set the state of the S-SEED. The power spots read out the dual-rail state of each S-SEED. The reflected output beams are then imaged through the transparent areas of PMR 278 adjacent to the mirrors. Since the output beams emerge after being recollimated still circularly polarized from QWP 282, the polarization is correct for the beams to be received by the optical crossover interconnect 100 of the next stage. The polarization conversions of the 780-nanometer control beams effected by QWPs 272 and 276 are the same as the conversions by QWPs 242 and 244 in beam combination sub-unit 240 (FIG. 88). Lenses 273, 275, and 277 (FIG. 90) which relay the spot array images on, off, and through PMRs 274 and 278 have focal lengths greater than 30 mm as in sub-unit 210. Lens 280 next to S-SEED array 500 produces very small spots, however, and has a focal length less than 10 mm. Each of the lenses 273 and 277, inside PMRs 274 and 278 respectively, combine with lens 280 to form a minifying telescope. PMRs 274 and 278 can be scaled larger than the devices by the reciprocal of the minification factor, which eases their production tolerances.

The various optical units described above are interconnected such that the required polarization orientations are maintained, but beyond that, their relative orientations and spacings may be adjusted to facilitate the image relaying or the overall physical layout. One possible arrangement is shown for optical hardware module 51 in FIG. 93. Two cascaded optical hardware modules 50 and 51 are shown in FIGS. 95–96.

As mentioned previously, the data signals entering photonic system 10 have been first processed electrically. Each electrical signal channel is used to drive a separate laser diode. The laser diodes are connected to multi-mode fibers or single-mode fibers which are formed into a matrix with the necessary aspect ratio, e.g., the 2×8 fiber cable array 21 of FIG. 1. In addition to spatially aligning the input channels with the S-SEEDs of the S-SEED array 500, the single-rail signals are converted to dual-rail and normalized or regenerated to the appropriate levels. This is accomplished using the optical arrangement of data input unit 40 (FIG. 97). The single-rail input signal from each fiber in the cable array 21 is imaged onto only one S-SEED diode of S-SEED array 500. The preset spots are imaged onto the other diode of each device such that if a logic zero bit (no light intensity) is received, the S-SEED is already switched into the logic zero state. If a logic one bit is received, the S-SEED is reset into the logic one state. The fiber cable array 21 output is first collimated into an array of beams by lens 80 before passing through PBS 271. If the fibers forming the cable array 21 are short lengths of multi-mode fiber, the beam array may be almost randomly polarized. PBS 271 splits the cable array image into two copies. The copies are reflected by PMRs 274 and 278 and are imaged onto one of the diodes of each S-SEED. The preset beams are passed through beam combination sub-unit 240 and through the transparent areas of PMR 274 to be imaged onto the S-SEED diodes which are not being set by the signal spots. The power beams are also combined via beam combination sub-unit 240 and are imaged onto all of the diode windows, adjacent to either the preset or signal spot locations, in a manner similar to that of FIG. 92. The reflected and modulated power spots then form the regenerated dual-rail input signals to be routed through the rest of photonic system 10. At the output of the last optical hardware module 57 (FIG. 1), a lens 70 images the output signals onto a 2×8 fiber cable array 22. The fibers of array 22 terminate on photodetectors (not shown) which convert the signals back to the electrical domain for the required transmission conditioning. Since the output fiber matrix can be aligned with either of the S-SEED diodes, a data inversion can also be performed as required to compensate for an odd number of previous data inversions.

An alternative optical arrangement for performing wavelength-dependent beam combination is shown in FIG. 98 as comprising PBS 8101, QWP 8102, DM 8103, and QWP 8104. PBS 8101, QWP 8102 and QWP 8104 are designed for 850-nanometer operation. The combined power and control beams both have s-type linear polarization.

A second alternative optical arrangement for performing wavelength-dependent beam combination is shown in FIG. 99 as comprising PBS 8201, QWP 8202, DM 8203, and QWP 8204. PBS 8201, QWP 8202 and QWP 8204 are designed for 780-nanometer operation. The combined power and control beams both have s-type linear polarization.

A further alternative optical arrangement for performing wavelength-dependent beam combination in shown in FIG. 100 as comprising PBS 8301, QWP 8302, DM 8303, QWP 8304, QWP 8305, DM 8306, and QWP 8307. PBS 8301, QWP 8302, QWP 8304, QWP 8305, and QWP 8307 are designed for 850-nanometer operation. Two of the combined beams have s-type linear polarization and the other two of the combined beams have p-type linear polarization.

It is to be understood that the above-described embodiments are merely illustrative of the principles of the invention and that many variations may be devised by those skilled in the art without departing from the spirit and scope of the invention. For example, although photonic system 10 is implemented as a network of switching nodes, networks comprising other processing nodes are contemplated. It is therefore intended that such variations be included within the scope of the claims.

We claim:

1. A method of controlling a network comprising a plurality of successively interconnected stages each comprising a plurality of nodes, said plurality of stages comprising an initial stage, a plurality of intermediate stages, and a final stage, each node of at least one of said intermediate stages comprising means responsive to a control signal for broadcasting an output signal to two of the nodes of the succeeding one of said stages, said output signal comprising a logical combination of signals receivable from two of the nodes of the preceding one of said stages, each node of said at least one stage being associated with one other node of said at least one stage, said method comprising storing in memory means busy/idle information for each of said nodes of said at least one stage and in response to a request for a connection through said network, selecting a given one of the plurality of nodes of said at least one stage for use in establishing said connection only when both said given node and the node associated with said given node are marked idle in said memory means.

2. A method in accordance with claim 1 wherein said network is a perfect shuffle equivalent network and where each node of said at least one stage is associated with the one other node of said at least one stage that is connected to receive signals from the same two nodes of the preceding stage that said each node of said at least one stage is connected to receive signals from.

3. A method in accordance with claim 1 wherein said network is a perfect shuffle equivalent network and where each node of said at least one stage is associated with the one other node of said at least one stage that is connected to transmit signals to the same two nodes of the succeeding stage that said each node of said at least one stage is connected to transmit signals to.

4. A method in accordance with claim 1 further comprising
after said selecting, marking said given node as busy in said memory means.

* * * * *

UNITED STATES PATENT AND TRADEMARK OFFICE
CERTIFICATE OF CORRECTION

PATENT NO. : 5,258,978
DATED : November 2, 1993
INVENTOR(S) : Cloonan, et al

It is certified that error appears in the above-indentified patent and that said Letters Patent is hereby corrected as shown below:

Column 12, line 20, the equation should read $$\prod_{p=1}^{k} n_p$$

Column 19, line 68, after "divides M for" insert $$\prod_{p=j}^{s} m_p \leq \omega,$$

Column 20, lines 1-4, delete the first equation

Column 34, line 27,
"$\lceil W \rceil$  denotes the largest integer $\leq W$ "

should be

"$\lfloor W \rfloor$  denotes the largest integer $\leq W$ "

Signed and Sealed this

Twenty-first Day of February, 1995

Attest:

BRUCE LEHMAN

*Attesting Officer*    *Commissioner of Patents and Trademarks*